United States Patent
McIlroy et al.

(10) Patent No.: US 11,301,427 B2
(45) Date of Patent: Apr. 12, 2022

(54) INLINE AND POST-PROCESS DATA DEDUPLICATION FOR A FILE SYSTEM

(71) Applicant: EMC IP Holding Company LLC, Hopkinton, MA (US)

(72) Inventors: Lachlan McIlroy, Newport (AU); Robert Shelton, Carlton North (AU)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 129 days.

(21) Appl. No.: 16/653,862

(22) Filed: Oct. 15, 2019

(65) Prior Publication Data
US 2021/0109900 A1 Apr. 15, 2021

(51) Int. Cl.
*G06F 16/00* (2019.01)
*G06F 16/174* (2019.01)
*G06F 16/13* (2019.01)

(52) U.S. Cl.
CPC ........ *G06F 16/1752* (2019.01); *G06F 16/137* (2019.01)

(58) Field of Classification Search
CPC ............... G06F 16/1752; G06F 16/137; G06F 17/30067; G06F 17/30489; G06F 3/0641; G06F 3/0608; G06F 9/52
See application file for complete search history.

(56) References Cited

U.S. PATENT DOCUMENTS

| | | | |
|---|---|---|---|
| 2013/0268497 A1* | 10/2013 | Baldwin | G06F 16/1752 707/692 |
| 2016/0055169 A1* | 2/2016 | Sibbald | G06F 16/1748 707/664 |
| 2017/0308320 A1* | 10/2017 | Sharma | G06F 3/067 |
| 2021/0064582 A1* | 3/2021 | Wang | G06F 16/137 |

* cited by examiner

*Primary Examiner* — William B Partridge
*Assistant Examiner* — Suman Rajaputra
(74) *Attorney, Agent, or Firm* — Amin, Turocy & Watson, LLP

(57) ABSTRACT

Deduplication, including inline deduplication, of data for a file system can be implemented and managed. A data management component (DMC) can control inline and post-process deduplication of data during write and read operations associated with memory. DMC can determine whether inline data deduplication is to be performed to remove a data chunk from a write operation to prevent the data chunk from being written to a data store based on a whether a hash associated with the data chunk matches a stored hash stored in a memory index and associated with a stored data chunk stored in a shadow store. If there is a match, DMC can perform a byte-by-byte comparison of the data chunk and stored data chunk to determine whether they match. If they match, DMC can perform inline data deduplication to remove the data chunk from the write operation.

20 Claims, 14 Drawing Sheets

INLINE AND POST-PROCESS DATA DEDUPLICATION FOR A FILE SYSTEM

TECHNICAL FIELD

This disclosure relates generally to processing data, e.g., to inline and post-process data deduplication for a file system.

BACKGROUND

A file system typically can be employed to maintain files (e.g., electronic files), comprising data (e.g., electronic or digital data), including keeping track of the locations of files and associated data in memory to enable accessing of the files stored in, and retrieval of the files from, the memory. The files, including data associated with the files, often can be processed in a number of ways when data is being written to or read from files and when the files are being stored in, or retrieved from, the memory.

The above-described description is merely intended to provide a contextual overview regarding file systems and processing data, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise initiating, by a system comprising a processor, a write operation to initiate writing a set of data to a first data store. The method further can comprise, during the write operation, determining, by the system, whether an inline data deduplication is to be performed to remove a first subset of data of the set of data from the write operation based at least in part on a first result of determining whether a hash value associated with the first subset of data satisfies a first match criterion with respect to a stored hash value stored in a memory index.

In certain embodiments, the disclosed subject matter can comprise a system that can include a memory that stores computer executable components, and a processor that executes computer executable components stored in the memory. The computer executable components can comprise a write component that initiates execution of a write operation to write chunks of data to a data store. The computer executable components also can include a data management component that, during the write operation, determines whether an inline data deduplication is to be executed to remove a first chunk of data of the chunks of data from the write operation to prevent the first chunk of data from being written to the first data store based at least in part on a first result of a first determination regarding whether a hash associated with the first chunk of data satisfies a first match criterion in relation to a stored hash stored in a memory index.

In still other embodiments, a machine-readable storage medium, comprising executable instructions that, when executed by a processor, facilitate performance of operations. The operations can comprise initiating execution of a write operation to initiate writing data to a data store. The operations also can comprise, during the write operation, determining whether an inline data deduplication is to be performed to remove a subset of the data from the write operation based at least in part on a first result of determining whether a hash value associated with the subset of the data satisfies a first match criterion in relation to a stored hash value stored in a memory index.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
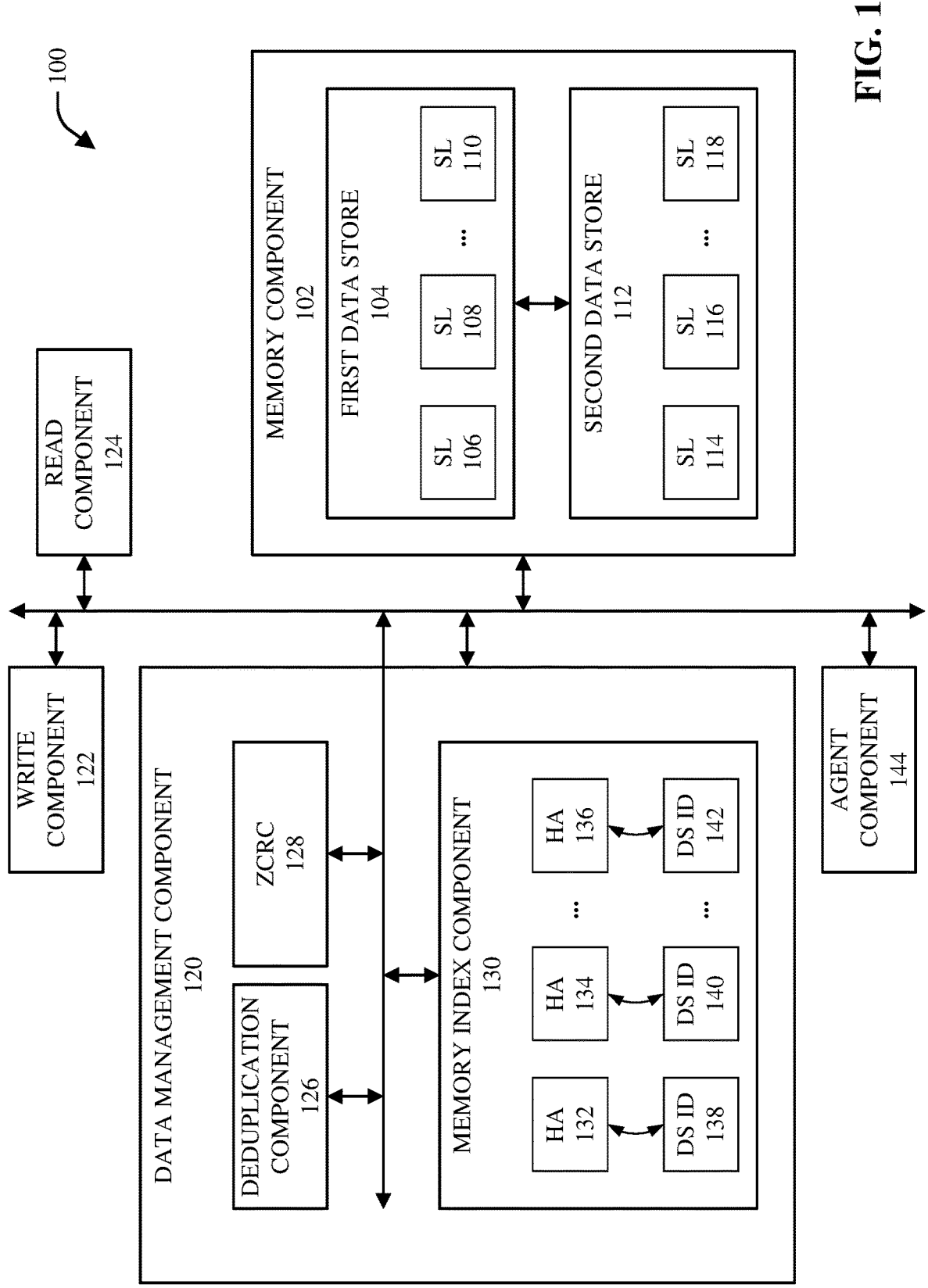
FIG. 1 illustrates a block diagram of an example system that can desirably manage data deduplication, including inline data deduplication and post-process data deduplication, associated with a file system and a memory component, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

A file system typically can be employed to maintain files (e.g., electronic files), comprising data (e.g., electronic or digital data), including keeping track of the locations of files and associated data in memory to enable accessing of the files stored in, and retrieval of the files from, the memory. The files, including data associated with the files, often can be processed in a number of ways when data is being written to or read from files and when the files are being stored in, or retrieved from, the memory.

Sometimes when data is being written to and/or stored in the memory, some of the data can be redundant (e.g., an item of data being written can be the same as another item of data that is already stored in the memory or another item data that also is being written to memory). As a result, undesirable redundant data can be unnecessarily written to and/or stored in the memory. This can result in memory space being undesirably used to unnecessarily store redundant data, thereby reducing available space in the memory as well as causing undesirable and unnecessary wear on the memory (e.g., flash memory).

To that end, techniques for desirably (e.g., efficiently) deduplicating data, including inline deduplication and post-process deduplication of data, during operations to write data to, store data in, or read data from a memory component are presented. The disclosed subject matter can comprise a data management component (DMC), a memory index component that can be managed by the DMC, and the memory component comprising a first data store, which can be utilized to store respective files (e.g., native files) comprising respective data and/or reference data, and a second data store (e.g., shadow store) that can store certain data that can be referenced by and/or associated with (e.g., mapped or linked to) the reference data stored in the files in the first data store.

During a write operation, the DMC can segment data associated with (e.g., being written during) the write operation into chunks (e.g., blocks) of data. The DMC can perform a zero chunk (e.g., block) removal operation, for example, prior to any data deduplication operation, to remove any chunks of data that contain only zero values from the write operation. The DMC can analyze the chunks of data to determine whether any of the chunks of data contain only zero values to facilitate zero chunk removal from the write operation of any chunks of data that contain only zero values. In response to determining that one or more chunks of data contain only zero values, the DMC can remove the one or more chunks of data from the write operation to prevent those one or more chunks of data from being written to the first data store (e.g., to the file in the first data store) or the second data store, and can convert the one or more respective storage regions in the file (e.g., in the first data store), which can be where the one or more chunks of data would have been stored, to be or comprise one or more sparse regions in the metadata of the file.

With regard to the remaining chunks of data for the write operation, the DMC can generate hash values (e.g., fingerprints) for these remaining chunks of data based at least in part on a desired hash algorithm (e.g., a non-cryptographic hash algorithm or a cryptographic hash algorithm). The DMC also can manage and maintain the memory index component that can comprise respective hash values (e.g., fingerprints) for respective chunks of data. The DMC can generate the respective hash values for the respective chunks of data based at least in part on a desired hash algorithm, wherein the respective chunks of data can include chunks of data stored in the first data store comprising those chunks of data, chunks of data stored in the second data store, chunks of data being written to the memory component, and/or chunks of data being read from the memory component.

The DMC can utilize the hash values in the memory index component to facilitate determining whether inline data deduplication is to be performed on a chunk of data being written to the memory component (e.g., to remove that chunk of data from the write operation), whether post-process data deduplication is to be performed on a chunk of data being written to the memory component (e.g., to remove the chunk of data from the memory component because it is a duplicate of another chunk of data stored in the memory component), whether data deduplication is to be performed on a chunk of data that has been read from the memory component, or whether no data deduplication operation is to be performed.

For a chunk of data (e.g., remaining chunk of data) of the write operation, the DMC can compare the hash value associated with that chunk of data to stored hash values that are stored in the memory index component and are associated with stored chunks of data stored in the first data store or the second data store (e.g., shadow store), or other chunks of data being written during the current write operation (e.g., stored hash values associated with chunks of data in the set of pending updates).

The DMC can determine whether inline data deduplication is to be performed to remove a data chunk from the write operation to prevent the chunk of data from being written to a data store (e.g., the second data store) based at least in part on a whether the hash value associated with the chunk of data matches a stored hash value stored in the memory index component and associated with a stored chunk of data stored in the second data store (e.g., shadow store). If the DMC determines that the hash value matches a stored hash value in the memory index component and associated with a stored chunk of data that is stored in the second data store (e.g., the stored hash value is associated with a second-data-store (SDS) identifier (e.g., a shadow Mode number (SIN)), the DMC can determine (at least can initially determine) that inline data deduplication can be performed to remove the chunk of data from the write operation and not write that chunk of data to a file in the first data store (unless an SDS block reference count associated with the SDS identifier of the stored chunk of data is determined to be at a maximum block reference value, as more fully described herein). The SDS identifier can identify that the stored hash value and associated stored chunk of data are associated with the second data store. The DMC can perform, or at least initiate performing, the inline data deduplication to remove the chunk of data from the write operation, and can schedule and/or facilitate performing an operation to convert the block in the file to a sparse region and an operation to insert a reference value (e.g., a SDS reference value or shadow reference value) in the file, wherein the block in the file is the location where the chunk of data was originally going to be written during the write operation, and wherein the reference value can identify and refer to the location of the stored chunk of data in the second data store.

In some embodiments, the DMC also can perform a byte-by-byte comparison of the chunk of data and the stored chunk of data associated with the stored hash value to determine whether the chunk of data matches the stored chunk of data byte for byte. If the DMC determines that the chunk of data matches the stored chunk of data byte for byte, the DMC can determine that the inline data deduplication with regard to the chunk of data can continue to be performed and completed. If, instead, the DMC determines that the chunk of data does not match the stored chunk of data byte for byte, the DMC can determine that the inline data deduplication is not to be performed or completed, and the DMC can terminate the inline data deduplication operation.

In certain embodiments, in response to determining that the inline data deduplication is to be terminated, the DMC can remove the SDS identifier associated with the stored chunk of data from the memory index component and can perform an operation restart (oprestart) to restart the late write operation associated with the inline data deduplication process to write the chunk of data (and any other chunk of data that failed its byte-for-byte data check) to the memory component, as more fully described herein. In other embodiments, alternatively, in response to determining that the inline data deduplication is to be terminated, the DMC can initiate a second write operation to write the chunk of data (and any other chunk of data that failed its byte-for-byte data check) to the memory component, as more fully described herein. It is to be appreciated and understood that, in various other embodiments, the DMC can perform the byte-by-byte check of the chunk of data with the stored chunk of data, prior to determining that inline data deduplication can be performed and initiating performance of the inline data deduplication of the chunk of data to facilitate avoiding having to terminate an inline data deduplication operation, performing an operation restart, and/or initiating a second write operation to write the chunk of data to the memory component.

If the DMC determines that a hash value associated with the chunk of data matches a stored hash value associated with the stored chunk of data and determines that the stored hash value is associated with a first-data-store (FDS) identifier (e.g., a logical Mode number (LIN)), which can identify that the stored hash value and associated stored chunk of data are associated with the first data store, the DMC can determine (at least can initially determine) that post-process data deduplication can be performed. The DMC can remove the chunk of data from the write operation. The DMC also can punch or initiate punching of the chunk (e.g., block) from the file (e.g., convert the block in the file to a sparse region), insert or initiate inserting an SDS reference value (e.g., shadow reference) relating to the chunk of data and sparse region into the file stored in the first data store, and redirect or initiate redirecting the chunk of data to write the chunk of data to the second data store, wherein such SDS reference value can identify and refer to the location of the chunk of data stored in the second data store. The DMC further can update the memory index component to have the index entry for the chunk of data be associated with the storage location of the chunk of data in the second data store. For instance, the DMC can update the memory index component to associate an SDS identifier with the index entry for such chunk of data, wherein the SDS identifier can indicate the storage location of the chunk of data in the second data store. The DMC also can schedule or queue other operations (e.g., asynchronous post-process operations), such as a byte-by-byte check operation, to be performed with respect to the chunk of data.

In connection with this post-process data deduplication, the DMC or an agent component can perform a byte-by-byte check (e.g., comparison) of the chunk of data to the stored chunk of data associated with the FDS identifier to determine or confirm whether the chunk of data matches such stored chunk of data byte for byte. If the DMC or the agent component determines that the chunk of data matches the stored chunk of data byte for byte, the DMC or the agent component can determine that this post-process data deduplication with regard to the chunk of data can continue to be performed and completed. As part of this post-process data deduplication process, the DMC or agent component can convert the storage location where the stored chunk of data associated with the FDS identifier is stored in the first data store (e.g., in the file in the first data store) to a sparse region, and can replace that stored chunk of data with an SDS reference value associated with the sparse region, wherein the SDS reference value can reference or indicate the storage location in the second data store where the chunk of data (e.g., matching chunk of data) is stored. If, instead, the DMC or the agent component determines that the chunk of data does not match the stored chunk of data byte for byte, the DMC or the agent component can determine that this post-process data deduplication is not to be performed or completed, and the DMC or the agent component can terminate this post-process data deduplication operation.

In some embodiments, in response to determining that this post-process data deduplication is to be terminated, the DMC can initiate a second write operation to write the chunk of data (and any other chunk of data that failed its byte-for-byte data check during the post-process data deduplication operations) to the first data store in the memory component, as more fully described herein. It is to be appreciated and understood that, in other embodiments, the DMC can perform the byte-by-byte check of the chunk of data with the stored chunk of data, prior to determining that post-process data deduplication can be performed and initiating performance of the post-process data deduplication of the chunk of data to facilitate avoiding having to terminate a post-process data deduplication operation and/or initiating a second write operation to write the chunk of data to the memory component.

In still other embodiments, if the DMC determines that the hash value associated with a chunk of data matches a stored hash value associated with another chunk of data (e.g., another chunk of data associated with the current write operation) and determines that the stored hash value is associated with a pending-update identifier (e.g., a LIN associated with a different logical block number (LBN)) in the pending updates set (e.g., associated with the current write operation) in the memory index component, which can identify that the stored hash value and associated other chunk of data are associated with the current write operation, the DMC can determine that inline data deduplication is not to be performed, and can further determine that post-process data deduplication potentially can be an option. The DMC can perform a byte-by-byte check (e.g., comparison) of the chunk of data to the other chunk of data to determine or confirm whether the chunk of data matches the other chunk of data.

If it is determined that the chunk of data does not match the other chunk of data, the DMC can determine that the post-process data deduplication cannot be performed. Accordingly, the DMC treat the chunk of data and the other chunk of data as if their respective hash values do not match, and the DMC can manage the writing of the chunk of data and the other chunk of data to have them written to their respective storage locations in the file in the first data store.

If, instead, the DMC determines that the chunk of data does match the other chunk of data, the DMC can determine that post-process data deduplication can be performed with respect to the chunk of data and other chunk of data. Accordingly, the DMC can determine that the chunk of data and the other chunk of data can be removed from the write operation. The DMC also can initiate separate operations (e.g., asynchronous operations) to schedule (and perform) an operation to punch both chunks (e.g., both blocks) from the file (e.g., convert the blocks in the file to sparse regions), an operation to insert respective SDS reference values (e.g., respective shadow references) relating to the respective chunks of data and respective sparse regions into the file stored in the first data store, and an operation to redirect the chunk of data (or other chunk of data) to write the chunk of data (or other chunk of data) to the second data store, wherein such SDS reference values can identify and refer to the location of the chunk of data (or other chunk of data) written to and stored in the second data store. The DMC can employ the agent component to perform the scheduled operations (e.g., conversion to sparse regions, redirect the writing of the chunk of data, insert SDS reference values in the file).

Alternatively, in yet other embodiments, if the DMC determines that the hash value associated with the chunk of data matches a stored hash value associated with another chunk of data (e.g., another chunk of data associated with the current write operation) and determines that the stored hash value is associated with a pending-update identifier (e.g., a LIN associated with a different LBN) in the pending updates set (e.g., associated with the current write operation) in the memory index component, which can identify that the stored hash value and associated other chunk of data are associated with the current write operation, the DMC can determine that inline data deduplication potentially can be an option. The DMC can perform a byte-by-byte check (e.g., comparison) of the chunk of data to the other chunk of data to determine or confirm whether the chunk of data matches the other chunk of data.

If it is determined that the chunk of data does not match the other chunk of data, the DMC can determine that inline deduplication cannot be performed. Accordingly, the DMC treat the chunk of data and the other chunk of data as if their respective hash values do not match, and the DMC can manage the writing of the chunk of data and the other chunk of data to have them written to their respective storage locations in the file in the first data store.

If, instead, the DMC determines that the chunk of data does match the other chunk of data, the DMC can determine that inline data deduplication can be performed with respect to the chunk of data and other chunk of data. The DMC can remove the chunk of data and the other chunk of data from the write operation and not write that chunk of data and other chunk of data to the file in the first data store. The DMC can schedule an operation to convert the respective storage regions (e.g., blocks) in the file (e.g., native file) where the chunk of data and the other chunk of data were to be written to sparse regions, redirect the chunk of data to be written to the storage location in the second data store, and schedule an operation to insert SDS reference values (e.g., shadow store references) as metadata in the file, wherein the SDS reference values be respectively associated with the sparse regions and can identify and refer to the storage location where the chunk of data is stored in the second data store. The DMC can employ the agent component to perform the scheduled operations (e.g., conversion to sparse regions, redirect the writing of the chunk of data, insert SDS reference values in the file).

In still other embodiments, if, however, the DMC determines that the hash value associated with the chunk of data does not match any of the stored hash values in the memory index component, the DMC can determine that no inline deduplication operation or post-process deduplication operation is to be performed with respect to the chunk of data, and the DMC can add the chunk of data, the hash value, and identifiers (e.g., LIN and LBN paired with the LIN) associated with the chunk of data to the pending memory index updates to be processed on successful transaction commit for the write operation or at least that portion of the write operation.

With regard to a read operation, during the read operation, the DMC can index chunks of data being read from the memory component to facilitate identifying whether duplicate data has been read from the memory component. For instance, the DMC can generate respective hash values for respective chunks of data based at least in part on the desired hash algorithm. The DMC can store the respective hash values in the memory index component. The DMC can analyze hash values, including the respective hash values associated with the read operation, that are stored in the memory index component. If the DMC identifies two (or more) hash values in the memory index component that match each other, the DMC can determine that post-process data deduplication potentially can be an option.

Accordingly, the DMC can perform a byte-by-byte comparison of the two (or more) chunks of data associated with the two (or more) hash values to determine whether the two (or more) chunks of data match each other byte for byte. In response to determining that the two (or more) chunks of data do not satisfy the byte-by-byte comparison, the DMC can determine that post-process data deduplication is not to be performed with respect to the two (or more) chunks of data. If, instead, the DMC determines that the two (or more) chunks of data do match each other byte for byte, the DMC can determine that post-process data deduplication can be performed with respect to the two (or more) chunks of data, and can generate a deduplication request to perform post-process data deduplication with respect to the two (or more) chunks of data to remove one (or more) of the duplicated chunks of data from the first data store of the memory component. The deduplication request can comprise information, such as the respective identifiers (e.g., FDS identifier or SDS identifier) associated with the duplicate chunks of data, to facilitate identifying the respective storage locations of the duplicate chunks of data (the two (or more) chunks of data) in the first data store or second data store in the memory component.

In response to the deduplication request, the agent component (e.g., an asynchronous worker component) of or associated with the DMC can perform the data deduplication of the deduplication request to remove the duplicate chunk(s) of data from the first data store or second data store in the memory component. With regard to each duplicate chunk of data of the two (or more) chunks of data, the agent component can convert the storage location (e.g., block) in the file (e.g., wherein the duplicate chunk of data was stored) in the first data store to a sparse region, and can insert (e.g., insert and store) a reference value (e.g., shadow store reference value) as metadata in the file from which such chunk(s) of data was deduplicated (e.g., removed or deleted) to indicate the storage location in the second data store where the corresponding chunk of data (e.g., of the two (or more) chunks of data) is located, wherein the reference value can be associated with (e.g., linked or mapped to) the sparse region in the file.

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) manage data deduplication, including inline data deduplication and post-process data deduplication, associated with a file system and a memory component, in accordance with various aspects and embodiments of the disclosed subject matter. The system 100 can be or can comprise a file system that can be employed to manage files and data associated with files. The system 100 can comprise a memory component 102 that can comprise a first data store 104 that can include a first set of storage locations, such as, for example, storage locations 106, 108, and 110, wherein data can be stored. For instance, files (e.g., native files) can be stored in the first data store 104, wherein respective data of the respective files can be stored in respective storage locations (e.g., 106, 108, and/or 110) of the first set of storage locations in the first data store 104.

The memory component 102 also can comprise a second data store 112 (e.g., shadow data store) that can include a second set of storage locations, such as, for example, storage locations 114, 116, and 118, wherein data can be stored. The second data store 112 can be associated with the first data store 104. In some embodiments, the file system of the system 100 can be structured or configured such that the first data store 104 and files stored therein can be available and/or visible in the file directory to users, and the second data store 112 can be latent (e.g., hidden or not visible) and not accessible (e.g., not directly accessible) to users via the file directory (e.g., the second data store 112 and the data stored therein does not appear in the file directory). In certain embodiments, when a same chunk (e.g., block) of data appears in multiple locations in a file or in multiple files in the first data store 104, the chunk of data can be stored in a storage location (e.g., 114) in the second data store 112 and removed from the file(s) in the first data store 104, and SDS reference values (e.g., shadow store reference values) can be inserted into the file(s) in the first data store 104, wherein the SDS reference values can reference the storage location (e.g., 114) where the chunk of data is stored in the second data store 112.

The system 100 can include a DMC 120 that can manage data and operations associated with the system 100, including controlling write operations, read operations, data deduplication operations, comprising inline data deduplication operations and post-process data deduplication operations, and/or other operations of the system 100. The DMC 120 can be associated with (e.g., communicatively connected to) the memory component 102 and other components of the system 100 via a bus system or other communication connections.

The system 100 also can comprise a write component 122 that can be employed to perform write operations to write data to the memory component 102, and a read component 124 that can be utilized to perform read operations to read data from the memory component 102, as managed by the DMC 120. During write operations, the DMC 120 can determine whether inline data deduplication, post-process (e.g., asynchronous post-process) data deduplication, or no data deduplication is to be performed with regard to chunks (e.g., blocks) of data being written to the memory component 102. During read operations, the DMC 120 can determine whether post-process data deduplication or no data deduplication is to be performed with regard to chunks of data that are read from the memory component 102. The DMC 120 can comprise a deduplication component 126 that can perform or facilitate performing inline or post-process data deduplication operations on chunks of data, as determined and managed by the DMC 120.

During a write operation, the DMC 120 can receive the data being written, and can segment (e.g., divide or partition) the data into chunks (e.g., blocks or segments) of data. The DMC 120 can perform zero chunk removal (e.g., zero block removal) to remove any chunk of data from the write operation that is determined to contain only zero values. The DMC 120 can include a zero chunk removal component (ZCRC) 128 that can perform a zero chunk removal process to determine whether any of the chunks of data contain only zero values and to remove any chunk of data from the write operation that is determined to contain only zero values.

Figure 2:
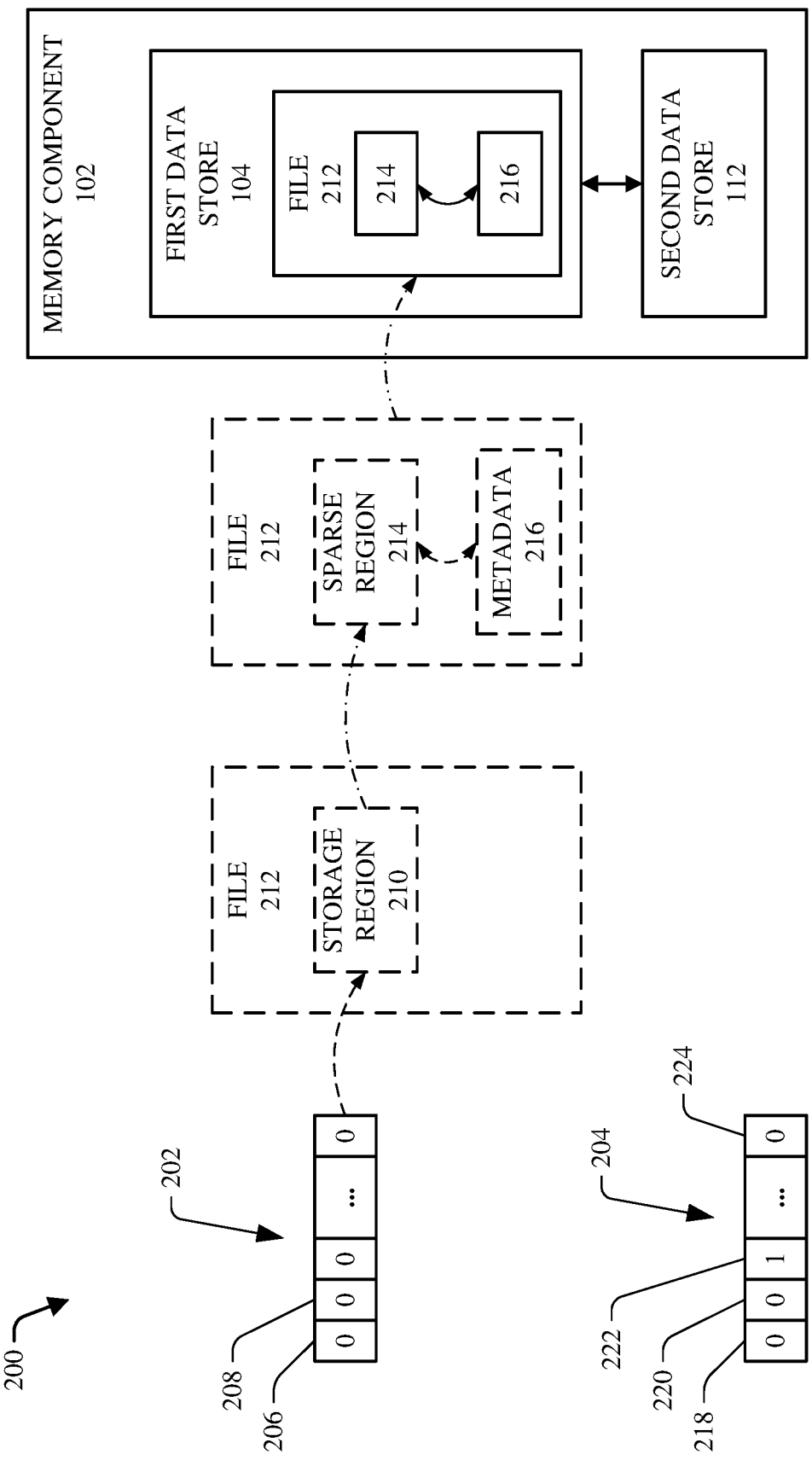
FIG. 2 depicts a block diagram of an example zero chunk (e.g., block) removal process that can be employed to remove chunks of data containing only zero values in connection with a write operation, in accordance with various aspects and embodiments of the disclosed subject matter.

Referring to FIG. 2 (along with FIG. 1), FIG. 2 depicts a block diagram of an example zero chunk (e.g., block) removal process 200 that can be employed to remove chunks of data containing only zero values in connection with a write operation, in accordance with various aspects and embodiments of the disclosed subject matter. During a write operation, prior to the DMC 120 evaluating chunks of data being written to the memory component 102 to determine whether to perform inline or post-process data deduplication on any chunks of data, the ZCRC 128 can perform the zero chunk removal process 200 to remove any chunks of data of the write operation that are determined to contain only zero values (e.g., contain bits that all have zero values).

The ZCRC 128 can analyze the chunks of data of the write operation to determine whether any of the chunks of data, such as, for example, chunk of data 202 or chunk of data 204, of the write operation contain only zero values. Based at least in part on the analysis of the chunks of data, the ZCRC 128 can determine whether any of the chunks of data contain only zero values. In response to determining that a chunk of data contains only zero values, the ZCRC 128 can remove such chunk of data from the write operation to prevent that chunk of data from being written to the first data store 104 (e.g., to the file in the first data store) or the second data store 112, and can convert the storage region where the chunk of data would have been stored in the file in the first data store 104 to be or comprise a sparse region in the metadata of the file.

As an example, based at least in part on the analysis of the chunk of data 202, the ZCRC 128 can determine that all of the bits (e.g., bit 206, bit 208, . . . ) of the chunk of data 202 contain zero values. In response to determining that the chunk of data 202 contains only zero values, the ZCRC 128 can remove the chunk of data 202 from the write operation to prevent that chunk of data 202 from being written to a storage region 210 (e.g., block or storage location) associated with a file 212 in the first data store 104 (or to the second data store 112), can convert the storage region 210 where the chunk of data 202 would have been stored in the file 212 in the first data store 104 to be or comprise a sparse region 214, and can generate or update metadata 216 in the file 212 to reflect or represent the zero chunk removal of the chunk of data 202, wherein the metadata 216 can be associated with the sparse region 214 and the storage region 210. For example, the metadata 216 can reference the chunk of data 202 and indicate that the chunk of data 202 contained only zero values, can indicate that the storage region 210 has been converted to be or comprise the sparse region 214, and/or can indicate the location of the storage region 210 or sparse region 214 in the file 212.

As another example, based at least in part on the analysis of the chunk of data 204, the ZCRC 128 can determine that bit 218 and bit 220 of the chunk of data 204 contain zero values and also can determine that bit 222 of the chunk of data 204 does not contain a zero value (e.g., contains a one value). In response to determining that bit 222 contains a non-zero value, the ZCRC 128 can determine that the chunk of data 204 does not contain only zero values and can terminate (e.g., abort) further analysis of the chunk of data 204 with regard to the zero chunk (e.g., block) removal process 200 without further analyzing the remaining bits (e.g., bit 224) of the chunk of data 204, since further analysis of the chunk of data 204 can be undesired (e.g., unnecessary and inefficient) due to it already being determined that the chunk of data 204 contains a bit (e.g., bit 222) that contains a non-zero value. As a result, the ZCRC 128 can determine that the chunk of data 204 is not to be removed from the write operation, in accordance with the zero chunk removal process 200. As another result, the DMC 120 can perform further analysis of the chunk of data 204 to determine whether an inline or post-process data deduplication process is to be performed on the chunk of data 204, as more fully described herein. As a further result, the amount of overhead (e.g., processing (e.g., computing) and time resource usage) associated with the zero chunk removal process 200 can be mitigated (e.g., reduced or minimized), since the zero chunk removal process 200 can be terminated upon a first occurrence upon identifying a non-zero value in a chunk of data (e.g., chunk of data 204).

The zero chunk removal process 200 can mitigate (e.g., reduce or minimize) undesired (e.g., unnecessary) writing of data chunks containing only zero values to the memory component 102, can mitigate undesired wear on the memory component 102 due to undesired writing of such data chunks, can mitigate the amount of storage space that is utilized to store data in the memory component 102, and/or can mitigate the amount of resources (e.g., processing resources, time resources, . . . ) utilized to process (e.g., write, read, maintain, . . . ) data associated with the memory component 102.

With further regard to FIG. 1, with regard to the remaining chunks of data of the write operation, the DMC 120 can determine whether inline or post-process data deduplication can be performed on any of the chunks of data of the write operation that remain after the zero chunk removal process has been performed. With regard to the remaining chunks of data for the write operation, the DMC 120 can generate hash values (e.g., fingerprints) for these chunks of data based at least in part on a desired hash algorithm, wherein the hash values (e.g., hashes) can be non-cryptographic hash values or cryptographic hash values depending on the hash algorithm employed. The hash algorithm can be a non-cryptographic hash algorithm or a cryptographic hash algorithm. For example, the hash algorithm can be a non-cryptographic hash algorithm that can be desirably fast in generating hash values and can exhibit desired cryptographic characteristics, even though it is not a cryptographically certified algorithm. In some embodiments, the hash algorithm can be employed in a software-based hashing implementation. In other embodiments, the hash algorithm can be employed in a hardware-based hashing implementation that can utilize certain hardware to facilitate running the hash algorithm to generate the hash values for the data chunks.

In some embodiments, the hash algorithm can be a CityHash algorithm (e.g., CityHash256 algorithm that can hash 256-bit hash codes, CityHash128 algorithm that can hash 128-bit hash codes, or CityHash64 algorithm that can hash 64-bit hash codes). The CityHash algorithm is a hash algorithm that can provide a desirable balance between performance (e.g., speed) and cryptographic characteristics (e.g., strength), even though it is a non-cryptographic algorithm. In other embodiments, the hash algorithm can be a secure hash algorithm (SHA) algorithm, such as the SHA-1 algorithm, SHA256 algorithm, SHA512 algorithm, or other type of SHA algorithm, a cyclic redundancy check (CRC) algorithm (e.g., 32-bit CRC algorithm), a proprietary hash algorithm, or other type of hash algorithm.

The system 100 also can comprise a memory index component 130 that can store respective hash values (HA), such as, for example, hash value 132, hash value 134, and hash value 136, generated by the DMC 120 and associated with respective chunks of data. The memory index component 130 can be part of or associated with (e.g., communicatively connected to) the DMC 120 and other components of the system 100. The DMC 120 can manage and maintain the memory index component 130 and the information stored therein. The stored hash values (e.g., 132, 134, 136) of the respective chunks of data can include stored hash values associated with chunks of data stored in the first data store 104, stored hash values associated with chunks of data stored in the second data store 112, hash values associated with chunks of data being written to the memory component 102, and/or hash values associated with chunks of data being read from the memory component 102. A hash value associated with a chunk of data being written to the memory component 102, or a hash value associated with a chunk of data being read from the memory component 102, can be referred to as a stored hash value when it is stored in the memory index component 130 in connection with processing such chunk of data. The stored hash values (e.g., 132, 134, 136) can be associated with (e.g., linked or mapped to) respective data-store identifiers (DS IDs), such as data-store identifier 138, data-store identifier 140, and data-store identifier 142. A data-store identifier (e.g., 138, 140, or 142) can be, for example, an FDS identifier (e.g., LIN/LBN pair) associated with a stored chunk of data that is stored in the first data store 104, an SDS identifier (e.g., SIN) associated with a stored chunk of data that is stored in the second data store 112, or a pending-update identifier (e.g., an FDS identifier, such as a LIN/LBN pair) associated with a chunk of data being written to the first data store 104 during the current write operation where the hash value and pending-update identifier associated with the chunk of data have been inserted (e.g., stored) in the pending updates set in the memory index component 130. In some embodiments, the hash values associated with chunks of data in the set of pending updates can be private with respect to the write operation.

The DMC 120 can utilize the stored hash values (e.g., 132, 134, 136) and respectively associated identifiers (e.g., 138, 140, 142) in the memory index component 130 to facilitate determining whether inline data deduplication is to be performed on a chunk of data being written to the memory component 102 (e.g., to remove that chunk of data from the write operation), whether post-process data deduplication is to be performed on a chunk of data being written to the memory component 102 (e.g., to remove the chunk of data from the memory component 102 because it is a duplicate of another chunk of data stored in the memory component 102), whether data deduplication is to be performed on a chunk of data that has been read from the memory component 102, or whether no data deduplication operation is to be performed.

Figure 3:
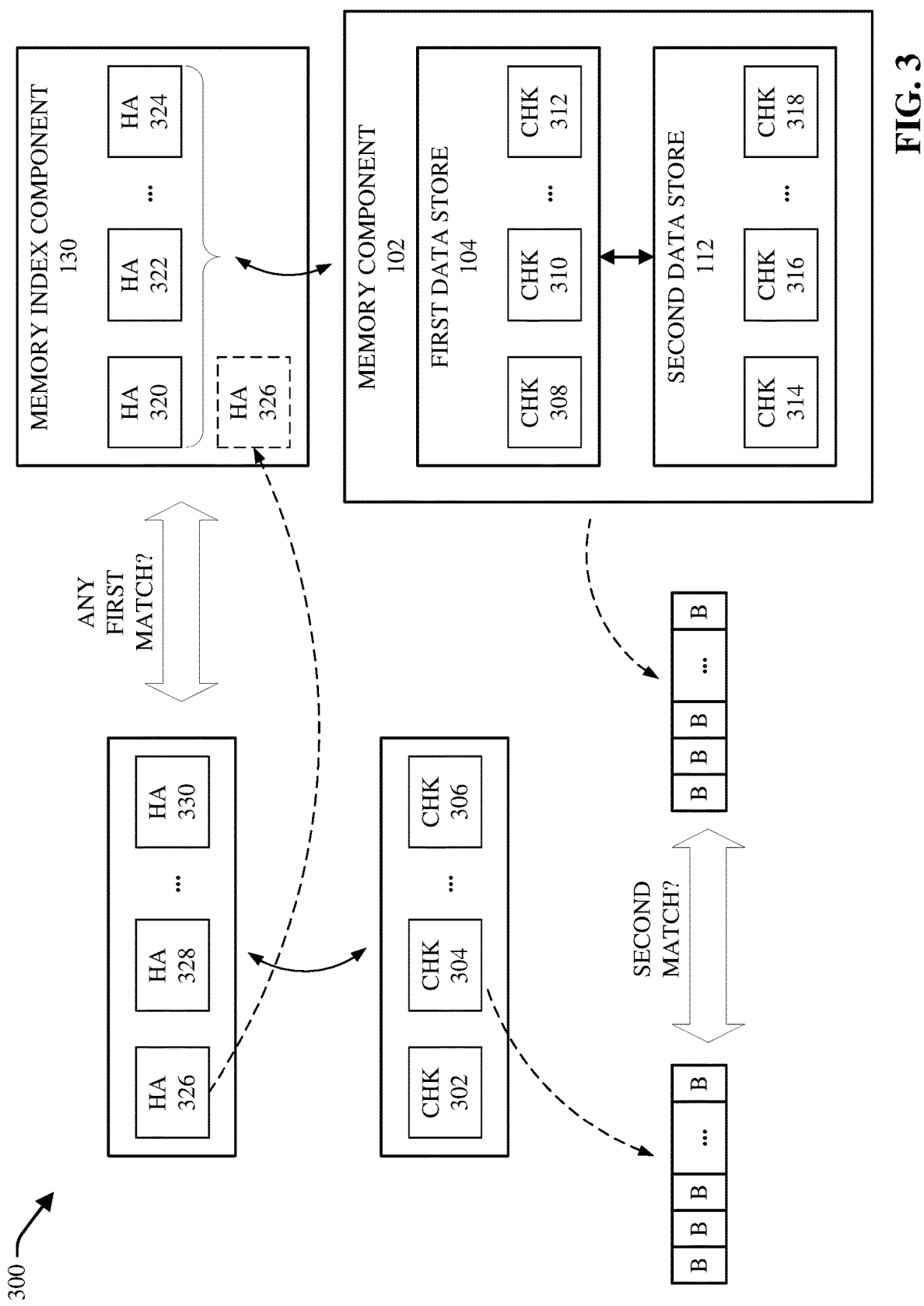
FIG. 3 illustrates a block diagram of an example check process that can be employed to determine whether a hash value associated with a chunk of data matches a stored hash value associated with a stored chunk of data or another chunk of data, and determine whether the chunk of data matches a stored chunk of data or another chunk of data, in accordance with various aspects and embodiments of the disclosed subject matter.

In connection with data deduplication determinations, the DMC 120 can perform checks to determine whether a hash value of a chunk of data of the write operation (or read operation) matches any stored hash values (e.g., 132, 134, 136) associated with any stored chunk of data in the memory component 102 or other chunk of data of the write or read operation, and, if there is a match, the DMC 120 or an agent component 144 (depending on the particular deduplication operation) can perform a byte-by-byte check to determine whether the chunk of data matches the stored chunk of data or other chunk of data associated with the stored hash value that matched the hash value associated with the chunk of data. Referring to FIG. 3 (along with FIG. 1), FIG. 3 illustrates a block diagram of an example check process 300 that can be employed to determine whether a hash value associated with a chunk of data matches a stored hash value associated with a stored chunk of data or another chunk of data, and determine whether the chunk of data matches a stored chunk of data or another chunk of data, in accordance with various aspects and embodiments of the disclosed subject matter. The example check process 300 will be described with regard to a write operation. The DMC 120 can employ a similar check process with respect to a read operation, in accordance with aspects and embodiments of the disclosed subject matter.

To illustrate the check process 300, there can be chunks of data (CHKs), such as chunks of data 302, 304, and 306, associated with a write operation; stored chunks of data, such as stored chunks of data 308, 310, and 312, that can be stored in the first data store 104; and stored chunks of data, such as stored chunks of data 314, 316, and 318, that can be stored in the second data store 112. Utilizing the desired hash algorithm, the DMC 120 can generate respective hash values (e.g., stored hash values), such as hash values 320, 322, and 324, for respective stored chunks of data (e.g., 308, 310, 312, 314, 316, 318, . . . ) or other chunks of data (e.g., other chunks of data associated with a write operation for which hash values have been generated and inserted into the memory index component 130). The stored hash values (e.g., 320, 322, 324) can be stored in the memory index component 130. Also, utilizing the desired hash algorithm, the DMC 120 can generate respective hash values, such as hash values 326, 328, and 330, for the respective chunks of data associated with the write operation. As a chunk of data (e.g., 302) is being processed by the DMC 120, the DMC 120 can insert (e.g., store) the hash value (e.g., 326) associated with the chunk of data (e.g., 302), as part of the set of pending updates, in the memory index component 130.

As part of the check process 300, in connection with the write operation, with regard to, for example, chunk of data 304, the DMC 120 can compare the hash value 328 associated with the chunk of data 304 to the stored hash values (e.g., 320, 322, 324, 326) stored in the memory index component 130 to determine whether the hash value 328 satisfies a defined match criterion with respect to the stored hash values (e.g., 320, 322, 324, 326). For example, the DMC 120 can query the memory index component 130 to determine whether the hash value 328 satisfies the defined match criterion (e.g., matches) with respect to the stored hash values (e.g., 320, 322, 324, 326). If, for example, the DMC 120 determines that the hash value satisfies the defined match criterion with respect to stored hash value 322 associated with, for purposes of this example, stored chunk of data 316, at a desired point in the check process 300, the DMC 120 or the agent component 144 can perform a byte-by-byte check on the chunk of data 304 and the stored chunk of data 316 to determine whether the chunk of data 304 satisfies a second defined match criterion with respect to the stored chunk of data 316 (e.g., determine whether each of the bytes of data (B) of the chunk of data 304 match each of the corresponding bytes of data of the stored chunk of data 316 byte-for-byte).

As more fully described herein, the DMC 120 can determine the type of data deduplication operation (e.g., inline or post-process), if any, to perform based at least in part on the type of match a hash value associated with a chunk of data of the write operation has with a stored hash value in the memory index component 130. The DMC 120 (or agent component 144) can determine whether the particular type of data deduplication operation is to continue to be performed and completed based at least in part on whether the chunk of data satisfies the second defined match criterion with respect to the stored or other chunk of data associated with the stored hash value that matched the hash value, or based at least in part on another factor, as more fully described herein.

Figure 4:
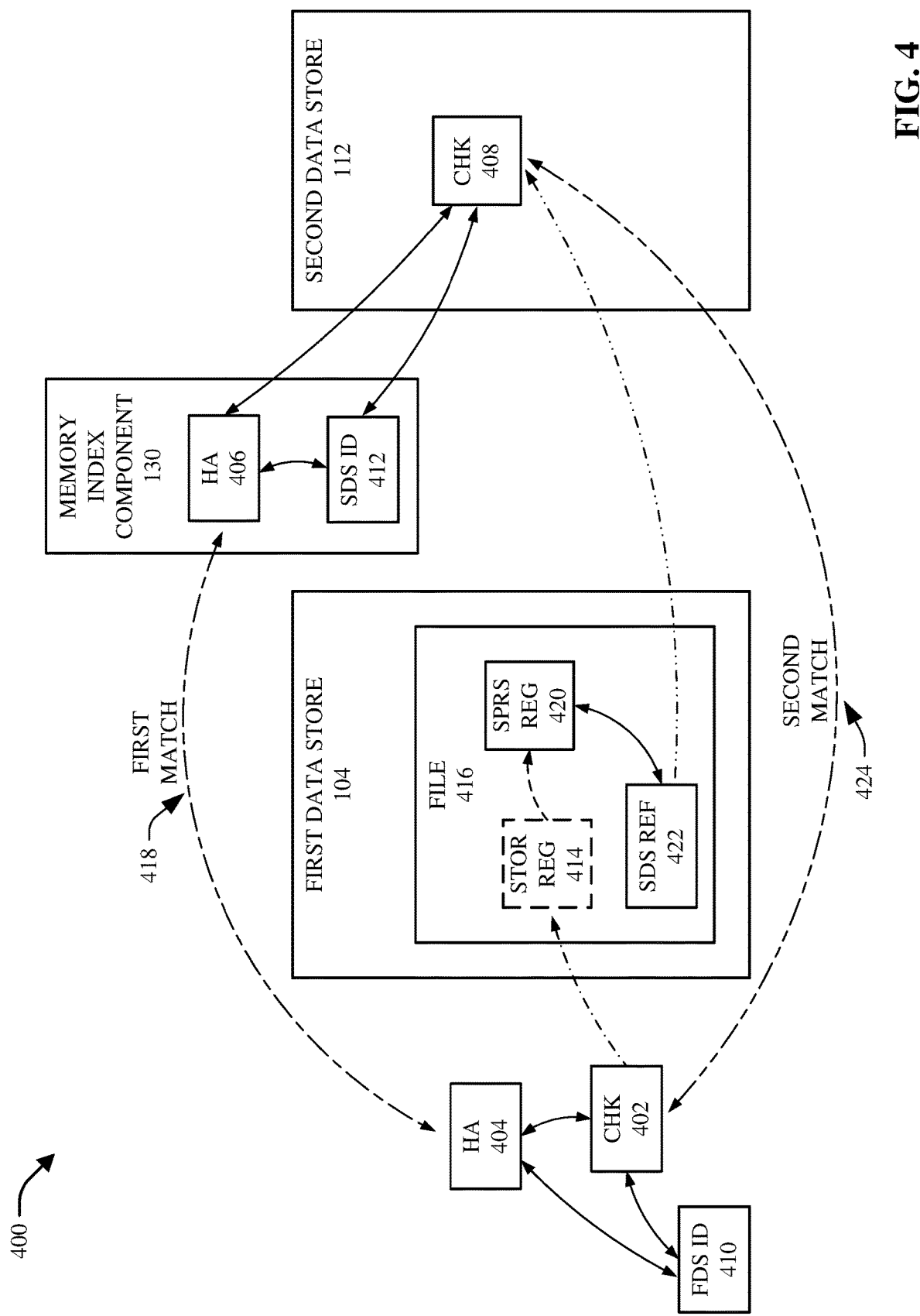
FIG. 4 depicts a block diagram of an example inline data deduplication process, in accordance with various aspects and embodiments of the disclosed subject matter.

Turning to FIG. 4 (along with FIG. 1), FIG. 4 depicts a block diagram of an example inline data deduplication process 400, in accordance with various aspects and embodiments of the disclosed subject matter. For a chunk of data 402 of the write operation, the DMC 120 can compare (e.g., via a query) the hash value 404 associated with that chunk of data 402 to stored hash values that are stored in the memory index component 130 and are associated with stored chunks of data stored in the first data store 104 or the second data store 112 (e.g., shadow store), or other chunks of data being written during the current write operation (e.g., stored hash values associated with chunks of data in the set of pending updates). The stored hash values can comprise stored hash value 406 associated with stored chunk of data 408, which can be stored in the second data store 112.

The chunk of data 402 and its associated hash value 404 can be associated with an FDS identifier (FDS ID) 410 (e.g., an LIN/LBN pair). The stored chunk of data 408 and its associated stored hash value 406 can be associated with an SDS identifier (SDS ID) 412 (e.g., a SIN). As part of the write operation, the chunk of data 402 initially can be set to be written to a storage region (STOR REG) 414, in or associated with a file 416 (e.g., native file), in the first data store 104.

Based at least in part on the comparison result, the DMC 120 can determine that the hash value 404 satisfies a defined match criterion (e.g., matches) with respect to the stored hash value 408 (as depicted at reference numeral 418). In response to determining that the hash value 404 satisfies the defined match criterion (e.g., matches) with respect to the stored hash value 408 associated with the SDS identifier 412, the DMC 120 can initially consider inline data deduplication to be a potential data deduplication option. In some embodiments, the DMC 120 can analyze an SDS block reference count (also can be referred to as SDS chunk reference count) associated with the SDS identifier 412 of the stored chunk of data 408 to determine whether the SDS block reference count is at a maximum block reference value (also can be referred to as maximum chunk reference value). In accordance with such embodiments, there can be a maximum number of block references that can be made to a stored chunk of data stored in the second data store 112. The maximum number of block references can be virtually any desired number (e.g., 1, 10, 100, 1000, 10000, 20000, 30000, or another desired number greater than or less than 30000).

In response to determining that the SDS block reference count associated with the stored chunk of data 408 is at the maximum block reference value based at least in part on the analysis, the DMC 120 can determine that inline data deduplication cannot be performed with respect to the chunk of data 402. In such instance, the DMC 120 can determine that the chunk of data 402 is to be written to the storage region 414, in or associated with the file 416, in the first data store 104. Upon a successful transaction commit with regard to the writing of the chunk of data 402, the DMC 120 can insert the hash value 404 and associated FDS identifier 410 (e.g., LIN/LBN pair) to the memory index component 130 (e.g., into the set of pending updates in the index table in the memory index component 130).

In response to determining that the SDS block reference count associated with the stored chunk of data 408 is less than the maximum block reference value based at least in part on the analysis, the DMC 120 can determine (at least can initially determine) that inline data deduplication can be performed to remove the chunk of data 402 from the write operation and not write that chunk of data 402 to the storage region 414 in the first data store 104. The DMC 120, employing the deduplication component 126, can perform, or at least can initiate performing, the inline data deduplication to remove the chunk of data 402 from the write operation, and can schedule and/or facilitate performing an operation to convert the storage region 414 (e.g., block) in the file 416 to a sparse region (SPRS REG) 420 and an operation to insert an SDS reference value (SDS REF) 422 (e.g., a shadow reference value) in the file 416, wherein the SDS reference value 422 can identify and refer to the storage location of the stored chunk of data 408 in the second data store 112. The data deduplication component 126 also can initiate a prefetch of the stored chunk of data 408 from the second data store 112 to enable a byte-by-byte check between the chunk of data 402 and stored chunk of data 408 to be performed.

In some embodiments, the DMC 120, employing the data deduplication component 126 and/or the agent component 144 also can perform or facilitate performing the byte-by-byte comparison of the chunk of data 402 and the stored chunk of data 408 to determine whether the chunk of data 402 satisfies the second defined match criterion (e.g., matches) with respect to the stored chunk of data 408 byte for byte. If the data deduplication component 126 or agent component 144 determines that the chunk of data satisfies the second defined match criterion with respect to the stored chunk of data 408 (as depicted at reference numeral 424), the data deduplication component 126 or agent component 144 can determine that the inline data deduplication with regard to the chunk of data can continue to be performed and completed.

If, instead, the data deduplication component 126 or agent component 144 determines that the chunk of data 402 does not satisfy the second defined match criterion with respect to the stored chunk of data 408 byte for byte, the DMC 120 (e.g., the data deduplication component 126) or the agent component 144 (e.g., as managed by the DMC 120) can determine that the inline data deduplication with regard to the chunk of data 402 is not to be performed or completed, and the DMC 120 can terminate the inline data deduplication operation with regard to the chunk of data 402. In certain embodiments, in response to determining that the inline data deduplication is to be terminated, the DMC 120 can remove the SDS identifier 412 associated with the stored chunk of data 408 from the memory index component 130 and can perform an operation restart (oprestart) to restart the late write operation associated with the inline data deduplication process 400 to write the chunk of data 402 (and any other chunk of data that failed its byte-for-byte data check) to the memory component 102 (e.g., first data store 104 in the memory component 102), as more fully described herein. In other embodiments, alternatively, in response to determining that the inline data deduplication is to be terminated, the DMC 120 can initiate a second write operation to write the chunk of data 402 (and any other chunk of data that failed its byte-for-byte data check) to the memory component 102, as more fully described herein. It is to be appreciated and understood that, in various other embodiments, the DMC 120 can perform the byte-by-byte check of the chunk of data 402 with the stored chunk of data 408, prior to determining that inline data deduplication can be performed and initiating performance of the inline data deduplication of the chunk of data 402 to facilitate avoiding having to terminate an inline data deduplication operation, performing an operation restart, and/or initiating a second write operation to write the chunk of data 402 to the memory component 102.

Figure 5:
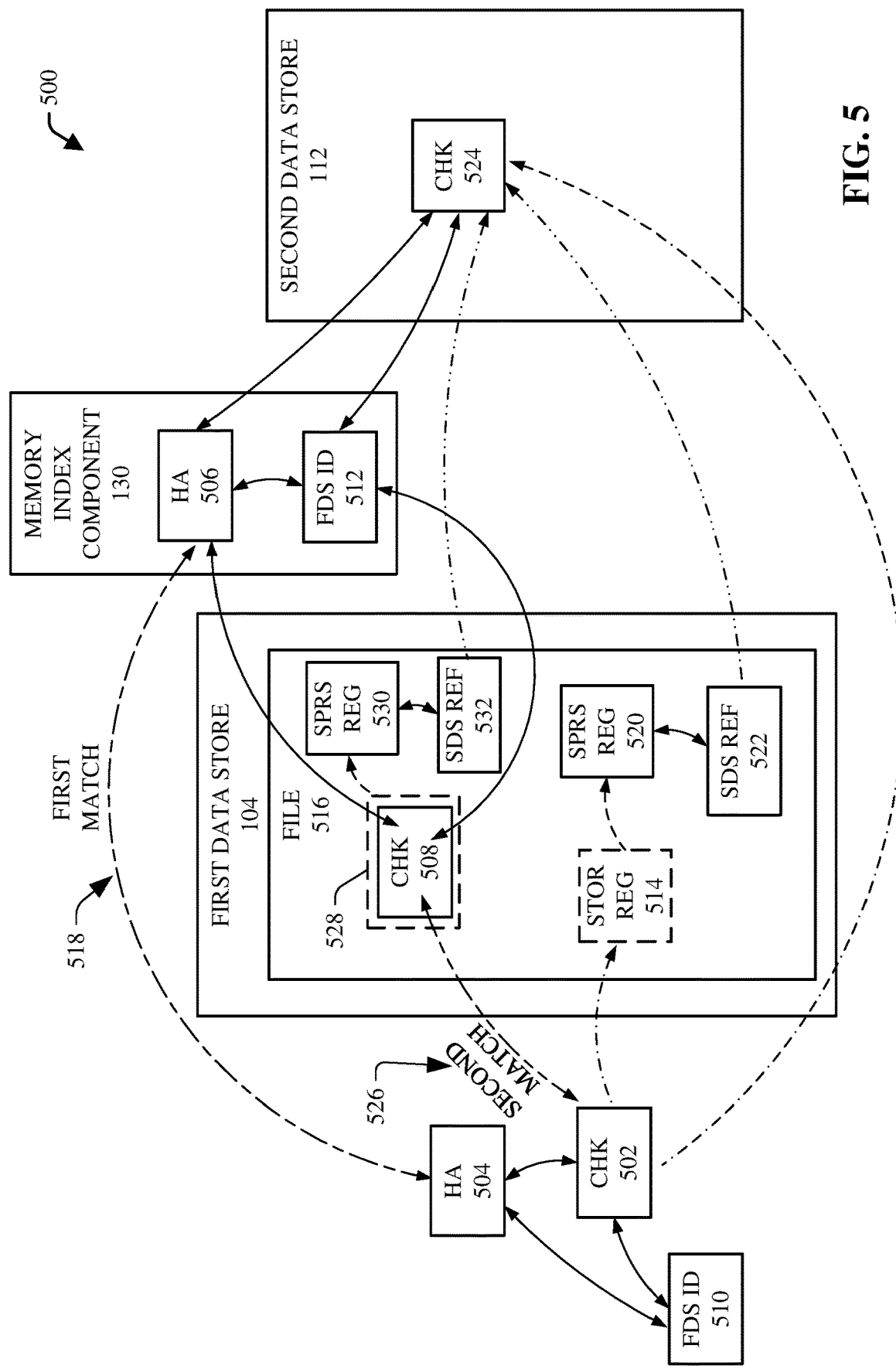
FIG. 5 illustrates a block diagram of an example post-process data deduplication process, in accordance with various aspects and embodiments of the disclosed subject matter.

Referring to FIG. 5 (along with FIG. 1), FIG. 5 illustrates a block diagram of an example post-process data deduplication process 500, in accordance with various aspects and embodiments of the disclosed subject matter. For a chunk of data 502 of a write operation, the DMC 120 can compare (e.g., via a query) the hash value 504 associated with that chunk of data 502 to stored hash values that are stored in the memory index component 130 and are associated with stored chunks of data stored in the first data store 104 or the second data store 112, or other chunks of data being written during the current write operation (e.g., stored hash values associated with chunks of data in the set of pending updates). The stored hash values can comprise stored hash value 506 associated with stored chunk of data 508, which can be stored in the first data store 104.

The chunk of data 502 and its associated hash value 504 can be associated with an FDS identifier 510 (e.g., an LIN/LBN pair). The stored chunk of data 508 and its associated stored hash value 506 can be associated with an FDS identifier 512 (e.g., an LIN/LBN pair). As part of the write operation, the chunk of data 502 initially can be set to be written to a storage region 514, in or associated with a file 516, in the first data store 104. It is to be appreciated and understood that, while the stored chunk of data 508 is depicted as being part of the file 516 in the first data store 104, alternatively, the stored chunk of data 508 can be stored in a different storage location (e.g., a different storage location in a different file) in the first data store 104.

Based at least in part on the comparison result, the DMC 120 can determine that the hash value 504 satisfies a defined match criterion (e.g., matches) with respect to the stored hash value 506 (as depicted at reference numeral 518). In response to determining that the hash value 504 satisfies the defined match criterion (e.g., matches) with respect to the stored hash value 506 associated with the FDS identifier 512, the DMC 120 can determine (at least can initially determine) that post-process data deduplication can be performed. As part of the post-process data deduplication operation, the DMC, employing the data deduplication component 126, can remove the chunk of data 502 from the write operation. The DMC 120, employing the data deduplication component 126, also can punch or initiate punching the chunk (e.g., block) from the file 516 (e.g., convert the storage region 514 in the file 516 to a sparse region 520), insert or initiate inserting an SDS reference value (SDS REF) 522 (e.g., shadow reference) relating to the chunk of data 502 and the sparse region 520 into the file 516 stored in the first data store 104, and redirect or initiate redirecting the chunk of data 502 to write the chunk of data 502 to a storage location 524 in the second data store 112, wherein such SDS reference value 522 can identify and refer to the storage location 524 of the chunk of data 502 stored in the second data store 112. The DMC 120 also can schedule or queue other operations (e.g., asynchronous post-process operations), such as, for example, a byte-by-byte check operation, to be performed with respect to the chunk of data 502.

In connection with this post-process data deduplication, the DMC 120 (e.g., employing the data deduplication component 126) or the agent component 144 can perform a byte-by-byte check (e.g., comparison) of the chunk of data 502 to the stored chunk of data 508 associated with the FDS identifier 512 to determine or confirm whether the chunk of data 502 satisfies the second defined match criterion with respect to the stored chunk of data 508 (e.g., whether the chunk of data 502 matches the stored chunk of data 508 byte for byte). If the DMC 120 or the agent component 144 determines that the chunk of data satisfies the second defined match criterion with respect to the stored chunk of data 508 byte for byte (as depicted at reference numeral 526), the DMC 120 or the agent component 144 can determine that this post-process data deduplication with regard to the chunk of data 502 can continue to be performed and completed. The DMC 120 or agent component 144 can convert the storage location 528 where the stored chunk of data 508 associated with the FDS identifier 512 is stored in the first data store 104 (e.g., in the file 516 in the first data store 104) to a sparse region 530, and can replace that stored chunk of data 508 with an SDS reference value 532 associated with the sparse region 530, wherein the SDS reference value 532 can reference or indicate the storage location in the second data store 112 where the chunk of data 524 (e.g., matching chunk of data) is stored. If, instead, the DMC 120 or the agent component 144 determines that the chunk of data 502 does not satisfy the second defined match criterion with respect to the stored chunk of data 508 byte for byte, the DMC 120 or the agent component 144 can determine that this post-process data deduplication is not to be performed or completed, and the DMC 120 or the agent component 144 can terminate this post-process data deduplication operation with regard to the chunk of data 502.

In some embodiments, in response to determining that this post-process data deduplication is to be terminated, the DMC 120 can initiate a second write operation to write the chunk of data (and any other chunk of data that failed its byte-for-byte data check during the post-process data deduplication operations) to the first data store 104 in the memory component 102. It is to be appreciated and understood that, in other embodiments, the DMC 120 can perform the byte-by-byte check of the chunk of data 502 with the stored chunk of data 508, prior to determining that post-process data deduplication can be performed and initiating performance of the post-process data deduplication of the chunk of data 502 to facilitate avoiding having to terminate a post-process data deduplication operation and/or initiating a second write operation to write the chunk of data 502 to the memory component 102.

With further regard to FIG. 1, in still other embodiments, the DMC 120 can perform or initiate performance of post-process data deduplication, or alternatively, inline data deduplication, with regard to a hash value associated with a chunk of data that matches a stored hash value associated with another chunk of data associated with the current write operation. For a chunk of data of the write operation, the DMC 120 can compare (e.g., via a query) the hash value associated with that chunk of data to stored hash values (e.g., 132, 134, 136) that are stored in the memory index component 130 and are associated with stored chunks of data (e.g., 106, 108, 110, 114, 116, 118) stored in the first data store 104 or the second data store 112 (e.g., shadow store), or are associated with other chunks of data being written during the current write operation (e.g., stored hash values associated with chunks of data in the set of pending updates). For this example, the stored hash values can comprise the stored hash value 134 that can be associated with another chunk of data that, along with the chunk of data, is part of the current write operation, wherein the DMC 120 has processed the other chunk of data at least to the point where the stored hash value 134 and its associated pending-update identifier (e.g., an FDS identifier, such as an LIN/LBN pair) have been stored in the pending updates set in the memory index component 130. As part of the write operation, the chunk of data initially can be set to be written to a storage location, in or associated with a file (e.g., native file), in the first data store 104.

In response to the DMC 120 determining that the hash value associated with the chunk of data satisfies the defined match criterion with respect to the stored hash value 134 associated with the other chunk of data and determining that the stored hash value 134 is associated with the pending-update identifier in the pending updates set (e.g., associated with the current write operation) in the memory index component 130, wherein the pending-update identifier can identify that the stored hash value 134 and associated other chunk of data are associated with the current write operation, the DMC 120 can determine that inline data deduplication is not to be performed, and can further determine that post-process data deduplication potentially can be an option. The DMC 120 can perform a byte-by-byte check (e.g., comparison) of the chunk of data to the other chunk of data to determine or confirm whether the chunk of data satisfies the second match criterion with respect to the other chunk of data byte for byte.

If it is determined that the chunk of data does not satisfy the second defined match criterion with respect to the other chunk of data, the DMC 120 can determine that the post-process data deduplication cannot be performed. Accordingly, the DMC 120 treat the chunk of data and the other chunk of data as if their respective hash values do not match, and the DMC 120 can manage the writing of the chunk of data and the other chunk of data to have the write component 122 write the chunk of data and the other chunk of data to their respective storage locations in the file in the first data store 104.

If, instead, the DMC 120 determines that the chunk of data satisfies the second defined match criterion with respect to the other chunk of data, the DMC 120 can determine that post-process data deduplication can be performed with respect to the chunk of data and other chunk of data. Accordingly, as part of the post-process data deduplication process, the DMC 120, employing the data deduplication component 126, can remove the chunk of data and the other chunk of data from the write operation. The DMC 120 also can initiate separate operations (e.g., asynchronous operations) to schedule (and perform) an operation to punch both chunks (e.g., both blocks) from the file (e.g., convert the storage regions (e.g., blocks) in the file to sparse regions), an operation to insert respective SDS reference values (e.g., respective shadow references) relating to the respective chunks of data and respective sparse regions into the file stored in the first data store 104, and an operation to redirect the chunk of data (or other chunk of data) to write the chunk of data (or other chunk of data) to the second data store 112, wherein such SDS reference values can identify and refer to the location of the chunk of data (or other chunk of data) written to and stored in the second data store 112. The DMC 120 can employ the agent component 144 to perform such operations to punch both blocks from the file (e.g., convert the storage regions (e.g., blocks) in the file to sparse regions), insert the respective SDS reference values relating to the respective chunks of data and respective sparse regions into the file stored in the first data store 104, and redirect the chunk of data (or other chunk of data) to write the chunk of data (or other chunk of data) to the second data store 112, wherein the write component 122 can perform such writing of the chunk of data (or other chunk of data) to the second data store 112.

Alternatively, in yet other embodiments, in response to the DMC 120 determining that the hash value associated with the chunk of data satisfies the defined match criterion with respect to the stored hash value 134 associated with the other chunk of data and determining that the stored hash value 134 is associated with the pending-update identifier in the pending updates set (e.g., associated with the current write operation) in the memory index component 130, the DMC 120 can determine (or at least can initially or provisionally determine) that inline data deduplication can be performed to remove the chunk of data and the other chunk of data from the write operation and not write that chunk of data and other chunk of data to the file in the first data store 104. The DMC can perform a byte-by-byte check (e.g., comparison) of the chunk of data to the other chunk of data to determine or confirm whether the chunk of data satisfies the second defined match criterion with respect to the other chunk of data byte for byte.

If it is determined that the chunk of data does not satisfy the second defined match criterion with respect to the other chunk of data, the DMC 120 can determine that the inline data deduplication cannot be performed. Accordingly, the DMC 120 treat the chunk of data and the other chunk of data as if their respective hash values do not match, and the DMC 120 can manage the writing of the chunk of data and the other chunk of data to have the write component 122 write the chunk of data and the other chunk of data to their respective storage locations in the file in the first data store 104.

If, instead, the DMC 120 determines that the chunk of data satisfies the second defined match criterion with respect to the other chunk of data, the DMC 120 can determine that inline data deduplication can be performed with respect to the chunk of data and other chunk of data. The DMC 120, employing the data deduplication component 126, can perform the inline data deduplication to remove the chunk of data and the other chunk of data from the write operation, schedule an operation to convert the respective storage regions (e.g., blocks) in the file where the chunk of data and the other chunk of data were to be written to sparse regions, redirect the chunk of data to have it written to a storage location in the second data store 112, and schedule an operation to insert SDS reference values (e.g., shadow store references) as metadata in the file, wherein the SDS reference values be respectively associated with the sparse regions and can identify and refer to the storage location of the chunk of data stored in the second data store 112. The DMC 120 can employ the agent component 144 to perform such operations to convert the storage regions in the file to sparse regions, insert the respective SDS reference values relating to the respective chunks of data and respective sparse regions into the file stored in the first data store 104, and redirect the chunk of data to write the chunk of data to the second data store 112, wherein the write component 122 can perform such writing of the chunk of data to the second data store 112.

In other embodiments, if, however, the DMC 120 determines that the hash value associated with the chunk of data does not satisfy the defined match criterion (e.g., does not match) with respect to any of the stored hash values (e.g., 132, 134, 136) in the memory index component 130, the DMC 120 can determine that no inline deduplication operation or post-process deduplication operation is to be performed with respect to the chunk of data, and the DMC 120 can add the chunk of data, the hash value, and associated identifier (e.g., LIN/LBN pair) associated with the chunk of data to the set of pending updates to be processed on successful transaction commit for the write operation or at least that portion of the write operation.

The system 100 also can perform data deduplication in connection with read operations. With regard to a read operation, during the read operation, the DMC 120 can index chunks of data being read from the memory component 102 to facilitate identifying whether duplicate data has been read from the memory component 102. For instance, the DMC 120 can generate respective hash values for respective chunks of data based at least in part on the desired hash algorithm. The DMC can store the respective hash values in the memory index component 130. The DMC 120 can analyze hash values (e.g., 132, 134, 136), including the respective hash values associated with the read operation, that are stored in the memory index component 130. If the DMC 120 identifies two (or more) hash values in the memory index component 130 that satisfy the defined match criterion (e.g., identify two (or more) hash values that match each other), the DMC 120 can determine that post-process data deduplication potentially can be an option.

Accordingly, the DMC 120 can perform a byte-by-byte comparison of the two (or more) chunks of data associated with the two (or more) hash values to determine whether the two (or more) chunks of data satisfy the second defined match criterion (e.g., match byte for byte). In response to determining that the two (or more) chunks of data do not satisfy the second defined match criterion, the DMC 120 can determine that post-process data deduplication is not to be performed with respect to the two (or more) chunks of data. If, instead, the DMC 120 determines that the two (or more) chunks of data satisfy the second defined match criterion, the DMC 120 can determine that post-process data deduplication can be performed with respect to the two (or more) chunks of data, and accordingly, can generate a deduplication request to perform post-process data deduplication with respect to the two (or more) chunks of data to remove one (or more) of the duplicated chunks of data from the first data store 104 of the memory component 102. The data deduplication request can comprise information, such as the respective identifiers (e.g., FDS identifier or SDS identifier) associated with the duplicate chunks of data, to facilitate identifying the respective storage locations of the duplicate chunks of data (the two (or more) chunks of data) in the first data store 104 or second data store 112 in the memory component 102.

In response to the deduplication request, the agent component 144 (e.g., an asynchronous worker component) of or associated with the DMC 120 can perform the data deduplication of the deduplication request to remove the duplicate chunk(s) of data from the first data store 104 or second data store 112 in the memory component 102. With regard to each duplicate chunk of data of the two (or more) chunks of data, the agent component 144 (e.g., as managed by the DMC 120) can convert the storage location (e.g., block) in the file (e.g., wherein the duplicate chunk of data was stored) in the first data store 104 to a sparse region, and can insert (e.g., insert and store) a reference value (e.g., shadow store reference value) as metadata in the file from which such chunk(s) of data was deduplicated (e.g., removed or deleted) to indicate the storage location in the second data store 112 where the corresponding chunk of data (e.g., of the two (or more) chunks of data) is located, wherein the reference value can be associated with (e.g., linked or mapped to) the sparse region in the file.

With further regard to FIG. 1 and the system 100, in some embodiments, the inline deduplication process employed by the DMC 120 can use a global policy to be effective (e.g., utilized or employed) for all files that are not specifically exempted or override this policy with their own per-file policy. Setting the policy on existing files can be accomplished via command line tools or via a desired (e.g., SmartPools) file policy filter. In certain embodiments, the system 100 can provide a user interface (e.g., a web interface, such as a WebUI interface) for enabling or disabling the inline data deduplication service. The ability to specifically select a group of files can be desirable, for example, for testing and development. In other embodiments, the inline deduplication process employed by the DMC 120 can use a per-file policy or per-file-type policy.

The disclosed subject matter can utilize a "no deduplication" ("no dedupe") attribute (e.g., Mode attribute) can be used to prevent a file from being part of a deduplication operation. The DMC 120 or another component can check this flag when a file is sampled for deduplication candidates (e.g., data chunks that can be candidates for data deduplication) and when a deduplication request is issued. The flag typically can be set by an undeduplication (undedupe) job. With respect to inline deduplication, the DMC 120 can honor this flag and bypass inline deduplication for files with this "no dedupe" attribute set. This flag can override the inline deduplication policy for this file.

The disclosed subject matter also can employ a "deduplication was sampled" ("dedupe was sampled") Mode attribute that the DMC 120 or another component of the system 100 can use to indicate that a file has been sampled by the deduplication (dedupe) job. The "dedupe was sampled" Mode attribute can be part of an archive set of attributes that can be cleared when the file is written to or truncated to zero.

If a deduplication operation fails for any reason, the DMC 120 can explicitly unset (e.g., turn off) this "dedupe was sampled" attribute to allow the file(s) to be resampled. With regard to inline deduplication, the DMC 120 typically will not set or check this flag although the option to set the flag can be available to the DMC 120 if, for example, a single write operation successfully deduplicates the entire file.

In some embodiments, each file of the file system can have an attribute to describe whether inline deduplication will be applied or not by the DMC 120 and other components of the system 100. This attribute can be set to on or off (e.g., by the DMC 120 based on input information received from a user), and if this attribute is set to off, it can override the global default policy (e.g., when the global default policy is to apply inline deduplication). For a file to be involved in inline deduplication, both the global policy and the file policy associated with the file, if set, have to be enabled. The per-file inline deduplication policy of the file can be set (e.g., by the DMC 120) at file creation time via file directory inheritance if the parent file directory has the attribute set.

In some embodiments, the disclosed subject matter can exclude certain types of files from inline data deduplication, in accordance with the defined data management criteria. For example, certain log files (e.g., endurant cache (EC) log files), files and data stored in the second data store 112 (e.g., shadow stores), MLI index files (e.g., index files that are associated with another data deduplication feature (e.g., SmartDedupe) that can be employed by the system 100, and/or other types of file for which inline data deduplication is not desired or not sufficiently useful.

The DMC 120 can recognize the certain types of files that are to be excluded from inline data deduplication based at least in part on the information (e.g., file extensions, tags, or flags) that can indicate the respective types of files. With regard to other types of files (e.g., regular files), if it is desired to exclude other files or other types of files from the inline data deduplication process, such other files or other types of files can be tagged with the "no dedupe" attribute to exclude such other files or other types of files from the inline data deduplication process. The DMC 120 can receive information (e.g., from a user via an interface) selecting the "no dedupe" attribute with respect to a particular file or particular type of file. In response, the DMC 120 can set the "no dedupe" attribute with respect to the particular file or particular type of file to exclude particular file or particular type of file from the inline data deduplication process.

As disclosed herein, the system 100 can perform zero chunk (e.g., block) removal to remove data chunks of a write operation that contain only zero values. For instance, the ZCRC 128 can detect data chunks of a write operation that contain only zero values and can remove them from the write operation to prevent such data chunks (e.g., zero blocks) from being written to the memory component 102 (e.g., the first data store 104 of the memory component 102). This can reduce the amount of memory space utilized to store data and can mitigate (e.g., reduce or prevent) undesirable wear on the memory component 102 (e.g., flash memory) that would otherwise occur due to unnecessary write operations. It is not necessary to specially handle files that are known to contain zero regions by using tools that can bypass writes for zeroed blocks.

The ZCRC 128 can perform zero chunk removal before inline data deduplication operations are performed, and as a result, the zero chunk removal can have the potential to reduce the amount of work that has to be performed by the data deduplication component 126 with respect to data deduplication operations (e.g., inline data deduplication operations) and the compression component (not shown in FIG. 1) with regard to data compression operations. The check for zero data values in a chunk of data by the ZCRC 128 can incur some overhead, however, to facilitate reducing or minimizing the overhead, with regard to data chunks that contain non-zero data, the ZCRC 128 can abort further analysis of a data chunk containing non-zero data upon the first detection of non-zero data in the data chunk.

The ZCRC 128 can employ a zero block allocator that can be applied to partially written blocks that are currently sparse in the memory component 102 (e.g., sparse on disk). The unwritten portion of the block can be filled with zeros (e.g., zero values) when the block is written out so, if the written portion is also zeros, the ZCRC 128 can drop (e.g., abandon or discontinue) this part of the write operation.

In some embodiments, the ZCRC 128 can check data (e.g., data in chunks of data) as it arrives in a write system call and can flag coalescer regions and/or block allocation manager (bam) objects with a flag that can indicate that the data is known to be zeros or is known to be non-zero. This can reduce the amount of effort utilized during the write operation to detect zero chunks of data.

With regard to zero chunk removal and data deduplication operations, the DMC 120 can punch blocks in files to facilitate creating sparse regions in the files. For instance, the DMC can punch a block in a file, wherein punching the block can be the process of converting a block within the file to a sparse region. Such punching of the block can be performed when the current extent for the block is not already sparse, and it does not have to be performed with regard to a region of the block that already is sparse. The DMC 120 can utilize this punching block operation to punch a block in a file when a block full of zero values is being written to the memory component 102 or when the DMC 120 intends to insert an SDS reference value (e.g., a shadow reference) at the location of the block.

In some embodiments, during write operations, the zero chunk (e.g., block) removal process and the inline data deduplication process will not be applied to writes of chunks of data to the second data store 112 (e.g., shadow stores). Writes of data chunks to the second data store 112 also can bypass the snapshot copy on write (COW) code as well, and can go direct to bam safe write (BSW).

In some embodiments, the inline deduplication process can be situated above the write process (e.g., BSW) in the system architecture. If the inline deduplication process sits above the write process, the DMC can provide a block mask of blocks to be punched to the write operation (e.g., the BSW_WRITE operation) and can have it process the block mask of blocks at the same time as the write request. This can be better than issuing a separate write zero operation (e.g., a BSW_WRITE_ZERO operation) prior to the write operation since it can avoid a second pass through the BSW and additional forward error correction (FEC) computations associated with the write.

In other embodiments, the inline deduplication process can be situated inside the write process (e.g., BSW process) in the system architecture. If the inline deduplication process is situated inside the write process, the DMC 120 can have direct access to the new layout, and can overwrite mask block mask and safe_block info structures so the DMC 120 can setup the zero write directly.

The system 100 can implement data deduplication, including inline data deduplication, in a variety of different ways, in accordance with various aspects and embodiments of the disclosed subject matter. The DMC 120, when implementing inline data deduplication, can intercept write requests in order to detect and remove redundant writes of data and/or to redirect writes of data to the second data store 112 (e.g., shadow stores).

One desirable location in the write path for the DMC 120 to implement inline data deduplication can be between the COW and BSW. This can be done after COW construction, but above where the system 100 processes each of the individual data stores (e.g., safe write information pointers (SWIPs)). Data that is being redirected to the second data store 112 can be integrated into a write operation as another data-store item (e.g., native file, snapshot file, or shadow store). One advantage of performing inline data deduplication at this level can be that the data can be logically separated for each of the individual data stores (e.g., SWIPs).

There are some other options as to where in the write path the DMC 120 can perform inline data deduplication. For example, another location in the write path for the DMC 120 to implement inline data deduplication can be just above snapshot COW code. At this level, the DMC 120 will have to track blocks (e.g., chunks of data) removed from the write request with a blockmask and feed that information (e.g., tracking information regarding such blocks) into the overwrite blockmask used by COW so the overwrite blockmask can be aware of the blocks that have been removed from the write operation. Also, the DMC 120 can use that blockmask in BSW to punch holes. A potential disadvantage of performing inline data deduplication in this location (e.g., just above snapshot COW code) can be that inline data deduplication is not able to be applied to a snapshot file. If it is not desired to apply inline data deduplication to snapshot files (e.g., the deduplication job generally does not), this approach can be feasible.

In some embodiments, another location in the write path for the DMC 120 to implement inline data deduplication can be at the top level of BSW where the individual data stores have already been created. At this level, with regard to the DMC 120 redirecting writes of data chunks, the redirected writes of data to the second data store 112 (e.g., shadow stores) can become nested BSW operations and errors returned from these write operations potentially may not make sense to the layers above (e.g., ENEEDLOCK from a shadow store write typically is not expected, since the native file is locked exclusively). This issue can make it relatively difficult to restart the write operation to write data to the second data store 112 without restarting the entire write operation.

In certain embodiments, all the code paths that desire to apply zero chunk (e.g., block) removal and inline data deduplication can go through the coalescer (including coalescer writearound) (not shown in FIG. 1) of the system 100. In some embodiments, the DMC 120 will process full block overwrites with regard to zero chunk removal and inline data deduplication, and partial blocks can be bypassed by the DMC 120 with regard to zero chunk removal and inline data deduplication. The DMC 120 does not have to intercept write operations going to the second data store 112.

With regard to the processes and approaches employed by the DMC 120 and other components of the system 100 to perform inline data deduplication, the design approach and process approach for inline data deduplication can be to reduce or limit the work performed in the context of the write operation to a desirable degree (e.g., to the minimum or substantially the minimum) and defer work that can be done separately to an asynchronous worker process.

With regard to read operations, the DMC 120 can hash data chunks in a read operation and the results (e.g., hash values) can be inserted into the memory index component 130 (e.g., inserted into the index table in the memory index component 130). In some embodiments, the DMC 120 can perform hashing of the data chunks to generate hash values during prefetch, which can keep the additional work of hashing out of the read path and mitigate impact on performance that can result of performing the hashing on data chunks. In certain embodiments, if the DMC 120 identifies, in the memory index component 130, a first hash value of a first chunk of data (e.g., chunk of data associated with the read operation) that is a match to a second hash value of a second chunk of data, the DMC 120 can pass information (e.g., the hash values, the chunk of data, identifiers, and/or other information) regarding the pair of hash values onto the agent component 144, wherein the agent component 144 can perform an asynchronous worker process to perform data deduplication (e.g., post-process data deduplication) on the chunk of data, as more fully described herein.

With further regard to write operations, the DMC 120 can break up (e.g., segment or divide) data in the write operation into chunks of data (e.g., whole blocks of data), and the DMC 120 can hash each chunk of data. With regard to each chunk of data being considered for data deduplication, the DMC 120 can query the memory index component 130 to determine whether there is a match between a hash value of the chunk of data of the write operation and a stored hash value (e.g., stored in the memory index component 130) of a stored chunk of data (e.g., stored in the memory component 102). If the DMC 120 does not identify a match between a hash value of the chunk of data of the write operation and a stored hash value of a stored chunk of data, The DMC 120 can update the index by inserting the hash value of the chunk of data, the chunk of data, and/or information relating to the chunk of data into the memory index component 130.

If the DMC 120 does identify a match between a hash value of the chunk of data of the write operation and a stored hash value of a stored chunk of data (e.g., an existing shadow store block of data) that is stored in the second data store 112 and associated with an SDS identifier, the DMC 120 can remove the chunk of data from the current write operation and can replace the chunk of data in the file in the first data store 104 with an SDS reference value (e.g., a shadow reference) that can be inserted into the file.

If the DMC 120 does identify a match between a hash value of the chunk of data of the write operation and a stored hash value of a stored chunk of data that is stored in the first data store 104 and associated with an FDS identifier (e.g., a LIN), the DMC 120 can proceed on an assumption that a data deduplication operation will be successful. The DMC 120 can remove the chunk of data from the write operation, can redirect the chunk of data to be written to the second data store 112 (e.g., a shadow store) instead, and can initiate or schedule an operation to have an SDS reference value (e.g., a shadow reference) inserted into the file (e.g., the file where the chunk of data originally was to be written) in the first data store 104. The DMC 120 can queue a work request that can include, for example, the location of the new storage location (e.g., shadow store block) in the second data store 112, the matching FDS identifier (e.g., LIN) and chunk of data, and the hash for the chunk of data. The agent component 144 can process this work request as a separate operation (e.g., file system deduplication (e.g., ifs_dedupe) can be called on the work request). The agent component 144 (e.g., employing the file system deduplication) can perform the desired work, including performing the byte-by-byte data check of the chunk of data and the stored chunk of data, to verify the match (e.g., initial match of the hash value and stored hash value) and process it (e.g., perform the remaining data deduplication operations), as more fully described herein.

The DMC 120 can perform inline data deduplication on a current write operation, in accordance with the defined data management criteria, which can include inline data deduplication criteria. In some embodiments, the inline data deduplication criteria can include, for example, a criterion that the current operation involves writing data, and is not a truncate or write zero operation, a global policy for inline data deduplication is enabled (if a global policy, as opposed to a per-file policy, is being employed), the file associated with the write operation does not have the "no dedupe" attribute set, the file associated with the write operation is not a special type of file that is exempted from inline data deduplication, the write data of the write operation includes fully overwritten and aligned blocks, the write operation is not part of a rehydrate operation (e.g., an undedupe operation already can have set the "no dedupe" attribute), and/or files have a packing policy of container.

To facilitate performing inline data deduplication with regard to a write operation, the DMC 120 can perform a write range scan, as, prior to executing the write operation (e.g., BSW write operation), the DMC 120, as part of the inline deduplication process, can desire to determine what part (e.g., chunk(s) of data) of the write operation can be removed from the write operation, what part of the write operation can be redirected to the second data store 112, and what part of the write operation is to be written to the native file in the first data store 104.

In some embodiments, the DMC 120 can iterate over the bam object list for the write request and can extract logical blocks that are being completely overwritten. If any blocks are not being completely written in this write request, the DMC 120 can control the write component 122 to have the write component 122 write the data for such block or each of such blocks to the file (e.g., native file) in the first data store 104 in the memory component 102.

The ZCRC 128 can perform zero chunk (e.g., block) removal to remove any chunks of data that are determined to contain all zero values from the current write operation and schedule an operation to punch the block(s) from the file (e.g., block(s) in the file where the chunk(s) of data originally was to be written), as more fully described herein. The ZCRC 128 or the agent component 144 can punch the block(s) in the file to convert the block(s) to a sparse region(s).

For each of the remaining chunks of data of the write operation, the DMC 120 can compute the hash value of the chunk of data and look up the hash value in the memory index component 130 (e.g., the in-memory index table in the memory index component 130) to determine whether that hash value matches any of the stored values in the memory index component 130, as more fully described herein.

If the hash is not found in the index table, the DMC 120 can add the hash value and identifier (e.g., LIN/LBN pair) associated with the chunk of data to a set of pending index updates to be processed on successful transaction commit, wherein the set of pending index updates can be stored in the memory index component 130. With regard to a following chunk of data of the write operation, the DMC 120 can query the set of pending index updates along with the index table in the memory index component 130 in order to identify and catch duplicate chunks of data in the current write operation. If the hash value of that chunk of data is not found in the pending updates set or the index table, the block of data can be written to the native file by the write component 122 and, on successful transaction commit, the DMC 120 can insert that hash value and identifier (e.g., LIN/LBN pair) into the index table in the memory index component 130.

If, instead, the hash value of the chunk of data is found in the pending updates set or the index table of the memory index component 130, the DMC 120 can determine what action is to be taken based at least in part on the type of match between the hash value and another hash value associated with another chunk of data (e.g., stored hash value associated with a stored chunk of data or associated with another chunk of data of the current write operation).

If the match is between the hash value and another hash value for the current chunk of data (e.g., the hash value and other hash value are associated with the same LIN/LBN identity), this can be a potential case of overwriting the file with same data that is already in the file (e.g., a snap-revert or an editor saving a file). In this case, the DMC 120 can compare the data being written to the data that is already in the file to determine whether the data being written is the same as the data that is in the file and potentially can avoid an unnecessary write operation. In some embodiments, it can be desirable to have the DMC 120 or another component of the system 100 cache the existing data in the file, since if the data has to be read first in order to compare it to the data being written, it potentially can impact (e.g., negatively) performance too much. As desired, this same data overwrite detection feature can be configurable, and when disabled, the DMC 120 can ignore index matches that have the same identity as the block being written and can instead control operations to have the write component 122 write the chunk of data to the native file in the first data store 104 (e.g., even if it ends up being an overwrite of existing data).

If the DMC 120 does not identify a stored hash value in the index table that matches the hash value of a chunk of data under consideration, but does identify a matching stored hash value in the set of pending index updates, the DMC 120 can know or determine that the matching data (or at least potentially matching data) is in the current write operation. The DMC 120 can perform a byte-by-byte check of the chunk of data and the other chunk of data associated with the stored hash value up front to determine whether the chunk of data is identical to the other chunk of data. If they are identical, the DMC 120 can remove both chunks of data from the current write operation, schedule operations to punch the blocks (e.g., corresponding blocks) from the file, and schedule SDS reference values (e.g., shadow references) to be inserted into the file in the first data store 104, as more fully described herein. If the DMC 120 determines that the chunk of data does not match the other chunk of data byte for byte, the DMC 120 can handle the chunk of data and other chunk of data as though their hash values do not match, and the write component 122 can write the chunk of data and other chunk of data to the file in the first data store 104. In some embodiments, the DMC 120 can insert the first chunk of data with the matching hash value, and/or other desired information regarding the first chunk of data, into the index table in the memory index component 102, and does not insert the second block into the index table.

If the DMC 120 identifies that the hash value of the chunk of data matches a stored hash value associated with an SDS identifier (e.g., a SIN) and determines that the SDS block (e.g., the shadow block) in the second data store 112 has reached the threshold maximum reference count (e.g., the maximum reference count limit), the DMC 120 can determine that inline data deduplication is not to be performed on the chunk of data and can control operations to have the write component 122 write the chunk of data to the file, and on successful transaction commit, the DMC 120 can insert the hash value and FDS identifier (e.g., LIN/LBN pair) associated with the chunk of data into the index table in the memory index component 130.

If the DMC 120 identifies that the hash value of the chunk of data matches a stored hash value associated with an SDS identifier and determines that the block reference count for the SDS block associated with the SDS identifier has not reached the threshold maximum reference count, the DMC 120 can remove the chunk of data from the current write operation, schedule an operation to punch the block (e.g., corresponding block where the data chunk was to be written) from the file, and schedule insertion of an SDS reference value (e.g., a shadow reference) into the file in the first data store 104. The DMC 120 also can initiate a prefetch of the stored chunk of data (e.g., the shadow store block) from the second data store 112, since the stored chunk of data will be used to perform a byte-by-byte check with the chunk of data.

If the DMC 120 identifies that the hash value of the chunk of data matches a stored hash value associated with an FDS identifier (e.g., a LIN), the DMC 120 can remove the chunk of data from the current write operation, schedule operations to punch the block from the file, redirect the chunk of data to be written to the second data store 112 (e.g., a shadow store), and insert an SDS reference value into the file in the first data store 104. The DMC 120 can save the matching index entry so that it can be used in the post write stage (e.g., post BSW write stage). If the DMC 120 determines that a first chunk of data in a cluster matches another FDS identifier (e.g., LIN), the DMC 120 can assume that the rest of the cluster will match too. In this case, the DMC 120 can redirect the entire cluster to the second data store 112 (e.g., a shadow store) and can offload the data deduplication work to the asynchronous worker process, which can be performed, for example, by the agent component 144.

Table 1 below can provide an overview of and information regarding example index table operations (e.g., associated with the index table in the memory index component 130) with regard to the deduplication process employed by the system 100, including the DMC 120.

TABLE 1

Index Table Operation. Given $i_k \neq i_s$ for i in LIN, SIN, or LBN.

| Operation | Key | Result | Action |
|---|---|---|---|
| Read | (LINk, LBNk) | None | Insert (LINk, LBNk) |
| | | (LINk, LBNk) | Touch (LINk, LBNk) |

TABLE 1-continued

Index Table Operation. Given $i_k \neq i_r$ for i in LIN, SIN, or LBN.

| Operation | Key | Result | Action |
|---|---|---|---|
| | | (LINk, LBNr) | Touch (LINk, LBNr) + Async Dedupe |
| | | (LINr, _) | Insert max(LINk, LINr) + Async Dedupe |
| | | (SINr, _) | Touch (SINr, _) + Async Dedupe |
| | (SINk, LBNk) | None | Insert (SIN$_k$, LBNk) |
| | | (LINr, _) | Insert (SINk, _) + Async Dedupe |
| | | (SINk, LBNk) | Touch (SINk, LINk) |
| | | (SINk, LBNr) | Touch (SINk, LBNr) |
| | | (SINr, _) | Insert max(SINk, SINr) |
| Write | (LINk, LBNk) | None | Write LINk + Insert (LINk, LBNk) |
| | | (LINk, LBNk) | Write LINk + Touch (LINk, LBNk) $^a$ |
| | | (LINk, LBNr) | Write SINw + Insert (SINw, _) + Async Dedupe $^b$ |
| | | (LINr, _) | Write SINw + Insert (SINw, _) + Async Dedupe |
| | | (SINr, _) | Remove Write + Touch SINr |
| | (SINk, _) | (n.a.) | (n.a.) |

With further regard to Table 1, Source: the action taken by the system 100 (e.g., DMC 120, agent component 144, write component 122, . . . ) can differ depending on the source of the operation;

Operation: the operation being performed, which can be a read operation or a write operation;

Key Type: the type of the block being looked-up: SIN (e.g., SDS identifier that can be associated with the second data store 112 (e.g., shadow store)), LIN (e.g., FDS identifier that can be associated with the first data store 104);

Result: the result of the look-up in the memory index component 130, wherein the result can comprise: None, which can indicate that no match (e.g., no matching stored hash value) was found in the memory index component 130 for the hash value of the chunk of data under consideration; Self, which can indicate that the result of the query was the chunk of data that was being looked-up during the query; LIN, which can indicate that a matching LIN (e.g., a stored hash value associated with the LIN matched the hash value associated with the chunk of data under consideration) was found in the memory index component 130 in response to the query; SIN, which can indicate a matching SIN (e.g., a stored hash value associated with the SIN matched the hash value associated with the chunk of data under consideration) was found in the memory index component 130 in response to the query; and n.a., which means not applicable;

Action: the expected action that can be taken by the system 100, given the result: Insert, wherein the key (or the max of the key and result) can be inserted into the memory index component 130; Touch, wherein the existing index entry can be touched to indicate that there was an interaction with the existing index entry and to prolong life of the existing index entry in the memory index component 130; Async Dedupe, wherein the key and result can be forwarded to an asynchronous process for data deduplication (e.g., by the agent component 144 and/or other component of the system 100); Remove Write, wherein the chunk of data can be removed from the write operation (e.g., as part on inline data deduplication of the chunk of data) and reuse the existing SIN (e.g., reuse the existing SDS identifier); and n.a., which means not applicable.

With regard to a in Table 1, during a write operation, when the key (e.g., the search key) is (LINk,LBNk), which can be the identifier (e.g., FDS identifier) associated with the hash value and associated chunk of data of the write operation that is under consideration, and the result (e.g., query result) is (LINk, LBNk), this can indicate there is a potential redundant rewrite, and, in some embodiments, the DMC 120 can take action to control operations to overwrite the block in the first data store 104 with the same data (e.g., the chunk of data under consideration). Thus, as shown in Table 1, the action the DMC 120 can take can be to have the chunk of data written to LINk in the first data store 104 and touch (LINk,LBNk), wherein the touching of (LINk,LBNk) can be an action (e.g., time stamp, flag, tag, or other desired action) that can indicate that there was some kind of interaction or action taken with regard to that index entry in the memory index component 130. A touch action with regard to an index entry can facilitate indicating how recent or how often there was interaction with that index entry, can provide information that can facilitate a determination regarding whether the index entry is stale or not, and whether it should be evicted from the memory index component 130 or not. In other embodiments, alternatively, the DMC 120 can determine whether the writing of (LINk, LBNk) would be a redundant write, and, if it is, the DMC 120 can remove the chunk of data associated with (LINk,LBNk) from the write operation. For instance, the DMC 120 can read the stored chunk of data associated with (LINk, LBNk) from the first data store 104, and can compare (e.g., perform a byte-by-byte comparison) the chunk of data with the stored chunk of data to determine whether they match (e.g., satisfy the second defined match criterion). If they match, the DMC 120 can remove the chunk of data from the write operation and also can perform a touch action with regard to the index entry (e.g., touch (LINk,LBNk). If they do not match, the DMC 120 have the chunk of data written to LINk in the first data store 104 and touch (LINk,LBNk).

As another example situation from Table 1, during the write operation, when the key (e.g., the search key) is (LINk,LBNk), which can be the identifier (e.g., FDS identifier) associated with the hash value and associated chunk of data of the write operation that is under consideration, and the result (e.g., query result) is (LINk, LBNr), this can indicate that the hash value of the chunk of data of the write operation has matched a stored hash value (in the memory index component 130) associated with another chunk of data from the same file as the chunk of data. The action that can be taken by the DMC 120 and other components (e.g., agent component 144, write component 122, . . . ) of the system 100 can be to write the chunk of data to block SINw in the second data store 112, insert information (e.g., (SINw, _) and associated hash value) into the memory index component 130, and perform a post-process (e.g., asynchronous post-process) data deduplication to deduplicate with regard to the chunk of data and other chunk of data that had matching hash values, as more fully described herein.

However, in some embodiments, alternatively, as indicated with regard to b in Table 1, during the write operation, when the key (e.g., the search key) is (LINk,LBNk), which can be the identifier (e.g., FDS identifier) associated with the hash value and associated chunk of data of the write operation that is under consideration, and the result (e.g., query result) is (LINk,LBNr), when both the key and the result are part of the current write operation, instead of performing the data deduplication using an asynchronous post-process data deduplication, the DMC 120 and other components of the system 100 can utilize inline data deduplication to deduplicate the data with regard to the chunk of data and other chunk of data that had matching hash values, as more fully described herein.

With regard to late write operations in connection with data deduplication, after the write operation (e.g., BSW write operation) has been executed, the DMC 120, agent component 144, or other components (e.g., write component 122) can perform the remainder of the data deduplication work, if any remains. Generally, late write operations can be performed atomically with all other events in a write operation. It is noted that, in certain instances in the disclosed subject matter, some late write operations have been described as being post-process or part of the post-process operations. Such late write operations can be distinguishable from asynchronous post-process operations and/or asynchronous worker tasks that can be performed, for example, by the agent component 144 (or another component of the system 100) in connection with post-process data deduplication, such as post-process data deduplication that can be performed (or at least potentially can be performed) when a hash value associated with a chunk of data (and an FDS identifier) in a write operation is determined to match a stored hash value associated with another FDS identifier and stored chunk of data that is stored in the first data store 104. If no work was done by the DMC 120 with regard to inline data deduplication for this write request, there is no work to be done here with regard to late write operations.

With regard to work that is to be performed in connection with late write operations, many of the operations will be described with regard to the agent component 144. It is to be appreciated and understood though that, in accordance with various embodiments, the DMC 120 or another component of the system 100 can perform some or all of these operations. If there is work to be done involving the second data store 112, before any work involving the second data store 112 (e.g., shadow stores (e.g., blocks) of the second data store 112) is performed, the agent component 144 can add the shadow stores to the current transaction and lock them. It can be desirable to have the agent component 144 lock all shadow stores that are to have changes made to them in the correct order. The agent component 144 can achieve this by adding all the shadow stores onto a list and locking them all in order in one operation. After this has been performed, no more shadow stores can be added to the transaction. If any of the shadow stores that were matched against from the memory index component 130 no longer exist, the agent component 144 can remove the index entries for those shadow stores from the memory index component 130, and can unlock the rest of the shadow stores and trigger an operation restart (oprestart) to try again to perform the late write operations and other associated work of the data deduplication process.

If the write request has blocks (e.g., chunks of data) that matched against existing shadow store blocks in the second data store 112, it can be desirable for the agent component 144 to include all those shadow store blocks in the transaction. The agent component 144 can increment the reference count for each of these shadow store blocks before locking the shadow store, otherwise the shadow store will not be locked and will get dropped from the transaction.

If no blocks in the write request have to be redirected to a shadow store in the second data store 112, the agent component 144 can lock all the shadow stores that have been included in the current transaction. If any of the chunks of data in the write request are to be redirected to a shadow store in the second data store 112, it can be desirable for the agent component 144 to retrieve a shadow store from the SIN cache (not shown in FIG. 1) and include that shadow store in the transaction too. To facilitate performing the process of retrieving a shadow store from the SIN cache, it can be desirable for the agent component 144 to lock the shadow store to verify its attributes. This can mean that all shadow stores will be locked at this stage.

Once the agent component 144 obtains a target shadow store from the SIN cache, the agent component 144 can include that target shadow store in the current transaction and set up the details for the bam object list for the shadow store data to be written to the correct location. Before the agent component 144 acquires the data lock for this SIN, it can be desirable for the agent component 144 to perform the byte-by-byte checks on the respective pairs of chunks of data to avoid a possible lock recursion issue.

For each of the chunks of data in the write that matched against existing shadow store blocks of data in the second data store 112, the agent component 144 can perform a byte-by-byte data check, as more fully described herein. To facilitate the byte-by-byte data check, the agent component 144 can read the shadow store blocks of data from the second data store 112. If the agent component 144 determines that a chunk of data matches (e.g., satisfies the second defined match criterion with respect to) the corresponding shadow store block of data, the agent component 144 can install an SDS reference value (e.g., shadow store reference) in the file in the first data store 104.

If the byte-by-byte data check fails with regard to a chunk of data and a shadow store block of data, in some embodiments, the agent component 144 (or DMC 120) can remove the index entry from the index table that this chunk of data matched against and trigger an operation restart. Alternatively, in other embodiments, the DMC 120 or agent component 144 can issue a second write operation (e.g., BSW write operation) for the chunk(s) of data that fails the data check(s), which can be less costly than an operation restart. This solution (e.g., issuing of a second write operation) typically can only work if the second write operation does not have to overwrite any shadow store references, since they have already been locked in the current transaction. In still other embodiments, the agent component 144 or DMC 120 can discontinue the shadow store locks and restart the inline data deduplication late write process, which also can be a viable solution.

The agent component 144 can now obtain the data lock for the range of the shadow store, attach the lock to the transaction, and issue the write to the shadow store (e.g., to the write component 122).

For any chunks of data that was redirected to the shadow store that was obtained from the SIN cache, the agent component 144 can increment the reference count on the shadow store blocks, since the shadow store can maintain a reference for itself. The agent component 144 can install (e.g., insert or store) the shadow references with respect to those chunks of data into the file in the first data store 104. The DMC 120 also can create a work item describing the matching FDS identifier (e.g., LIN/LBN pair) found in the index table in the memory index component 130 along with the new shadow store location of the data just written and can queue that for the agent component 144 (e.g., the asynchronous worker) to process.

The agent component 144 also can increment the allocation cursor for the shadow store that was obtained from the SIN cache and can schedule the SIN to be returned to the SIN cache. This typically can be performed after committing the transaction, so, to facilitate this, a transaction callback can be executed after all shadow store LIN locks have been released.

With further regard to the hashing process employed by the system 100, as disclosed herein, in some embodiments, the DMC 120 can utilize a desired hash algorithm, such as a CityHash-type algorithm (e.g., CityHash256 algorithm, CityHash128 algorithm, or CityHash64 algorithm). In other embodiments, the hash algorithm can be an SHA type of algorithm, a CRC type of algorithm, a proprietary algorithm, or other desired type of algorithm.

The hash algorithm used by the SmartDedupe process can be SHA1, however, for inline data deduplication it is not necessary to use the same hash algorithm as SmartDedupe. It can be desirable to utilize a hash algorithm other than SHA1 for inline data deduplication because the cost to compute an SHA1 hash can be undesirably significant. The SHA1 algorithm does use central processing unit (CPU) extensions (where available) to improve the performance and there are options available to offload from the CPU.

The 32-bit CRC algorithm is a lighter weight hashing algorithm that potentially can be used, however, the chance of an undesired collision is significantly higher than the chance of collision associated with the CityHash-type algorithm or SHA1 algorithm. Parts of the design of inline data deduplication can benefit from a strong hash that can have a smaller (e.g., reduced or minimal) chance of collision. The disclosed subject matter can employ a stronger hash algorithm, such as SHA256/512 algorithm, to reduce the risk of collision, however, the time to compute a hash using the SHA256/512 algorithm and the memory requirements can increase accordingly and can be undesirable. In some embodiments, the disclosed subject matter (e.g., system 100) desirably can employ a non-cryptographic hashing algorithm (e.g., CityHash128 algorithm or CityHash256 algorithm) that can offer superior performance and a hash key size of at least 128 bits.

Hashing every block in a write request potentially can carry an undesirable amount (e.g., too much) overhead. In some embodiments, the DMC 120 can apply one or more heuristics that can facilitate reducing the impact (e.g., overhead) of hashing.

For example, if the first block (e.g., chunk of data) of a cluster matches with another FDS identifier (e.g., LIN), the DMC 120 can assume that the rest of the cluster will match too and can bypass hashes and index lookups, in the memory index component 130, for those other blocks of the cluster. The DMC 120 can have the agent component 144 employ an asynchronous worker process that can execute a data deduplication system call that can scan ahead for matching blocks and can take action with regard to these blocks.

The SmartDedupe process can combine the disk (e.g., memory component 102) pool policy identification (ID) of each file with the hash value from each sampled block to create a unified key. By matching the unified key, the SmartDedupe process can prevent data deduplication between files that are on disk pools with different policies. The DMC 120 can employ a same or similar process with inline data deduplication.

One goal of inline data deduplication can be to identify when a copy operation is being performed and automatically perform data deduplication on both the source and target files. To accomplish this, the DMC 120 can compute hash values of chunks of data as the data is being read from the memory component 102 (e.g., disk). In some embodiments, to mitigate (e.g., reduce, minimize, or prevent) this impacting (e.g., negatively impacting) the performance of the read path, the DMC 120 can implement an asynchronous process to hash the data (e.g., chunks of data being read) where the DMC 120 can utilize a separate thread that can perform the hash computation on the chunks of data, based at least in part on the desired hash algorithm, to generate respective hash values of the respective chunks of data, and can insert the results (e.g., the respective hash values and associated identifiers) into the memory index component 130 (e.g., into the index table in the memory index component 130).

In certain embodiments, as with the handling of written data during a write operation, during a read operation, it can be desirable to be selective with the blocks that are inserted into the memory index component 130, otherwise there potentially can be a risk of polluting the index and causing undesirable overhead if every chunk of data is hashed. In some embodiments, to address this, the DMC 120 can be configured to only insert information (e.g., hash value, identifier, . . . ) associated with the first chunk of data of each cluster into the memory index component 130. If the DMC 120 identifies a match of a stored hash value against the hash value of this first chunk of data, the DMC 120 can scan forward to match the rest of the chunks of data of the same cluster.

In other embodiments, the DMC 120 can hash every Nth chunk of data (e.g., every other data chunk, every third data chunk, or every fourth data chunk, . . . ), instead of every chunk of data, during read operations and write operations in order to reduce the amount of overhead of hashing in the inline data deduplication process.

With further regard to the index table (e.g., dedupe index table) of the memory index component 130, in some embodiments, the index table can be in-memory. The DMC 120 or other component (e.g., agent component 144) of the system 100 can add new index entries to the index table or replace existing index entries only on a successful transaction commit in order to avoid adding false or invalid index entries. In cases where the DMC 120 or other component detects stale index entries in the index table, the DMC 120 or other component can remove (e.g., immediately remove) the stale index entries from the index table of the memory index component 130.

When, during the inline data deduplication process, the DMC 120 does not find a match (e.g., a matching stored hash value) in the index table of the memory index component 130, the DMC 120 can insert FDS identifiers (e.g., LIN/LBN pairs) for the chunks of data being written to the memory component 102. When a match occurs (e.g., when the hash value of a data chunk matches a stored hash value in the index table), the DMC 120 or other component (e.g., agent component 144) can convert these index entries to SDS identifiers (e.g., SIN/LBN pairs).

The DMC 120 can employ a mechanism to maintain the in-memory index table and the in-kernel index table in synchronization with each other, otherwise the in-memory index table and in-kernel index table potentially can work against each other and perform deduplication on the same data to different shadow store locations (e.g., in the second data store 112). The DMC 120 can update the in-memory index table of the memory index component 130 from the file system deduplication system call (e.g., ifs_dedupe( ) system call) (although this typically will only benefit the current node). On a successful data deduplication operation, the DMC 120 typically will not have the hash value itself, but can have the file data in memory so the DMC 120 can generate (e.g., compute) the hash value on demand, if and as desired.

In order to feed deduplication results back to the Smart-Dedupe job and into its index table, the DMC 120 or other component of system 100 can set the clone sample attribute during inline data deduplication. This flag (e.g., setting of the clone sample attribute) can inform the SmartDedupe job (e.g., sample code of the SmartDedupe job) to also sample shadow references in the file. These shadow references can be hashed and incorporated into the SmartDedupe index table.

In some embodiments, the disclosed subject matter can employ a flushing option to flushing operations (e.g., isi_flush, "-inline-dedupe") that can be used to clear the contents of the in-memory index table of the memory index component 130. If this flushing option is not specified by the DMC 120 or other component of the system 100, the in-memory index table of the memory index component 130 will not be cleared. There can be cases, for example, in testing, where it can be desirable to clear the in-memory index table without having to run the flushing operation (e.g., isi_flush). In certain embodiments, a system control (sysctl) can be provided (e.g., to the DMC 120 and/or other component of system 100), wherein the DMC 120 or other system component can utilize the system control specifically to clear just the index table of the memory index component 130.

In other embodiments, instead of the index table being in-memory (e.g., solely in-memory), the index table can be an on-disk index table (e.g., global hash table) that can be distributed across the cluster, and can be designed to scale with the size of the cluster Such an index table also can replace the MLI index used by the SmartDedupe process so the inline data deduplication services and the SmartDedupe services can consolidate their knowledge of the file system.

In certain embodiments, the global hash table can be a multi-level index where the top level index can always remain in memory for fast access while the lower layers can reside on disk and can be read in on demand (e.g., by the DMC 120). The resident cached size of the index can be configured to be able to grow to fill available memory and can support reclaiming in case the memory is desired (e.g., required) elsewhere. This can allow the index to work on all nodes (including virtual machines (VMs), albeit with potentially undesirable (e.g., excessive) paging).

In some embodiments, the index table of the memory index component 130 also can be segregated such that nodes can effectively own sections of the index table. Queries (e.g., by the DMC 120 or other component of system 100) for sections of the index—other than sections owned by the local node—can be sent over the network to the corresponding owner node. This can allow the index table to scale with the size of the cluster.

The last N recently used hashes can be cached on a local node and this cache can be searched first (e.g., by the DMC 120 or other component of system 100). If a match is not found in the cache, the index query can continue to disk or network as desired (e.g., suitable or necessary). The local cache (not shown in FIG. 1) can be indexed as a fixed width hash table or trie type structure, while the hash entries stored on disk can use a balanced btree structure or similar structure that help to reduce (e.g., minimize) the number of inputs/outputs (I/Os) utilized to read index entries.

Updates to the on-disk index table can be transactional and can be included in the write transaction that triggers the changes to the on-disk index table. Otherwise, the DMC 120 or other component of system 100 can batch up changes and process such changes in bulk, and in this case, the above cache can be configured to include the pending writes as well.

In some embodiments, it can be desirable for the index table of the memory index component 130 to have some form of persistent storage that can allow ownership of each index table section to be transferred between nodes of the file system. It also can be desirable for the index table to be configured to support direct access from inside the kernel. To enable this, in certain embodiments, some file system structures, such as an SBT or MDS blocks, can be leveraged, which can be facilitated by employing strategies and processes that can enable contention avoidance. In other embodiments, it also can be desirable to limit the granularity of index buffers, since physical locality of stored index entries does not translate to temporal locality when looking up hashes.

At various times, there can be stale index entries in the index table of the memory index component 130. Stale index entries can occur, for example, when the files to which such index entries refer are removed, truncated, or overwritten. The amount of overhead that can be incurred in updating the index table (e.g., dedupe index table) every time one of these events occurs—and for every block—can be undesirably high. Stale index entries can be an issue though and it can be desirable to manage and address (e.g., handle, deal with, and/or remove) stale index entries from the index table of the memory index component 130.

In the deduplication process, the DMC 120 can validate index entries before using them to avoid the risk of having an undesirable number of data deduplication request failures. It can be desirable for the system 100 (e.g., the DMC 120 of system 100) to know as early as possible if an index entry is stale, but to do so can involve temporarily obtaining a LIN lock and doing an extent state check of the index entry block number.

There is no concern about validating index entries for FDS identifiers (e.g., LINs) in the context of a write operation, since the validating of index entries in such instance can be left for the asynchronous worker process (e.g., as performed by the agent component 144) to perform. Verifying index entries in the write operation can add latency to the write path. Since an index entry can become stale between the write operation and when agent component 144 (e.g., the asynchronous worker) runs, it can be desirable to have the agent component 144 handle the validation of index entries anyway.

It can be desirable to validate index entries for SDS identifiers (e.g., SINs) though. For matching SDS identifiers, it can be desirable for the DMC 120 to lock them as part of the write transaction to facilitate determining whether any of those index entries are stale and handle them on demand.

For SDS identifiers, the DMC 120 can validate index entries by temporarily locking and releasing each one in turn as the DMC 120 processes index entry matches. This cannot guarantee that the index entry for an SDS identifier will still be valid when the shadow store (e.g., of the second data store 112) is locked and included in the transaction. This cannot happen until all the shadow stores that will be included in the transaction are known, since the DMC 120 can lock them all together in FDS identifier (e.g., LIN) order.

Once that has been performed, it can be desirable to be prepared to handle stale entries again, however, by this time, the write operation (e.g., BSW write operation) already has been issued and handling a stale entry at that point can be significantly more difficult. In some embodiments, the solution to the stale index entry issue here can be or can comprise estimating that the chance of an index entry becoming stale between the verification and use phase can be low enough that the DMC 120 or other component of system 100 can handle such a stale index entry by performing an operation restart. In other embodiments, the DMC 120 can flush the index table of all entries that belong to a specific SDS identifier (e.g., SIN) when that SDS identifier is removed can facilitate reducing or minimizing the risk of a stale index entry associated with an SDS identifier. At any time the DMC 120 or other component of the system 100 determines that an index entry is stale, the DMC 120 or other component can remove that stale index entry from the index table of the memory index component 130 and/or can replace that stale index entry with a known good index entry in the index table.

In accordance with various embodiments, the system 100 can employ an index eviction policy to remove index entries from the index table of the memory index component 130. The index table (e.g., in-memory dedupe index) can eventually become full and it can be desirable to start dropping (e.g., removing) index entries to store new index entries. Due to the limited capacity of the index table, the system 100 (e.g., the DMC 120 of system 100) can employ one or more heuristics to determine which index entries are more likely to be used again and/or which entries are more valuable.

In some embodiments, the system 100 can employ a bucket structure for the index table, wherein the index table can be partitioned (e.g., segmented or divided) into buckets (e.g., partitions) that can each have a desired number of slots (e.g., 8 slots, or more or less than 8 slots). When a hash value is generated by the DMC 120, the hash value can be referred to as a key, or, in certain embodiments, the DMC 120 can remove a desired number of bits from the hash to create a key associated with (e.g., representative of) the hash value. The DMC 120 can select one of the buckets from the index table and can insert the key (e.g., as an index entry) into that bucket. When a key is inserted into a bucket, if the bucket is already full (e.g., if all of the slots of the bucket have a key in them), the DMC 120 or the memory index component 130 can determine that the oldest key in the bucket, which can be the key located at the bottom slot of the bucket, is the key that is to be evicted from that bucket, and can evict that oldest key from the index table. The DMC 120 can insert the new key into the top slot of that bucket. If a key has been touched during a data deduplication process, the DMC 120 or the memory index component 130 can move that key from its current slot in the bucket to the top slot in the bucket (unless the key already is in the top slot in the bucket). The system 100 basically can be employing a least recently used (LRU) mechanism in the bucket structure to determine which keys are to be evicted from the respective buckets of the index table of the memory index component 130.

As desired, the system 100 can employ other heuristics in addition to, or as an alternative to, the bucket structure and/or LRU mechanism. For example, the system 100 (e.g., DMC 120 or memory index component 130) can prefer to keep index entries associated with SDS identifiers (e.g., SINs) over index entries associated with FDS identifiers (e.g., LINs). When this heuristic is employed, in some instances, an index entry associated with an SDS identifier can be selected to remain in the index table (e.g., in a bucket of the index table), even if that index entry is older than an index entry associated with an FDS identifier. The precise implementation of this heuristic can vary, as the level of preference and/or weighting of index entries associated with SDS identifiers over index entries associated with FDS identifiers can be varied, as desired, in accordance with the defined data management criteria.

This heuristic can be desirable because, if there is a choice to make to record (e.g., store) an index entry associated with an SDS identifier or an index entry associated with an FDS identifier in the index table, it can be preferable to record the index entry associated the SDS identifier because that can allow for inline data deduplication in the write path when a hash value of a chunk of data matches against a stored hash value (e.g., an index entry) associated with an SDS identifier in the memory index component 130 (rather than against a stored hash value associated with an FDS identifier), and matching against a stored hash value associated with an SDS identifier can provide an opportunity to eliminate a write (e.g., a write of a chunk of data), rather than having to queue up an asynchronous work request to complete the data deduplication operation (e.g., via post-process data deduplication).

Another example heuristic can be to prefer to keep hashes for blocks that are first time writes as opposed to blocks that are overwrites. To implement this heuristic, it can be desirable to have an extra state in the index entry to indicate whether a block is a first time write or an overwrite.

Still another example heuristic can be to prefer to keep hashes for blocks that are the first block in a cluster as index entries in the index table over hashes for blocks that are not the first block in a cluster (e.g., LBN % clustersize==0). Yet another example heuristic can be to prefer to keep hashes for block 0 (e.g., LBN==0) longer (e.g., a short amount of time longer) than hashes for blocks other than block 0.

Another example heuristic can be to prefer to update all index entries with new data blocks, since there can be a better (e.g., a more likely) chance that newer data will persist longer in the memory component 102. Still another example heuristic can be to prefer to drop index entries that are determined to be stale, provided that there can be a desirable (e.g., suitable, acceptable, and/or lightweight) means to check and determine whether index entries are stale. Yet another example heuristic can be to prioritize hashes for read data of read operations higher than hashes of written data of write operations, since, in a copy scenario, it can be desirable to match the source file.

In other embodiments, the system 100 can employ a first-in, first-out (FIFO) method as a heuristic to prioritize index entries in the index table (e.g., in the buckets of the index table) for temporal locality. In certain embodiments, the system 100 can utilize a least frequently used (LFU) method to prioritize for popularity of matches of hash values as index entries. This can be implemented, for example, by having a usage counter in or associated with each index entry in the index table of the memory index component 130. The usage counter only will have to utilize a few states to distinguish index entries (e.g., stored hash values) that have not matched to hash values of a write or read operation from those index entries that have been matched once, twice, or more times to hash values of a write or read operation.

As disclosed, with regard to inline data deduplication process, there can be data deduplication opportunities detected by the DMC 120, wherein not all of the data deduplication operations are performed by the DMC 120 or other components of system 100 upon detection of such data deduplication opportunities, with some data deduplication operations being deferred to an asynchronous or background worker process, which can be performed by the agent component 144 and/or other components of the system 100.

In some embodiments, the agent component 144 can process data deduplication requests and can perform data deduplication operations with respect to matches of hash values of chunks of data identified against hash values associated with FDS identifiers (e.g., LINs) in the index table of the memory index component 130. If this happens during a write operation, the DMC 120 can control operations to have the write component 120 write the chunk of data directly to the second data store 112 (e.g., a shadow store), and the DMC 120 can have the agent component 144 perform the asynchronous worker process to perform data deduplication on the data associated with matched FDS identifier (e.g., LIN) against the new shadow store block of data in the second data store 112, as more fully described herein. If a match between hash values is found while hashing chunks of data for a read operation, the DMC 120 can generate a data deduplication request (e.g., an asynchronous or post-process data deduplication request) and can queue that deduplication request. In response to the queued data deduplication request, the agent component 144 can perform data deduplication between the two chunks of data associated with the two matching hash values associated with respective FDS identifiers (e.g., LINs), as more fully described herein.

In some embodiments, the queue of outstanding data deduplication work items can be appended to an in-memory list inside the kernel and can be extracted by a specialized daemon (e.g., of or associated with the agent component 144 or DMC 120) that can read the data deduplication work items and can call a file system deduplication function (e.g., ifs_dedupe( )) to process each data deduplication work item in the queue. The code (e.g., ifs_dedupe( ) code) of the file system deduplication function can provide all the desired logic to scan forward and backward in the matched files.

In certain embodiments, the daemon can be implemented in userspace and can call the file system deduplication function (e.g., ifs_dedupe( )) as a system call. In other embodiments, the daemon can be a kernel task, and the entry code to the file system deduplication function (e.g., ifs_dedupe( )) can be refactored so that it can be called by a kernel thread. This approach can avoid having to copy data deduplication requests to userspace and can eliminate the problem of the userspace daemon exiting.

It may be possible that the background worker process (e.g., the agent component 144 and associated components performing such process) is not able to keep up with the data deduplication work items in the queue or can fail and cannot process the work items in the queue at all. For this reason, in some embodiments, the system 100 can defend against this and can limit the number of data deduplication work items that can be pending in the kernel queue at any time based at least in part on a defined threshold maximum number of data deduplication work items. When the defined threshold maximum number of data deduplication work items is reached (e.g., is satisfied or met), the DMC 120, the agent component 144, or another component of system 100 can drop (e.g., can abandon or discontinue queuing) new data deduplication work item entries until there is space available in the queue again.

With further regard to byte-by-byte data checks on chunks of data, the byte-by-byte data check can be desirable to guarantee that the chunks of data of a potential data deduplication opportunity are an exact match to each other. The hash can be strong enough to reduce collisions, however, there always can exist a chance that the respective data (e.g., bytes of data) of the respective chunks of data may not match exactly. In the case where the byte-by-byte data check between two chunks of data fails, there can be a hash collision between a chunk (e.g., block) of data in the write request and a chunk of data in or associated with the index table of the memory index component 130. This situation can be resolved by the system 100 by the DMC 120 comparing the identifiers (e.g., LINs or SINs) associated with the hash values associated with the two chunks of data and inserting information relating to the chunk of data with the higher identifier value into the index table of the memory index component 130, wherein, for example, a SIN can have a higher identifier value than a LIN. This strategy can prevent any form of thrashing in the index table if two different data blocks with the same hash frequently appear.

It is also possible that the chunk of data associated with the matching stored hash value has since been rewritten (e.g., chunks of data associated with LINs only) or freed (e.g., chunks of data associated with SINs and LINs) and the index entry (e.g., stored hash value) can be stale. This can result in a byte-by-byte data check failing, thereby resulting in an effective hash collision.

In some embodiments, the DMC 120 or another component of system 100 can prefetch the chunks of data (e.g., shadow store blocks) from the second data store 112 in the write scan phase. This can result in less time being spent waiting for the chunks of data to be available in the late write stage where the byte-by-byte data checks can be performed.

With inline data deduplication, the system 100 (e.g., the agent component 144 of system 100) will only perform byte-by-byte checks between two chunks of data in the context of the write operation when a matching stored hash value associated with an SDS identifier (e.g., SIN associated with a shadow store block in the second data store 112) is found in the memory index component 130. The byte-by-byte checks can be performed this way so that the agent component 144 or other component of system 100 can insert an SDS reference value (e.g., a shadow reference) and avoid writing the chunk of data of the write operation to the memory component 102 (e.g., to the first data store 104 of the memory component 102). A block (e.g., shadow store block) in the second data store 112 potentially may have been freed while the index entry associated with that block remains in the index table of the memory index component 130. For this reason, the DMC 120, agent component 144, or other component of system 100 can validate the state of the block before reading data for the byte-by-byte data check with respect to that block.

In some embodiments, during a write operation, if a match is found between a hash value of a chunk of data and a stored hash value associated with an FDS identifier (e.g., a LIN associated with a data chunk stored in the first data store 104), the DMC 120 or agent component 144 can defer the byte-by-byte check of those two chunks of data so in that case there will be no read I/O latency in the write operation.

There can be a number of factors that can affect the efficiency of the inline deduplication process. These factors can include, for example: the size of the index table (e.g., the in-memory dedupe hash table), the size of L1/L2 cache (e.g., the chance that read blocks have not been evicted), the heuristics (e.g., LRU) employed by or for the index table of the memory index component 130, read access patterns of the workload (when hashing data reads), write access patterns of the workload, baseline dedupability of the working data set, frequency of chunks of data hashed in the write operations, general aging of the file system (e.g., stale index entries), defragger component (e.g., shadow format manager (SFM) defragger) moving data around in the memory component 102, and/or the strength of the hash key.

With further regard to the Smart Dedupe process, as described herein, in addition to the inline data deduplication (and associated post-process data deduplication), the system 100 also can employ a SmartDedupe process to deduplicate data. The inline data deduplication (and associated post-process data deduplication) and the SmartDedupe process can coexist and work together to further improve the data deduplication ratio of the system 100. The inline data deduplication can work on new data being written to disk, while the SmartDedupe process only works with data that is already committed to disk.

SmartDedupe typically will not be aware that a file has been had inline data deduplication performed on it and can try to sample the file anyway. This behavior of the Smart-Dedupe process can be acceptable, given that inline data deduplication process may have only performed data deduplication on a section of the file and not the entire file. SmartDedupe can bypass over sections of the file that have already had data deduplication performed on them (e.g., by the inline data deduplication process).

In some embodiments, the inline data deduplication process and the SmartDedupe process can have their own separate deduplication index tables. The SmartDedupe process does not utilize or insert knowledge of results from the inline data deduplication process, and vice versa.

With regard to data compression, the system 100 can employ data compression to compress data written to or stored in the memory component 102 based at least in part on one or more compression algorithms In some embodiments, the zero chunk (e.g., block) removal process and the inline data deduplication process can occur before compression is performed on data (e.g., by a compression component (not shown in FIG. 1). This can reduce the amount of work that the compression component has to perform. Due to the redirecting of writes of data chunks in certain instances (e.g., as part of the inline data deduplication process) to the second data store 112 (e.g., shadow stores), it can be desirable to compress data written to the second data store 112 too. In certain embodiments, the process of punching blocks during a write operation (if done directly) potentially may have to be revisited after compression has been ratified.

In accordance with various embodiments, the file system of the system 100 can utilize and process snapshots. The system 100 can comprise a snapshot subsystem (not shown in FIG. 1), wherein the snapshot subsystem can generate and manage snapshots of data or files of the file system, wherein a snapshot can comprise snapshot data of or relating to a data or file. The zero chunk (e.g., block) removal process and the inline data deduplication process can be applied to snapshots too. Writes to snapshots can be in whole blocks, which can make the behavior more predictable. Snapshot COW can work with shadow references so snapshot COW can support inline data deduplication.

It is quite likely that any blocks of data that are transferred from the head version of a file to a snapshot have already been through the inline data deduplication process when such blocks of data were first written. If not, when the data is written to the snap, this can result in matching against the head version (since that is where the data was last written) and that is not of much use anyway. As a result, the chances of finding a data deduplication opportunity in a snapshot can be sufficiently low enough to not bother to utilize resources to perform inline data deduplication with regard to snapshots. As desired though, in some embodiments, the inline data deduplication process can be performed on snapshots.

Tracking data in snapshots also can involve modifying the index table of the memory index component 130 to include the snapid of the block in the index entry and updating the index entry whenever a block is transferred from head to a snapshot. In certain embodiments, a tunable can be provided to enable or disable support for the inline data deduplication process with regard to writes (e.g., write operations) to snapshots.

The disclosed subject matter also can employ and manage a quota function with regard to the memory component 102. The zero chunk (e.g., block) removal process to remove chunks of data only having zero values from a write operation can result in less blocks being written to some files, and, as a result, there can be less blocks allocated. This can reduce the file's contribution to quota usage.

For the purposes of quota, shadow references can be counted as physical blocks. This means that the process of replacing actual data with shadow references in a file does not change the quota usage for that file. Due to this, quota can continue to work in a desirable manner and will not be affected by the use of the inline data deduplication.

In some embodiments, the system 100 (e.g., the DMC 120 or another system component) can track and collect various statistics, including statistics relating to the inline data deduplication service. For instance, the DMC 120 or other system component can track and collect statistics regarding the data reduction effects of the inline data deduplication service, wherein such statistics can be included and reported with other statistics, such as overall data deduplication statistics, which can be available using a data deduplication statistics function (e.g., isi dedupe stats) and can be provided (e.g., presented) via a data deduplication page (e.g., Dedupe WebUI page) accessible via the interface (e.g., WebUI interface). There can be various statistics counters for inline data deduplication available via system control (sysctl).

The statistics can comprise, for example:

write block: the number of full blocks processed during write operations;

skip partial: the number of partial blocks bypassed during write operations;

read_block: the number of full blocks read during read operations;

dedupe block: the number of write blocks deduplicated;

zero_block: the number of write blocks containing only zero values (e.g., with all zero bits) that are converted to sparse;

punch_block: the number of blocks in the native file converted to sparse;

data_miss: the number of times a byte-by-byte data check has failed;

data_match: the number of times a byte-by-byte data check has passed;

zero_miss: the number of times the zero block check has not found a match;

zero_match: the number of times the zero block check has found (e.g., identified) a match (e.g., found a block that contains only zero values);

index entries: the number of active index entries in the in-memory index of the memory index component 130;

index insert: the number of index entries inserted into the in-memory index;

index remove: the number of index entries removed from the in-memory index;

index miss: the number of index table lookups failing to find a match to a stored hash value;

index hit: the number of index table lookups that found a match to a stored hash value (although this number can include matches to stale index entries);

index evict: the number of index entries that have been evicted from the in-memory index;

index stale: the number of index entries determined to be stale; and index lookup: the number of index table lookups.

Figure 6:
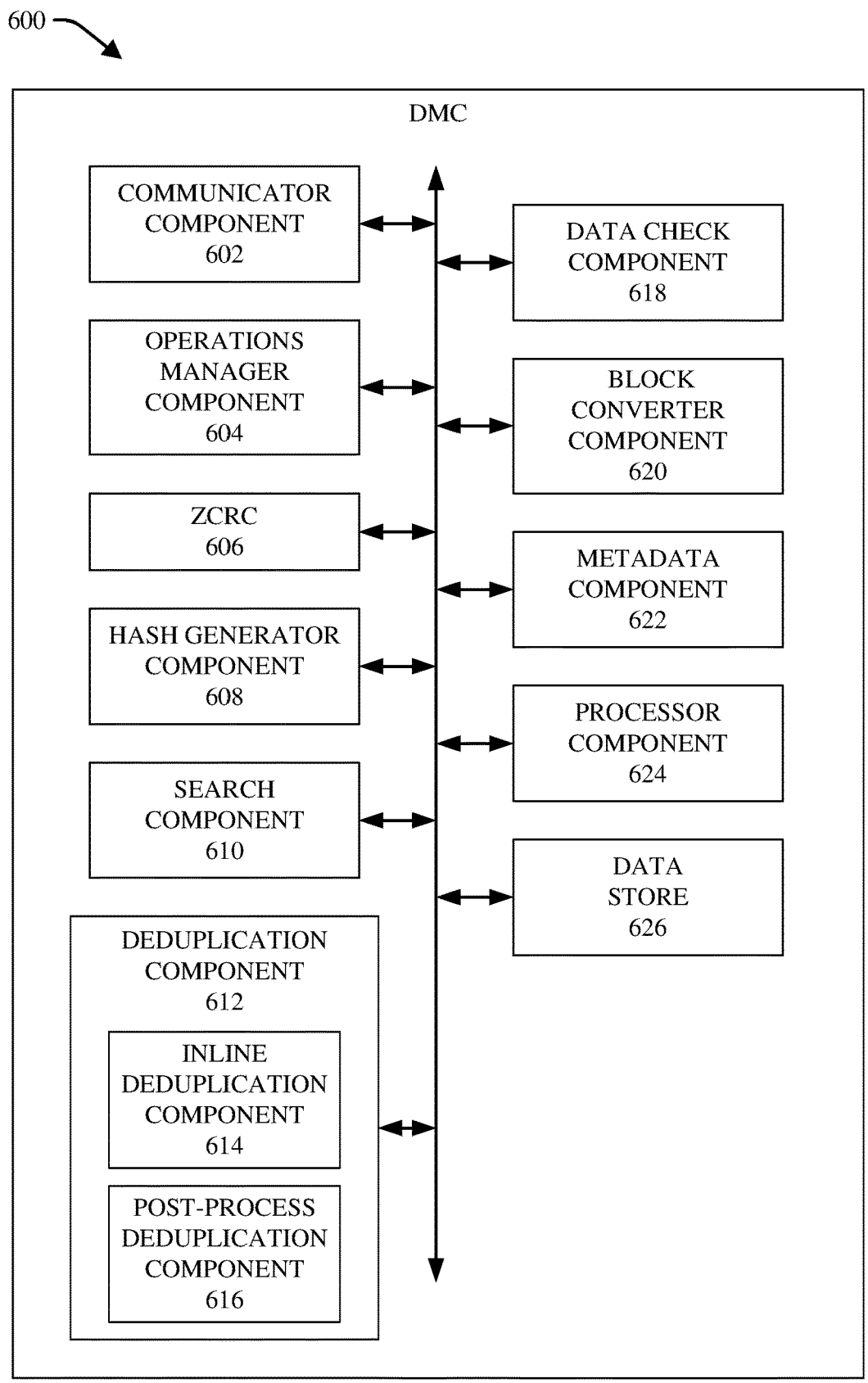
FIG. 6 depicts a block diagram of an example data management component, in accordance with various aspects and embodiments of the disclosed subject matter.

FIG. 6 depicts a block diagram of an example DMC 600, in accordance with various aspects and embodiments of the disclosed subject matter. The DMC 600 can comprise, for example, a communicator component 602, an operations manager component 604, a ZCRC 606, a hash generator component 608, a search component 610, a data deduplication component 612, comprising an inline data deduplication component 614 and a post-process data deduplication component 616, a data check component 618, a block converter component 620, a metadata component 622, a processor component 624, and a data store 626.

The communicator component 602 can transmit information from the DMC 600 to another component(s), device(s), function(s), and/or user(s), and/or can receive information from the component(s), device(s), function(s), and/or user (s). For example, the communicator component 602 can receive data and/or information relating to the data in connection with a write or read operation to facilitate analysis of the data that can be utilized to determine whether inline or post-process data deduplication is to be performed on a chunk of the data. As another example, the communicator component 602 also can transmit information relating to inline or post-process data deduplication, including, for example, instructions relating to inline or post-process data deduplication to another component or device (e.g., an agent component).

The operations manager component 604 can control (e.g., manage) operations associated with the DMC 600. For example, the operations manager component 604 can facilitate generating instructions to have components of the DMC 600 perform operations, and can communicate respective instructions to respective components (e.g., communicator component 602, ZCRC 606, hash generator component 608, search component 610, data deduplication component 612, . . . , processor component 624, and data store 626) of the DMC 600 to facilitate performance of operations by the respective components of the DMC 600 based at least in part on the instructions, in accordance with the defined data management criteria and data management algorithm(s) (e.g., data management algorithms as disclosed, defined, recited, or indicated herein by the methods, systems, and techniques described herein). The operations manager component 604 also can facilitate controlling data flow between the respective components of the DMC 600 and controlling data flow between the DMC 600 and another component(s) or device(s) (e.g., agent component, memory component, memory index component, write component, read component, file system, . . . ) associated with (e.g., connected to) the DMC 600.

The ZCRC 606 can perform a zero chunk (e.g., block) removal process to determine whether any of chunks of data associated with a write operation contain only zero values and to remove any chunk of data from the write operation that is determined to contain only zero values. The ZCRC 606 also can convert the storage region where the chunk of data would have been stored in the file (e.g., native file) in the first data store in the memory component to be or comprise a sparse region in the metadata of the file (e.g., the sparse region can be associated with or referenced by the metadata, wherein the metadata can indicate that it is a sparse region associated with a chunk of data that contained only zero values).

The hash generator component 608 can generate respective hash values (e.g., hashes) for respective chunks of data based at least in part on a desired hash algorithm. The hash generator component 608 can apply the desired hash algorithm to a chunk of data, and a hash value for the chunk of data can be determined and generated based at least in part on the application of the hash algorithm to the data values of the chunk of data. In some embodiments, the hash algorithm can be a type of CityHash algorithm. In other embodiments, the hash algorithm can be an SHA type of algorithm, a CRC type of algorithm, a proprietary algorithm, or other desired type of algorithm.

The search component 610 can query the memory index component with respect to a hash value associated with a chunk of data of a write or read operation to determine whether any of the hash values associated with other chunks of data and stored in the memory index component satisfy the defined match criterion (e.g., match, are the same as) with respect to the hash value associated with the chunk of data. The hash value can be compared against the stored hash values in the memory index component to determine whether any of those stored hash values satisfy the defined match criterion, wherein, if there is a match with a stored hash value, information regarding the stored hash value can be returned as a result to the query. The information regarding the stored hash value can comprise an identifier (e.g., chunk (e.g., block) identifier, such as an FDS identifier (e.g., LIN/LBN pair) or SDS identifier (e.g., SIN), that can identify the type of the data chunk associated with the store hash value, the storage location associated with the data chunk, and/or other information.

The data deduplication component 612 can perform data deduplication operations, including inline data deduplication operations, post-process data deduplication operations, and/or other types of data deduplication operations. The inline data deduplication component 614 can perform inline data deduplication operations, in response to a determination by the DMC 600 that inline data deduplication can be performed with regard to a chunk of data associated with a write operation, such as when a hash value associated with the chunk of data is determined to match a stored hash value associated with an SDS identifier (e.g., associated with a stored chunk of data that is stored in the second data store), and when the chunk of data is determined to match the stored chunk of data byte for byte, as more fully described herein. In connection with performing inline data deduplication, the inline data deduplication component 614 can perform various inline deduplication operations, including, for example, removing the chunk of data from the write operation, scheduling an operation to convert the storage region (e.g., block) in the file in the first data store to a sparse region, and scheduling an SDS reference value to be inserted into the file, wherein the storage region is the location where the chunk of data initially was to be stored in the file in the first data store, and wherein the SDS reference value can be associated with the sparse region and can indicate the storage location where the stored chunk of data is stored in the second data store.

The post-process data deduplication component 616 can perform post-process data deduplication operations, in response to a determination by the DMC 600 that post-process data deduplication can be performed with regard to a chunk of data associated with a write operation or read operation, such as, for example, when a hash value associated with the chunk of data is determined to match a stored hash value associated with an FDS identifier (e.g., associated with a stored chunk of data that is stored in the first data store), and when the chunk of data is determined to match the stored chunk of data byte for byte. In connection with performing post-process data deduplication, the post-process data deduplication component 616 can perform various post-process deduplication operations, comprising, for example, removing the chunk of data from the write operation, scheduling an operation to convert the storage region (e.g., block) in the file in the first data store to a sparse region, redirecting the chunk of data to be written to the second data store (e.g., shadow store), and scheduling an SDS reference value to be inserted into the file, wherein the storage region is the location where the chunk of data initially was to be stored in the file in the first data store, and wherein the SDS reference value can be associated with the sparse region and can indicate the storage location where the stored chunk of data is stored in the second data store.

The data check component 618 can perform or facilitate performing (e.g., in conjunction with an agent component) byte-by-byte checks (e.g., byte-by-byte comparisons) of respective bytes of data of a chunk of data associated with a write or read operation to respective bytes of data of a stored or other chunk of data to determine whether the chunk of data matches the stored or other chunk of data byte for byte, to facilitate determining whether an inline or post-process data deduplication can be performed on the chunk of data, as more fully described herein.

The block converter component 620 can convert a storage region (e.g., storage location or block) in the first data store (e.g., data store where native files can be stored) to a sparse region. The sparse region can utilize less space than the chunk of data would utilize if it was stored in the storage region. During a write operation, the block converter component 620 can convert a storage region to a sparse region in connection with a determination that the chunk of data contains only zero values and removal of that chunk of data from the write operation (as part of a zero chunk removal process performed by the ZCRC 606). The block converter component 620 also can convert a storage region to a sparse region in connection with an inline or post-process data deduplication process to deduplicate a chunk of data, wherein the sparse region can replace the storage location where the chunk of data was stored or would have been stored. The block converter component 620 also can convert a storage region to a sparse region in connection with other actions or processes, such as when data is compressed and stored in a data store of the memory component. Metadata can be associated with a sparse region, wherein such metadata can indicate that a sparse region is a sparse region, can indicate whether the sparse region is associated with a chunk of data that contained only zero value, and/or can comprise a reference value (e.g., SDS or shadow store reference value) that can indicate a storage location of a chunk of data in the second data store (e.g., shadow data store).

The metadata component 622 can generate metadata, comprising, for example, identifiers (e.g., FDS identifier or pending-update identifier (which can be or can comprise an FDS identifier), SDS identifier), or reference values (e.g., SDS reference values), that can be associated with storage regions (e.g., blocks) in the memory component, sparse regions in the memory component (e.g., in the first data store of the memory component), or data (e.g., chunk of data), in connection with managing files and data stored in the first data store or second data store of the memory component. For instance, the metadata component 622 can generate an FDS identifier that can be associated with a hash value (e.g., stored hash value) that can be stored in the memory index component and can be associated with a stored chunk of data stored in the first data store and/or can generate an SDS identifier that can be associated with another hash value (e.g., stored hash value) that can be stored in the memory index component and can be associated with another stored chunk of data that is stored in the second data store. The metadata component 622 also can generate an SDS reference value that can be associated with a sparse region in the first data store and can reference a storage location where a stored chunk of data is located in the second data store.

The processor component 624 can work in conjunction with the other components (e.g., communicator component 602, ZCRC 606, hash generator component 608, search component 610, data deduplication component 612, . . . , and data store 626) to facilitate performing the various functions of the DMC 600. The processor component 624 can employ one or more processors, microprocessors, or controllers that can process data, such as information relating to files, file systems, inline data deduplication, post-process data deduplication, hash values, metadata (e.g., FDS identifiers, SDS identifiers, SDS reference values), queries, parameters, traffic flows, policies, defined data management criteria, algorithms (e.g., data management algorithms, hash algorithms, compression algorithms, decompression algorithms), protocols, interfaces, tools, and/or other information, to facilitate operation of the DMC 600, as more fully disclosed herein, and control data flow between the DMC 600 and other components (e.g., agent component, memory component, memory index component, write component, read component, file system, . . . ) associated with the DMC 600.

The data store 626 can store data structures (e.g., user data, metadata), code structure(s) (e.g., modules, objects, hashes, classes, procedures) or instructions, information relating to files, file systems, inline data deduplication, post-process data deduplication, hash values, metadata (e.g., FDS identifiers, SDS identifiers, SDS reference values), queries, parameters, traffic flows, policies, defined data management criteria, algorithms (e.g., data management algorithms, hash algorithms, compression algorithms, decompression algorithms), protocols, interfaces, tools, and/or other information, to facilitate controlling operations associated with the DMC 600. In an aspect, the processor component 624 can be functionally coupled (e.g., through a memory bus) to the data store 626 in order to store and retrieve information desired to operate and/or confer functionality, at least in part, to the communicator component 602, ZCRC 606, hash generator component 608, search component 610, data deduplication component 612, data check component 618, block converter component 620, metadata component 622, processor component 624, and data store 626, etc., and/or substantially any other operational aspects of the DMC 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 7-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
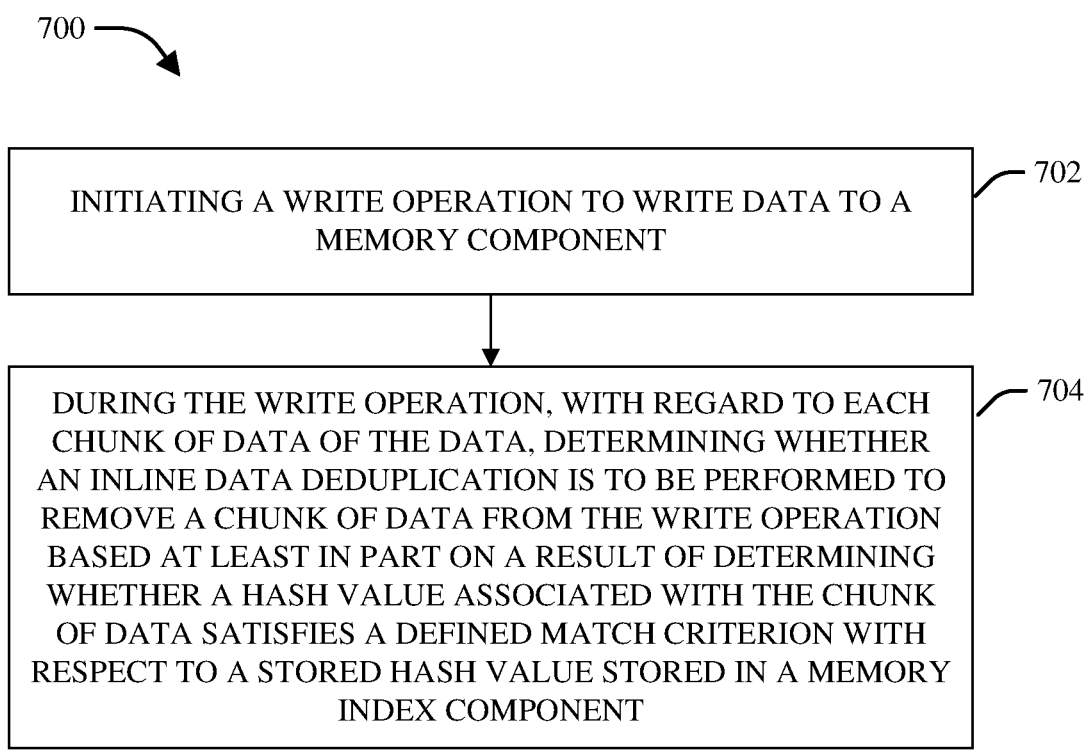
FIG. 7 illustrates a flow chart of an example method that can determine whether inline data deduplication is to be performed during a write operation to write data to a memory component, in accordance with various aspects and embodiments of the disclosed subject matter.

FIG. 7 illustrates a flow chart of an example method 700 that can determine whether inline data deduplication is to be performed during a write operation to write data to a memory component, in accordance with various aspects and embodiments of the disclosed subject matter. The method 700 can be employed by, for example, a system comprising the write component, the DMC, the memory index component, a processor component (e.g., of or associated with the DMC), and/or data store (e.g., of or associated with the DMC and/or the processor component).

At 702, a write operation to write data to a memory component can be initiated. The write component can initiate execution of the write operation to write the data to the memory component (e.g., the first data store or the second data store of the memory component).

At 704, during the write operation, with regard to each chunk of data of the data, a determination can be made regarding whether an inline data deduplication is to be performed to remove a chunk of data from the write operation based at least in part on a result of determining whether a hash value associated with the chunk of data satisfies a defined match criterion with respect to a stored hash value stored in a memory index component. With regard to each chunk (e.g., block) of data of the data, the DMC can determine whether inline data deduplication is to be performed to remove a chunk of data from the write operation based at least in part on the result of determining whether the hash value associated with the chunk of data satisfies the defined match criterion with respect to the stored hash value stored in a memory index component and associated with a stored chunk of data that is stored in a second data store (e.g., shadow store).

For instance, the DMC can segment the data into respective chunks of data. The DMC can determine and/or generate respective hash values of the respective chunks of data based at least in part on a desired hash algorithm. With regard to each chunk of data associated with the write operation, the DMC can compare the hash value associated with the chunk of data to the stored hash values of stored chunks of data to determine whether the hash value associated with the chunk of data satisfies a defined match criterion with respect to the stored hash values (e.g., determine whether the hash value matches any of the stored hash values), wherein the stored hash values can be determined or generated by the DMC and stored in the memory index component.

In response to determining that the hash value associated with the chunk of data satisfies the define match criterion with respect to a stored hash value associated with the stored chunk of data and stored in the memory index component, the DMC can perform a byte-by-byte comparison of the chunk of data and the stored chunk of data to determine whether the chunk of data and the stored chunk of data satisfy another defined match criterion (e.g., determine whether the chunk of data and stored chunk of data do match each other byte for byte). In response to determining that the comparison result of comparing the chunk of data and the stored chunk of data does satisfy the other defined match criterion, the DMC can determine that inline data deduplication can be performed to remove the chunk of data from the write operation and not write that chunk of data to the file in the first data store or to the second data store. The DMC can perform inline data deduplication to remove the chunk of data from the write operation and can insert a reference value (e.g., a shadow reference value) in the file, wherein the reference value can identify and refer to the location of the stored chunk of data in the second data store.

If, however, the DMC determines that the hash value associated with the chunk of data does not match any of the stored hash values, the DMC can determine that inline data deduplication is not to be performed to remove that chunk of data from the write operation. Such chunk of data can be written to the file in the memory component.

Figure 8:
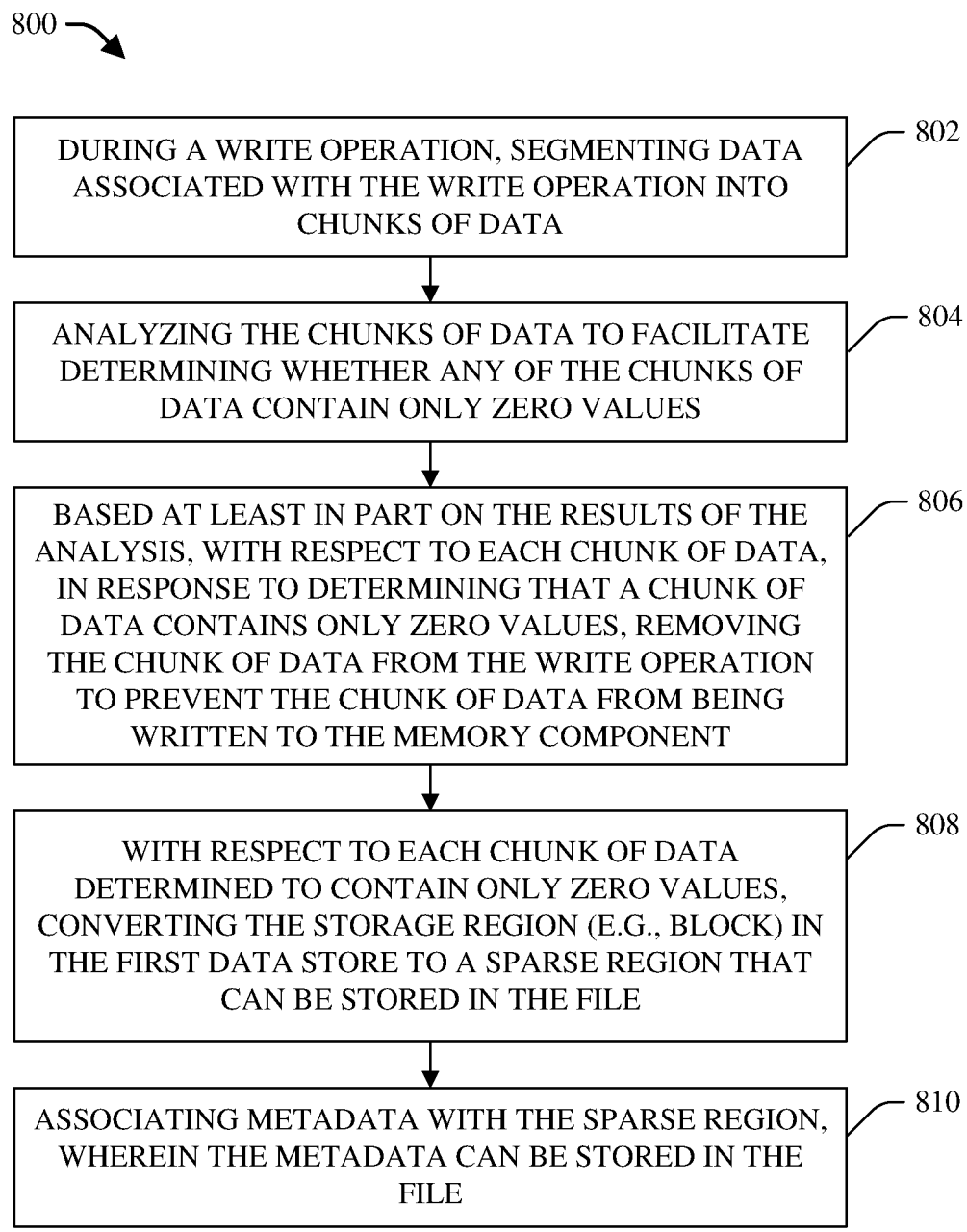
FIG. 8 presents a flow chart of an example method that can desirably perform zero chunk (e.g., block) of data removal in connection with a write operation to facilitate preventing the chunks containing only zero values from being written to the memory component, in accordance with various aspects and embodiments of the disclosed subject matter.

FIG. 8 presents a flow chart of an example method 800 that can desirably perform zero chunk (e.g., block) of data removal in connection with a write operation to facilitate preventing the chunks containing only zero values from being written (e.g., unnecessarily written) to the memory component, in accordance with various aspects and embodiments of the disclosed subject matter. The method 800 can be employed by, for example, a system comprising the DMC, a processor component (e.g., of or associated with the DMC), and/or data store (e.g., of or associated with the DMC and/or the processor component).

At 802, during a write operation, data associated with the write operation can be segmented into chunks of data. During a write operation to write the data to a file in the memory component (e.g., a native file in the first data store in the memory component), the DMC can segment (e.g., partition) the data into the chunks of data (e.g., blocks or subsets of data).

At 804, the chunks of data can be analyzed to facilitate determining whether any of the chunks of data contain only zero values. The DMC can analyze the chunks of data to determine whether any of the chunks of data contain only zero values (e.g., whether, for each data chunk, the data chunk contains zero values for each of the data bits of that data chunk).

At 806, based at least in part on the results of the analysis, with respect to each chunk of data, in response to determining that a chunk of data contains only zero values, the chunk of data can be removed from the write operation to prevent the chunk of data from being written to the memory component. With respect to each chunk of data, in response to the DMC determining that a chunk of data contains only zero values, the DMC can remove the chunk of data from the write operation to prevent that chunk of data from being written to the memory component (e.g., the first data store or the second data store of the memory component).

At 808, with respect to each chunk of data determined to contain only zero values, the storage region (e.g., block) in the first data store can be converted to a sparse region. At 810, metadata can be associated with the sparse region, wherein the metadata can be stored in the file. With respect to each chunk of data determined to contain only zero values, the DMC can convert the storage region where the chunk of data would have been stored in the file to a sparse region, which can be stored in the file in the first data store of the memory component. The DMC also can generate the metadata and can associate the metadata with the sparse region. The converting of the storage region to the sparse region can facilitate preventing an unnecessary writing of all zero values of the chunk of data to the first data store in the memory component. The metadata can be or can comprise a zero block reference value that can facilitate identifying the location of the sparse region in the file (e.g., location of the sparse region associated with the chunk of data relative to other chunks of data in the file) and identifying that such location contains the sparse region and/or that the chunk of data contains only zero values.

Figure 9:
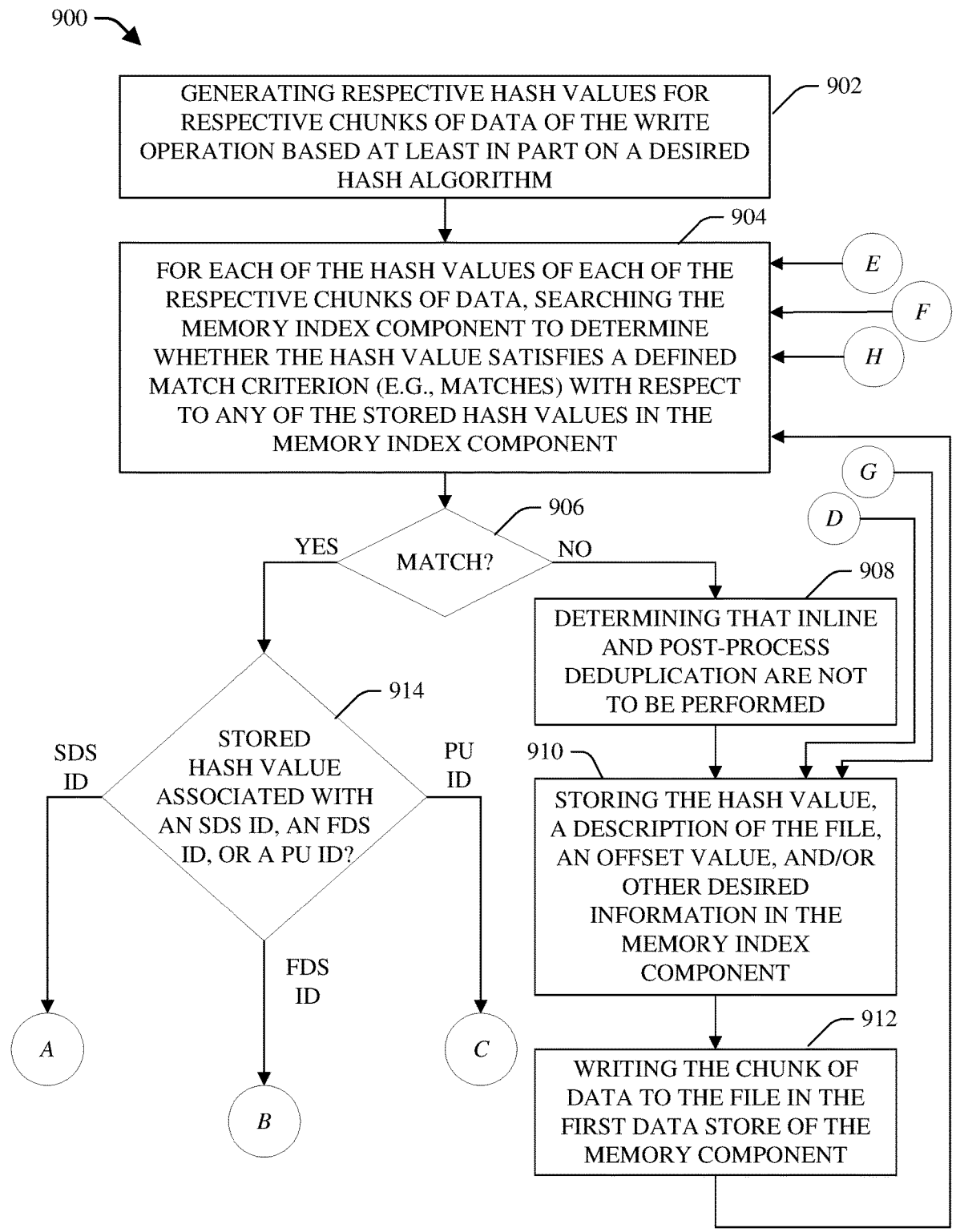
FIG. 9 illustrates a flow chart of an example method that can determine whether inline data deduplication or post-process data deduplication is to be performed during a write operation to write data to a memory component, in accordance with various aspects and embodiments of the disclosed subject matter.

FIG. 9 illustrates a flow chart of an example method 900 that can determine whether inline data deduplication or post-process data deduplication is to be performed during a write operation to write data to a memory component, in accordance with various aspects and embodiments of the disclosed subject matter. The method 900 can be employed by, for example, a system comprising the write component, the DMC, the memory index component, a processor component (e.g., of or associated with the DMC), and/or data store (e.g., of or associated with the DMC and/or the processor component).

At 902, respective hash values can be generated for respective chunks of data of the write operation based at least in part on a desired hash algorithm. During a write operation to write data to the memory component, the DMC can segment the data into respective chunks of data. The DMC also can perform zero block removal to remove any chunks of data that contain only zero values, as more fully described herein. With regard to the chunks of data that remain after zero block removal has been performed, the DMC can generate respective hash values for the respective chunks of data (that remain after zero block removal) based at least in part on the desired hash algorithm.

At 904, for each of the hash values of each of the respective chunks of data, the memory index component can be searched to determine whether the hash value satisfies a defined match criterion (e.g., matches) with respect to any of the stored hash values in the memory index component. The DMC can generate hash values (e.g., stored hash values) for chunks of data stored in the first data store and second data store (e.g., shadow store) of the memory component, and can store the stored hash values in the memory index component. In some embodiments, as chunks of data of the write operation are processed by the DMC and added to the set of pending updates, the hash values for those chunks of data can be included (e.g., as stored hash values) in the set of pending updates in the memory index component.

The DMC can search (e.g., query) the memory index component to facilitate comparing a hash value associated of a chunk of data of the write operation to the stored hash values stored in the memory index component. Based at least in part on the results of the search of the memory index component, including the results of the comparing of the hash value to the stored hash values, the DMC can determine whether the hash value satisfies a defined match criterion with respect to any of the stored hash values in the memory index component.

At 906, a determination can be made regarding whether the hash value satisfies a defined match criterion with respect to any of the stored hash values in the memory index component, based at least in part on the results of the search of the memory index component. The DMC can determine whether the hash value satisfies the defined match criterion (e.g., matches) with respect to any of the stored hash values in the memory index component.

In response to determining that the hash value does not satisfy the defined match criterion with respect to the stored hash values, at 908, a determination can be made that inline data deduplication and post-process deduplication are not to be performed. At 910, the hash value associated with the chunk of data, a description of the file associated with the chunk of data, an offset value representing the offset of the chunk of data, and/or other desired information associated with the chunk of data can be stored in the memory index component. At 912, the chunk of data can be written to the file in the first data store of the memory component. In response to the DMC determining that the hash value does not satisfy the defined match criterion with respect to the stored hash values, the DMC can determine that inline data deduplication and post-process deduplication are not to be performed on the chunk of data. The DMC can store (e.g., insert or write) the hash value associated with the chunk of data, the description of the file associated with the chunk of data, the offset value representing the offset of the chunk of data (e.g., the LIN/LBN pair), and/or other desired information (e.g., metadata) associated with the chunk of data in the memory index component. The write component (e.g., as controlled by the DMC) can write the chunk of data to the file (e.g., native file) in the first data store. At this point, the method 900 can return to reference numeral 904 to process the next chunk of data of the write operation.

Referring again to reference numeral 906, in response to determining that the hash value does satisfy the defined match criterion with respect to a stored hash value, at 914, a determination can be made regarding whether the stored hash value is associated with an SDS identifier (SDS ID), an FDS identifier (FDS ID), or a pending-update identifier (PU ID). The DMC can analyze the identifier associated with the stored hash value to determine whether such identifier is an SDS identifier (e.g., SIN), an FDS identifier (e.g., LIN), or a pending-update identifier where the chunk of data associated with the pending-update identifier (e.g., a LIN associated with the current write operation) is part of the pending updates set (e.g., such chunk of data is part of the current write operation).

At this point, the method 900 can proceed to reference point A, reference point B, or reference point C, depending on the result of the determining whether the stored hash value is associated with an SDS identifier, an FDS identifier, or a pending-update identifier. If, at 914, it is determined that the stored hash value is associated with an SDS identifier, the method 900 can proceed to reference point A, wherein, as described with regard to FIG. 10, the method 900 can proceed from reference point A to determine whether inline data deduplication is to be performed with regard to the chunk of data that is currently under consideration. If, at 914, it is determined that the stored hash value is associated with an FDS identifier, the method 900 can proceed to reference point B, wherein, as described with regard to FIG. 11, the method 900 can proceed from reference point B to determine whether post-process (e.g., asynchronous post-process) data deduplication is to be performed with regard to the chunk of data that is currently under consideration. If, at 914, it is determined that the stored hash value is associated with a pending-update identifier (e.g., a LIN associated with the current write operation), the method 900 can proceed to reference point C, wherein, as described with regard to FIG. 12, the method 900 can proceed from reference point C to determine whether inline data deduplication is to be performed with regard to the chunk of data that is currently under consideration.

Figure 10:
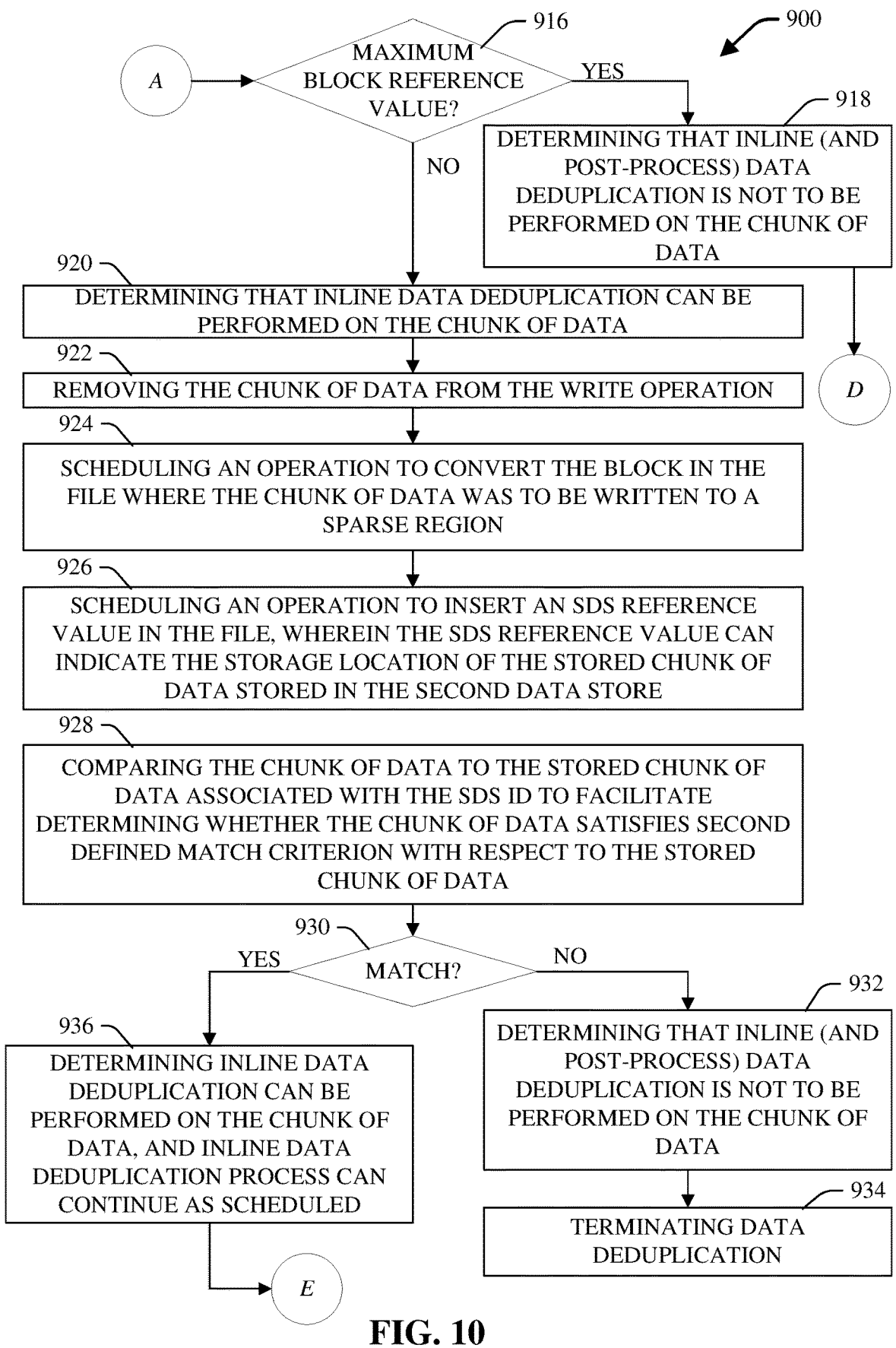
FIG. 10 depicts a flow chart of a portion of the example method (illustrated in FIG. 9) that can determine whether inline data deduplication can be performed with regard to chunks of data during a write operation to write data to a memory component, in accordance with various aspects and embodiments of the disclosed subject matter.

Referring to FIG. 10, FIG. 10 depicts a flow chart of a portion of the example method 900 that can determine whether inline data deduplication can be performed with regard to chunks of data during a write operation to write data to a memory component, in accordance with various aspects and embodiments of the disclosed subject matter. In some embodiments, the method 900 can proceed from reference point A. This portion of the method 900 can relate to an instance when the hash value associated with the chunk of data (e.g., chunk of data having a LIN identifier) is determined to match the stored hash value that is associated with a stored chunk of data and an SDS identifier (e.g., SIN of the shadow store).

In response to determining that the stored hash value is associated with an SDS identifier, at 916, a determination can be made regarding whether the SDS block reference count associated with the SDS identifier is at a maximum block reference value. The DMC can analyze the SDS block reference count associated with the SDS identifier to determine whether the SDS block reference count is at the maximum block reference value.

In response to determining that the SDS block reference count is at the maximum block reference value, at 918, the DMC can determine that inline data deduplication (and post-process data deduplication) is not to be performed on the chunk of data. At this point, the method 900 can proceed to reference point D, wherein the method 900 can proceed from reference point D to return to reference numeral 910, as depicted in FIG. 9, wherein the operations at reference numerals 910 and 912 can be performed with respect to this chunk of data.

In some embodiments, if, at 916, it is determined that the SDS block reference count is lower than the maximum block reference value, at 920, a determination can be made that inline data deduplication can be performed on the chunk of data. At 922, the chunk of data can be removed from the write operation. At 924, an operation can be scheduled to convert the block in the file where the chunk of data was to be written to a sparse region. At 926, an operation can be scheduled to insert an SDS reference value in the file, wherein the SDS reference value can indicate the storage location of the stored chunk of data (that matches the chunk of data) stored in the second data store. In response to the DMC determining that the SDS block reference count is lower than the maximum block reference value, the DMC can determine (e.g., at least initially determine) that inline data deduplication can be performed on the chunk of data (e.g., subject to a byte-by-byte check of the chunk of data and the stored chunk of data being performed and indicating the chunk of data and the stored chunk of data match each other, as more fully described herein). The DMC can remove the chunk of data from the write operation, schedule an operation to convert the block in the file where the chunk of data was to be written to a sparse region, and schedule an operation to insert the SDS reference value (e.g., shadow store reference) as metadata in the file.

In certain embodiments, the method 900 can proceed to reference numeral 928, wherein, at 928, the chunk of data can be compared to the stored chunk of data associated with the SDS identifier to facilitate determining whether the chunk of data satisfies a second defined match criterion with respect to the stored chunk of data. The DMC can compare the chunk of data to the stored chunk of data byte by byte to determine whether the chunk of data satisfies the second defined match criterion (e.g., matches byte for byte) with respect to the stored chunk of data.

At 930, a determination can be made regarding whether the chunk of data satisfies the second defined match criterion with respect to the stored chunk of data, based at least in part on the result of the byte-by-byte comparison. The DMC can determine whether the chunk of data satisfies the second defined match criterion with respect to the stored chunk of data, based at least in part on the result of the byte-by-byte comparison of the chunk of data and the stored chunk of data.

In response to determining that the chunk of data does not satisfy the second defined match criterion with respect to the stored chunk of data, at 932, a determination can be made that inline data deduplication (and post-process data deduplication) is not to be performed on the chunk of data. In response to the DMC determining that the chunk of data does not satisfy the second defined match criterion with respect to the stored chunk of data, the DMC can determine that inline data deduplication (and post-process data deduplication) is not to be performed on the chunk of data, even though there was an initial determination that inline data deduplication could be performed on the chunk of data.

At 934, it can be determined that the inline data deduplication with respect to the chunk of data is to be terminated. In some embodiments, the scheduled operations (e.g., operation to convert the block in the file to a sparse region, operation to insert the SDS reference value in the file) can be terminated. In certain embodiments, the DMC can remove the stored hash value that matched the hash value of the chunk of data from the memory index component, and the DMC can perform an operation restart to restart the late write operation associated with the inline data deduplication process to write the chunk of data to the memory component.

Referring again to reference numeral 930, if, at 930, it is determined that the chunk of data does satisfy the second defined match criterion with respect to the stored chunk of data, at 936, a determination can be made that inline data deduplication can be performed on the chunk of data and the inline data deduplication process can continue as scheduled.

At this point, the method 900 can proceed to reference point E, wherein the method 900 can proceed from reference point E to return to reference numeral 904, as depicted in FIG. 9, to process the next chunk of data of the write operation.

It is to be appreciated and understood that, in some embodiments, alternatively, instead of performing a byte-by-byte check of the chunk of data and the stored chunk of data as indicated at reference numeral 930, the DMC can perform the byte-by-byte check of the chunk of data and the stored chunk of data, for example, prior to the determination regarding whether the SDS block reference count associated with the SDS identifier is at the maximum block reference value (as provided above with regard to reference numeral 916).

Figure 11:
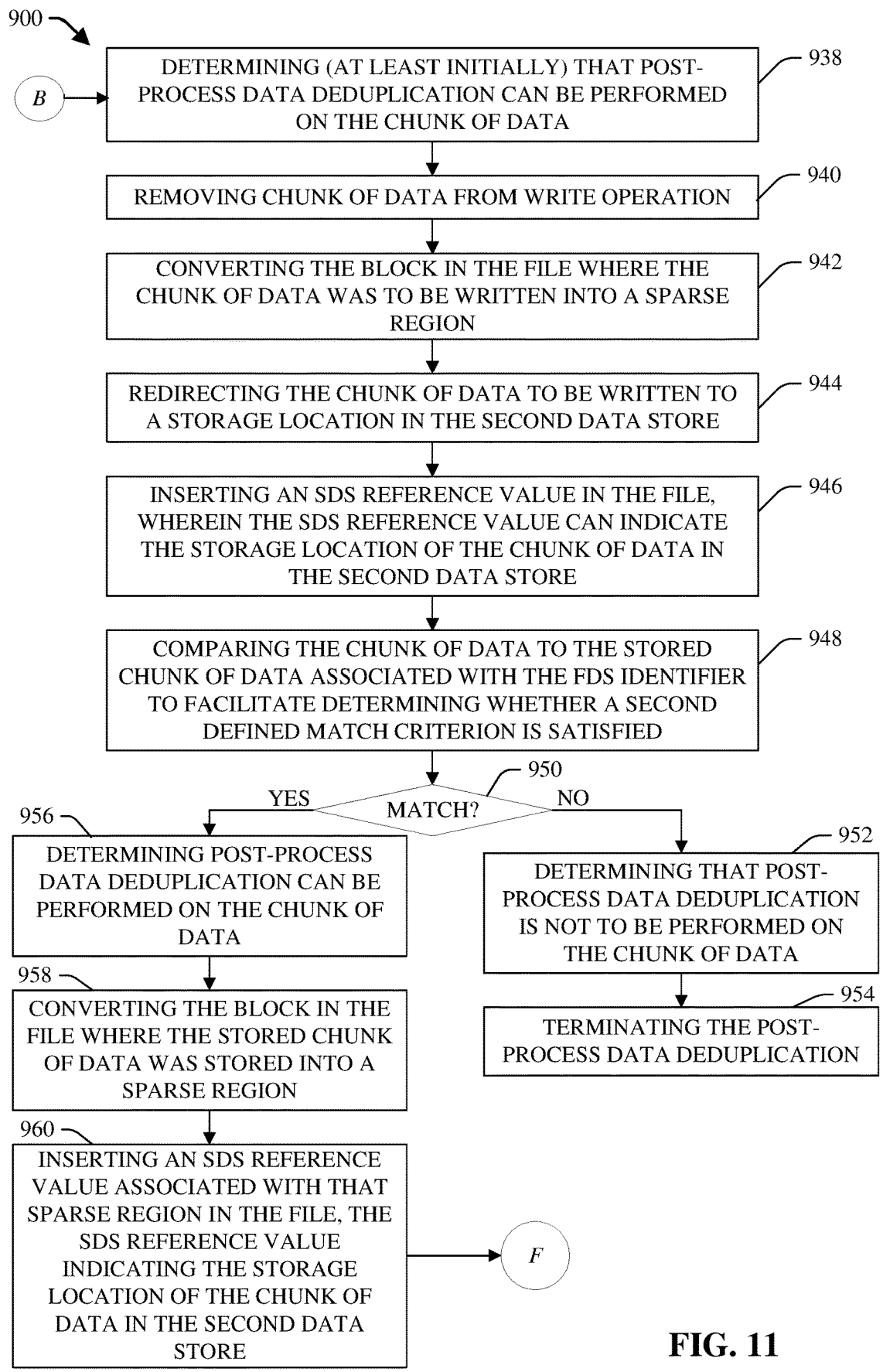
FIG. 11 illustrates a flow chart of another portion of the example method (illustrated in FIG. 9) that can determine whether post-process data deduplication can be performed with regard to chunks of data during a write operation to write data to the memory component, in accordance with various aspects and embodiments of the disclosed subject matter.

Turning to FIG. 11, FIG. 11 illustrates a flow chart of another portion of the example method 900 that can determine whether post-process data deduplication can be performed with regard to chunks of data during a write operation to write data to the memory component, in accordance with various aspects and embodiments of the disclosed subject matter. In some embodiments, the method 900 can proceed from reference point B. This portion of the method 900 can relate to an instance when the hash value associated with the chunk of data (e.g., chunk of data having a LIN identifier) is determined to match the stored hash value that is associated with a stored chunk of data and an FDS identifier (e.g., another LIN that is associated with the first data store).

In response to determining that the stored hash value is associated with an FDS identifier (e.g., LIN), at 938, a determination can be made (e.g., at least initially) that post-process data deduplication can be performed on the chunk of data. At 940, the chunk of data can be removed from the write operation. At 942, the block in the file where the chunk of data was to be written can be converted into a sparse region. At 944, the chunk of data can be redirected to be written to a storage location in the second data store. At 946, an SDS reference value can be inserted in the file, wherein the SDS reference value can reference or indicate the storage location of the chunk of data in the second data store. In response to the DMC determining that the stored hash value is associated with an FDS identifier, the DMC can determine (e.g., at least initially determine) that post-process data deduplication can be performed on the chunk of data (e.g., subject to a byte-by-byte check of the chunk of data and the stored chunk of data being performed and indicating the chunk of data and the stored chunk of data match each other, as more fully described herein). The DMC can remove the chunk of data from the write operation, convert the block in the file (e.g., native file) where the chunk of data originally was to be written into a sparse region, redirect the chunk of data to be written to the storage location in the second data store, and insert the SDS reference value (e.g., shadow store reference) as metadata in the file.

In some embodiments, the method 900 can proceed to reference numeral 948, wherein, at 948, the chunk of data can be compared to the stored chunk of data associated with the FDS identifier to facilitate determining whether the chunk of data satisfies a second defined match criterion with respect to the stored chunk of data. The DMC or agent component can compare the chunk of data to the stored chunk of data byte by byte to determine whether the chunk of data satisfies the second defined match criterion (e.g., matches byte for byte) with respect to the stored chunk of data.

At 950, a determination can be made regarding whether the chunk of data satisfies the second defined match criterion with respect to the stored chunk of data, based at least in part on the result of the byte-by-byte comparison. The DMC or agent component can determine whether the chunk of data satisfies the second defined match criterion with respect to the stored chunk of data, based at least in part on the result of the byte-by-byte comparison of the chunk of data and the stored chunk of data.

In response to determining that the chunk of data does not satisfy the second defined match criterion with respect to the stored chunk of data, at 952, a determination can be made that post-process data deduplication is not to be performed on the chunk of data. At 954, the post-process data deduplication with regard to the chunk of data can be terminated. In response to the DMC or agent component determining that the chunk of data does not satisfy the second defined match criterion with respect to the stored chunk of data, the DMC or agent component can determine that post-process (e.g., asynchronous post-process) data deduplication is not to be performed on the chunk of data, even though there was an initial determination that post-process data deduplication could be performed on the chunk of data. The DMC or agent component can terminate the post-process data deduplication with regard to the chunk of data. In some embodiments, the operations (e.g., operation to convert the storage region (e.g., block) in the file to a sparse region, operation to redirect the chunk of data to be written to the storage location in the second data store, and operation to insert the SDS reference value in the file) can be terminated (e.g., if not yet performed). In certain embodiments, the DMC can remove the stored hash value that matched the hash value of the chunk of data from the memory index component, and the DMC can perform an operation restart to restart the late write operation associated with the post-process data deduplication process to write the chunk of data to the memory component.

Referring again to reference numeral 950, if, at 950, it is determined that the chunk of data does satisfy the second defined match criterion with respect to the stored chunk of data, at 956, a determination can be made that the post-process data deduplication can be performed on the chunk of data and the post-process data deduplication process can continue as scheduled. In response to determining that the chunk of data does satisfy the second defined match criterion with respect to the stored chunk of data, the DMC or agent component can determine that the post-process data deduplication can be performed on the chunk of data and the post-process data deduplication process can continue as scheduled.

At 958, in response to determining that the post-process data deduplication can be performed, the block where the stored chunk of data associated with the FDS identifier is stored in the file can be converted to a sparse region. For instance, in response to determining that the post-process data deduplication can be performed, the DMC or agent component can convert the block (e.g., storage location) where the stored chunk of data associated with the FDS identifier is stored in the file (e.g., in the file in the first data store) to a sparse region.

At 960, the stored chunk of data can be replaced with an SDS reference value associated with the sparse region, wherein the SDS reference value can reference or indicate the storage location in the second data store where the chunk of data is stored. The DMC or agent component can replace the stored chunk of data with an SDS reference value associated with the sparse region (e.g., can insert the SDS reference value in the file), wherein the SDS reference value can reference or indicate the storage location in the second data store where the chunk of data (e.g., matching chunk of data) is stored.

At this point, the method 900 can proceed to reference point F, wherein the method 900 can proceed from reference point F to return to reference numeral 904, as depicted in FIG. 9, to process the next chunk of data of the write operation.

It is to be appreciated and understood that, in some embodiments, alternatively, instead of performing a byte-by-byte check of the chunk of data and the stored chunk of data as indicated at reference numeral 948, the DMC can perform the byte-by-byte check of the chunk of data and the stored chunk of data, for example, prior to the determination regarding whether post-process data deduplication can be performed on the chunk of data (as provided above with regard to reference numeral 938).

Figure 12:
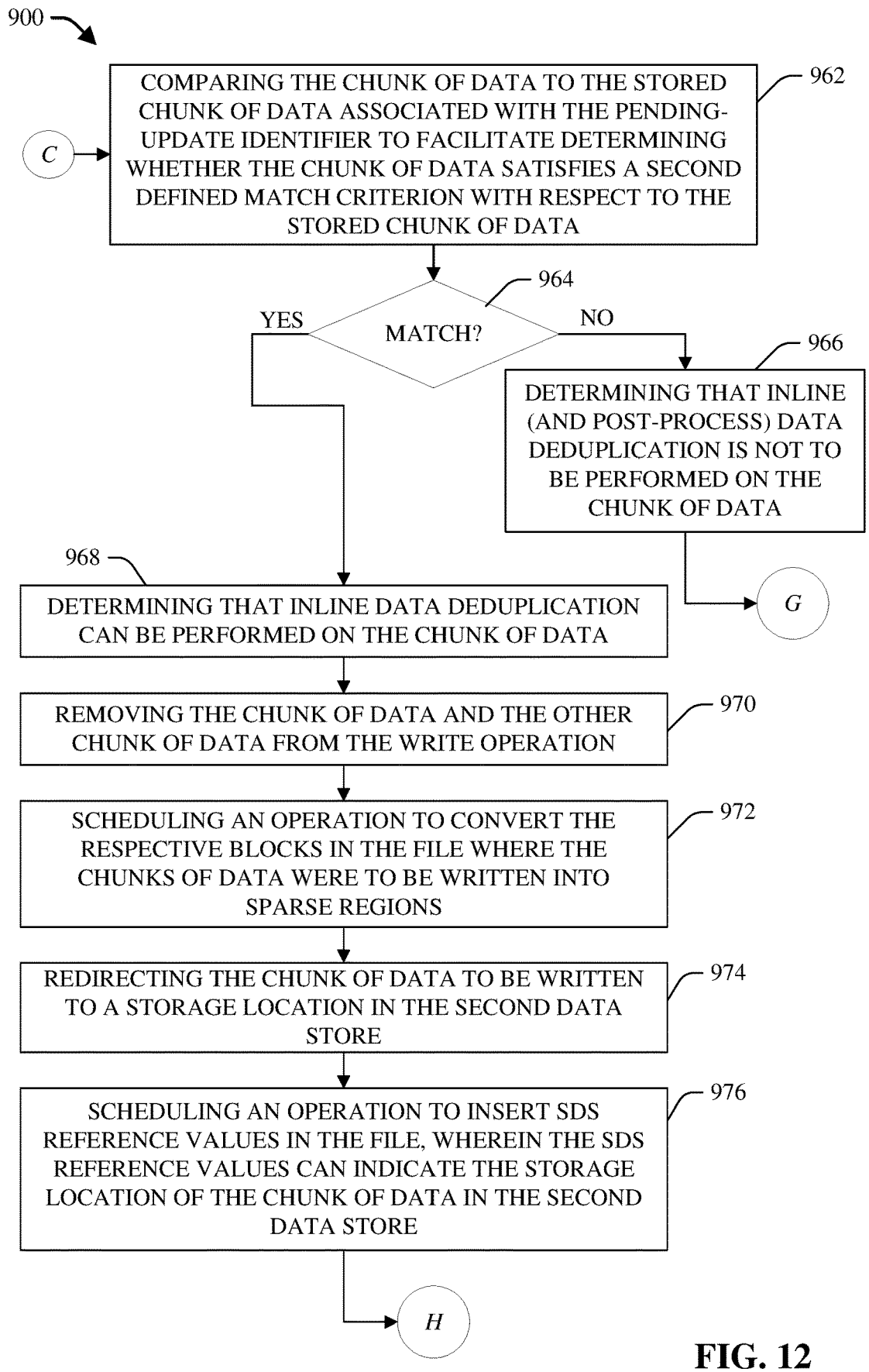
FIG. 12 depicts a flow chart of still another portion of the example method (illustrated in FIG. 9) that can determine whether inline data deduplication can be performed with regard to chunks of data during a write operation to write data to a memory component, in accordance with various aspects and embodiments of the disclosed subject matter.

Referring to FIG. 12, FIG. 12 depicts a flow chart of still another portion of the example method 900 that can determine whether inline data deduplication can be performed with regard to chunks of data during a write operation to write data to a memory component, in accordance with various aspects and embodiments of the disclosed subject matter. In some embodiments, the method 900 can proceed from reference point C. This portion of the method 900 can relate to an instance when the hash value associated with the chunk of data (e.g., chunk of data having a LIN identifier) is determined to match the stored hash value that is associated with another chunk of data of the write operation and a pending-update identifier (e.g., another LIN that is associated with the pending update set associated with the write operation).

In response to determining that the stored hash value is associated with a pending-update identifier, at 962, the chunk of data can be compared to the other chunk of data associated with the pending-update identifier to facilitate determining whether the chunk of data satisfies a second defined match criterion with respect to the other chunk of data. The DMC can compare the chunk of data to the other chunk of data byte by byte to determine whether the chunk of data satisfies the second defined match criterion (e.g., matches byte for byte) with respect to the other chunk of data.

At 964, a determination can be made regarding whether the chunk of data satisfies the second defined match criterion with respect to the other chunk of data, based at least in part on the result of the byte-by-byte comparison. The DMC can determine whether the chunk of data satisfies the second defined match criterion with respect to the other chunk of data, based at least in part on the result of the byte-by-byte comparison of the chunk of data to the other chunk of data.

In response to determining that the chunk of data does not satisfy the second defined match criterion with respect to the other chunk of data, at 966, a determination can be made that inline data deduplication (and post-process data deduplication) is not to be performed on the chunk of data. In response to the DMC determining that the chunk of data does not satisfy the second defined match criterion with respect to the other chunk of data, the DMC can determine that inline data deduplication (and post-process data deduplication) is not to be performed on the chunk of data. At this point, the method 900 can proceed to reference point G, wherein the method 900 can proceed from reference point G to return to reference numeral 910, as depicted in FIG. 9, wherein the operations at reference numerals 910 and 912 can be performed with respect to this chunk of data to facilitate writing the chunk of data and the other chunk of data to the first data store of the memory component.

Referring again to reference numeral 964, if, at 964, it is determined that the chunk of data does satisfy the second defined match criterion with respect to the other chunk of data, at 968, a determination can be made that the inline data deduplication can be performed on the chunk of data. At 970, the chunk of data and the other chunk of data can be removed from the write operation. At 972, an operation can be scheduled to convert the respective blocks in the file where the chunk of data and the other chunk of data were to be written to sparse regions. At 974, the block of data can be redirected to be written to a storage location in the second data store. At 976, an operation can be scheduled to insert SDS reference values in the file, wherein the SDS reference values can indicate the storage location of the chunk of data in the second data store. In response to the DMC determining that the chunk of data does satisfy the second defined match criterion with respect to the other chunk of data, the DMC can determine that inline data deduplication can be performed on the chunk of data. The DMC can remove the chunk of data and the other chunk of data from the write operation, schedule an operation to convert the respective storage regions (e.g., blocks) in the file (e.g., native file) where the chunk of data and the other chunk of data were to be written to sparse regions, redirect the chunk of data to be written to the storage location in the second data store, and schedule the operation to insert the SDS reference values (e.g., shadow store references) as metadata in the file.

At this point, the method 900 can proceed to reference point H, wherein the method 900 can proceed from reference point H to return to reference numeral 904, as depicted in FIG. 9, to process the next chunk of data of the write operation.

Figure 13:
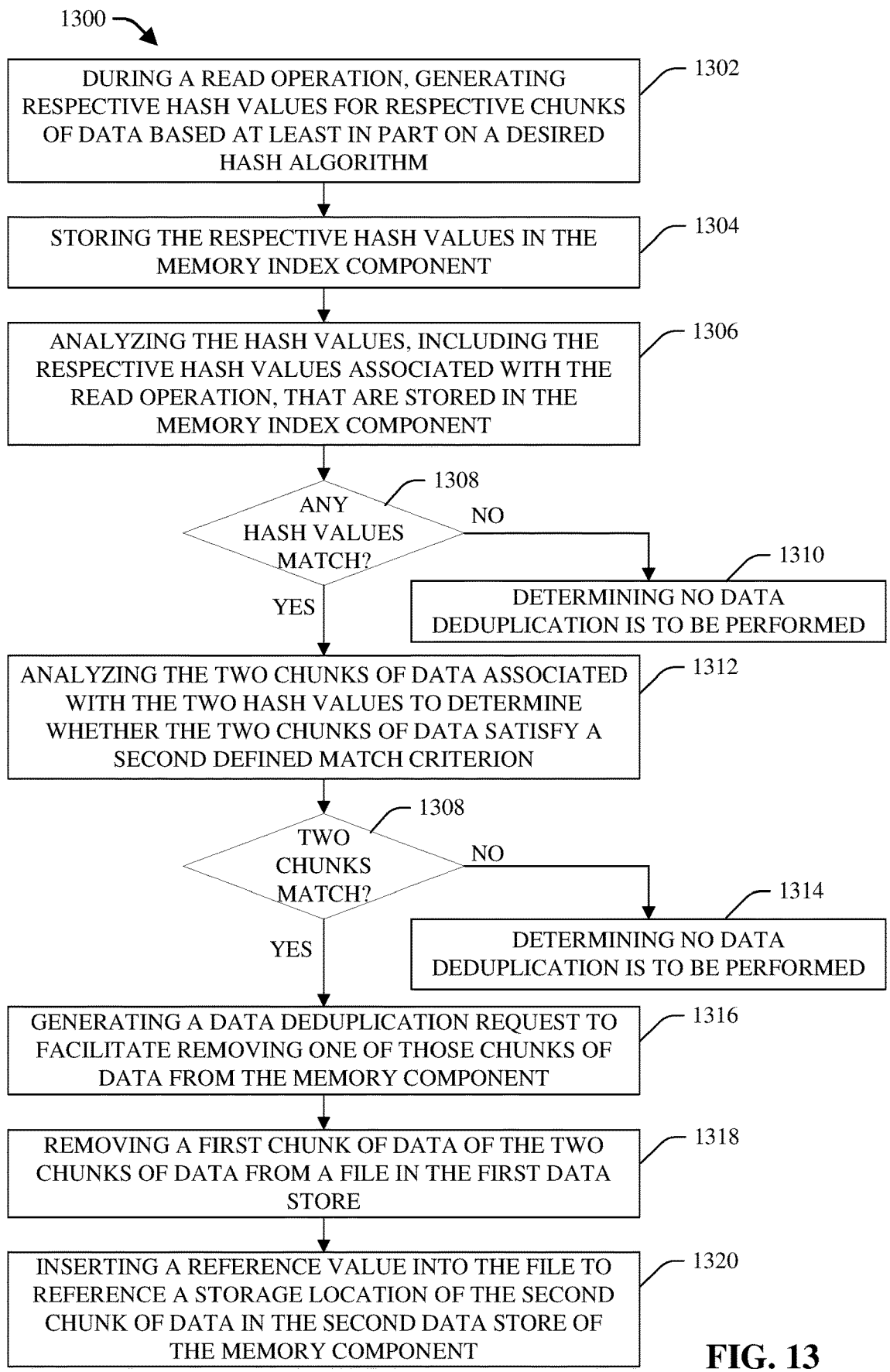
FIG. 13 presents a flow chart of an example method that can desirably perform data deduplication to remove duplicate chunks of data from a memory component in connection with a read operation, in accordance with various aspects and embodiments of the disclosed subject matter.

FIG. 13 presents a flow chart of an example method 1300 that can desirably perform data deduplication to remove duplicate chunks of data from a memory component in connection with a read operation, in accordance with various aspects and embodiments of the disclosed subject matter. The method 1300 can be employed by, for example, a system comprising the DMC, a worker component (e.g., asynchronous worker component) of or associated with the DMC, a processor component (e.g., of or associated with the DMC), and/or data store (e.g., of or associated with the DMC and/or the processor component).

At 1302, during a read operation, respective hash values can be generated for respective chunks of data based at least in part on a desired hash algorithm. The DMC can generate the respective hash values for the respective chunks of data based at least in part on the desired hash algorithm.

At 1304, the respective hash values can be stored in the memory index component. The DMC can store the respective hash values in the memory index component.

At 1306, the hash values, including the respective hash values associated with the read operation, that are stored in the memory index component can be analyzed. The DMC can analyze (e.g., compare) the hash values stored in the memory index component to facilitate identifying or determining whether two hash values satisfy a defined match criterion.

At 1308, a determination can be made regarding whether two hash values satisfy the defined match criterion based at least in part on the result of the analysis of the hash values. The DMC can determine whether two hash values satisfy the defined match criterion based at least in part on the result of the analysis (e.g., the comparison) of the hash values.

In response to determining that no hash values satisfy the defined match criterion, at 1310, a determination can be made that no data deduplication is to be performed. In response to the DMC determining that no hash values satisfy the defined match criterion, the DMC can determine that no data deduplication is to be performed with respect to the read operation.

Referring again to reference numeral 1308, in response to determining that two hash values satisfy the defined match criterion, at 1312, the two chunks of data associated with the two hash values can be analyzed to determine whether the two chunks of data satisfy a second defined match criterion. In response to determining that two hash values satisfy the defined match criterion, the DMC can analyze (e.g., perform a byte-by-byte analysis or comparison of) the two chunks of data associated with the two hash values to determine whether the two chunks of data satisfy the second defined match criterion (e.g., determine whether a byte-by-byte analysis of the two chunks of data shows that the respective bits of data of the two chunks of data are the same).

In response to determining that the two chunks of data do not satisfy the second defined match criterion based at least in part on the results of the analysis of the two chunks of data, at 1314, a determination can be made that no data deduplication is to be performed. In response to the DMC determining that the two chunks of data do not satisfy the second defined match criterion (e.g., do not match each other byte by byte) based at least in part on the results of the analysis of the two chunks of data, the DMC can determine that no data deduplication is to be performed with respect to the two chunks of data.

Referring again to reference numeral 1312, in response to determining that the two chunks of data satisfy the second defined match criterion based at least in part on the results of the analysis of the two chunks of data, at 1316, a data deduplication request can be generated to facilitate removing one of those chunks of data from the memory component. In response to determining that the two chunks of data satisfy the second defined match criterion based at least in part on the results of the analysis of the two chunks of data, the DMC can determine that data deduplication is to be performed with respect to the two chunks of data, and can generate a data deduplication request to remove one of those chunks (e.g., the duplicate chunk) of data from the memory component. The data deduplication request (e.g., asynchronous data deduplication request) can comprise information, such as the respective identifiers (e.g., first or second data store identifiers) associated with the two chunks of data, to facilitate identifying the respective locations of the two chunks of data in the first data store or second data store in the memory component.

At 1318, a first chunk of data of the two chunks of data can be removed from a file in the first data store. In response to the data deduplication request, a worker component (e.g., an asynchronous worker component) can perform the data deduplication to remove the first chunk of data from the file in the first data store (e.g., remove the first chunk of data from a native file in the first data store).

At 1320, a reference value (e.g., shadow reference) can be inserted into the file to reference a storage location of the second chunk of data of the two chunks of data in the second data store of the memory component. The worker component can insert (e.g., insert and store) the reference value, for example, as metadata, into the file in the first data store, wherein the reference value can reference or indicate the storage location of the second chunk of data in the second data store.

Figure 14:
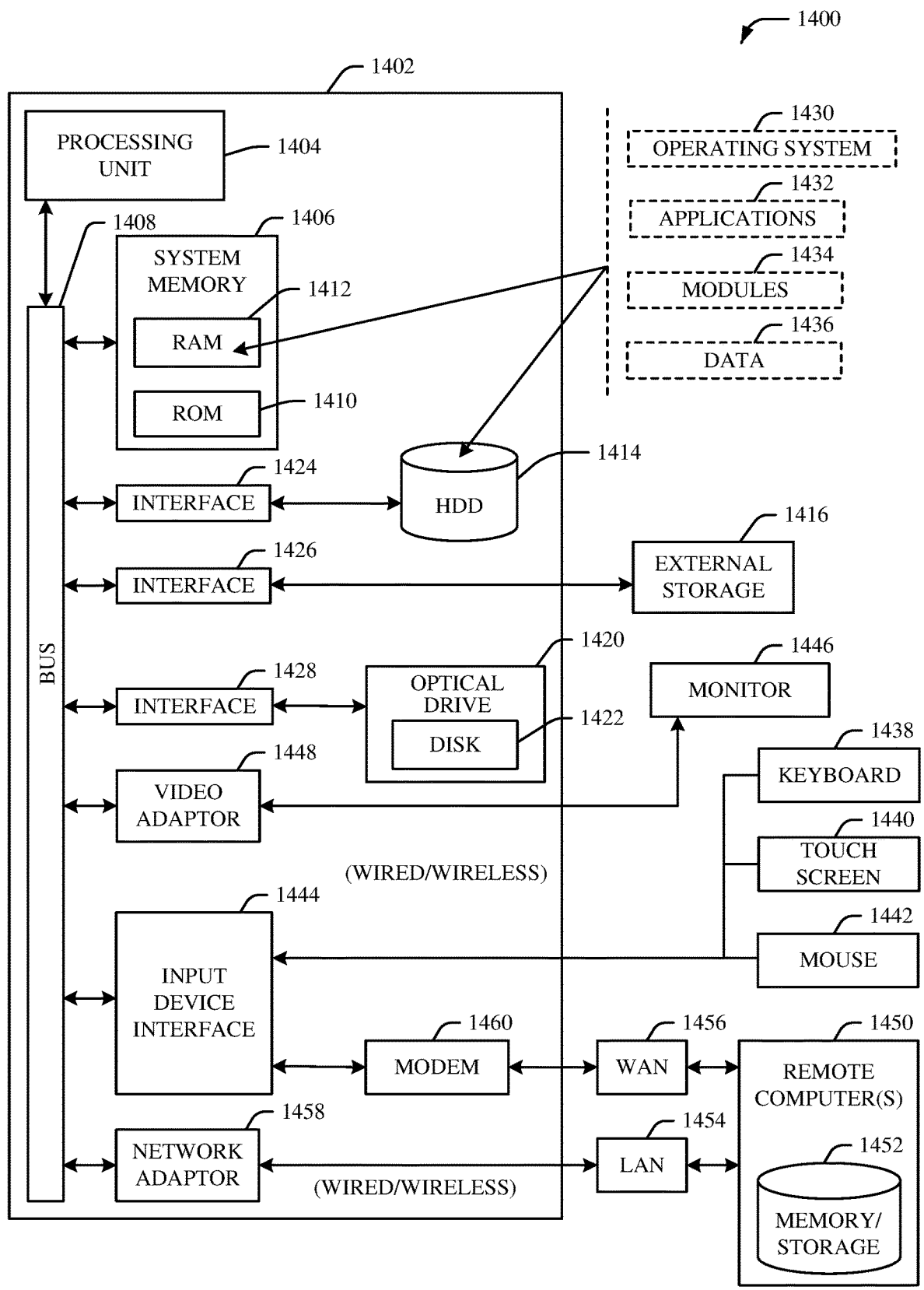
FIG. 14 illustrates an example block diagram of an example computing environment in which the various embodiments of the embodiments described herein can be implemented.

In order to provide additional context for various embodiments described herein, FIG. 14 and the following discussion are intended to provide a brief, general description of a suitable computing environment 1400 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456, e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., DMC, deduplication component, ZCRC, memory component, first data store, second data store, memory index component, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

initiating, by a system comprising a processor, a write operation to initiate writing a set of data to a first data store, wherein the set of data comprises a first subset of data and a second subset of data;

during the write operation, and prior to determining whether an inline data deduplication is able to be performed to remove the second subset of data from the write operation:

based at least in part on analysis of the second subset of data, determining, by the system, whether the second subset of data contains only data bits having zero values, wherein the second subset of data is a block of data;

in response to determining that the block of data contains only the data bits having the zero values:

removing, by the system, the block of data from the write operation to prevent the block of data from being written to the first data store, and replacing, by the system, the data bits having the zero values of the block of data with a sparse region in metadata associated with a file that is stored in the first data store, wherein the metadata indicates the sparse region is associated with the file and the data bits having the zero values; and during the write operation, determining, by the system, whether the inline data deduplication is to be performed to remove the first subset of data from the write operation based at least in part on a first result of determining whether a hash value associated with the first subset of data satisfies a first match criterion with respect to a stored hash value associated with a stored subset of data and stored in a memory index, and based at least in part on a second result of determining, during the write operation, whether the first subset of data satisfies a second match criterion with respect to a byte-by-byte comparison of the first subset of data to the stored subset of data that is stored in a second data store.

2. The method of claim 1, further comprising:
during the write operation, determining, by the system, whether the hash value associated with the first subset of data satisfies the first match criterion with respect to the stored hash value associated with the stored subset of data stored in the second data store and associated with the file that is associated with the memory index; and
in response to determining that the hash value satisfies the first match criterion, determining, by the system, whether the first subset of data is to be removed from the write operation and not written to the first data store based at least in part on the second result of the determining, during the write operation, of whether the first subset of data satisfies the second match criterion with respect to the byte-by-byte comparison of the first subset of data to the stored subset of data that is stored in the second data store, wherein the first data store is accessible via a file directory, and wherein the second data store is not directly accessible via the file directory and does not appear in the file directory.

3. The method of claim 2, further comprising:
in response to determining that the first subset of data satisfies the second match criterion with respect to the stored subset of data, determining, by the system, that the inline data deduplication is to be performed to remove the first subset of data from the write operation;
performing, by the system, the inline data deduplication to remove the first subset of data from the write operation; and
inserting, by the system, a reference value in the file, wherein the reference value indicates a storage location, in the second data store, of the stored subset of data that corresponds to the first subset of data.

4. The method of claim 1, further comprising:
in response to determining that the hash value associated with the first subset of data does not satisfy the first match criterion with respect to any of the hash values in the memory index, determining, by the system, that the inline data deduplication is not to be performed to remove the first subset of data from the write operation;
inserting, by the system, the hash value, a description of a file associated with the hash value, and an offset value associated with the first subset of data in the memory index; and
writing, by the system, the first subset of data to the data store.

5. The method of claim 1, wherein the hash value is a first hash value, wherein the set of data comprises a third subset of data, and wherein the method further comprises:
in response to determining that the first hash value associated with the first subset of data does not satisfy the first match criterion with respect to any stored hash values stored in the memory index, determining, by the system, whether the first hash value satisfies the first match criterion with respect to a second hash value associated with the third subset of data of a set of pending updates that is part of the write operation; and
in response to determining that the first hash value satisfies the first match criterion with respect to the second hash value associated with the third subset of data of the set of pending updates, determining, by the system, whether the first subset of data associated with the first hash value satisfies the second match criterion with respect to the third subset of data that is associated with the second hash value, wherein the set of pending updates comprises the first subset of data and the third subset of data.

6. The method of claim 5, further comprising:
in response to determining that the first subset of data associated with the first hash value satisfies the second match criterion with respect to the third subset of data associated with the second hash value, removing, by the system, the first subset of data and the third subset of data from the write operation; and
scheduling, by the system, inserting a first reference value associated with the first subset of data and a second reference value associated with the third subset of data in the file stored in the first data store and associated with the memory index, wherein the first reference value and the second reference value indicate a storage location, in the second data store, of a stored subset of data that corresponds to the first subset of data and the third subset of data.

7. The method of claim 1, further comprising:
during the write operation, in response to determining that the hash value satisfies the first match criterion with respect to the stored hash value associated with the stored subset of data stored in the first data store and associated with the file that is associated with the memory index, determining, by the system, that the inline data deduplication is not to be performed; and
removing, by the system, the first subset of data from the write operation.

8. The method of claim 7, further comprising:
redirecting, by the system, the first subset of data to be written to the second data store in a separate write operation; and
inserting, by the system, a reference value associated with the first subset of data in the file that is stored in the first data store and associated with the memory index, wherein the reference value indicates a storage location of the first subset of data in the second data store.

9. The method of claim 1, further comprising:
segmenting, by the system, the set of data into respective subsets of data, comprising the first subset of data and the second subset of data; and
generating, by the system, respective hash values associated with the respective subsets of data, comprising the hash value associated with the first subset of data.

10. The method of claim 9, wherein the generating the respective hash values comprises generating the respective hash values based at least in part on the respective subsets of data and a hash algorithm, wherein the hash algorithm satisfies a defined hashing speed criterion and a defined criterion, and wherein the method further comprises:
comparing, by the system, the hash value to stored hash values, comprising the stored hash value, that are stored in the memory index; and determining, by the system, whether the hash value matches any of the stored hash values, in accordance with the first match criterion.

11. The method of claim 1, wherein the removing of the block of data from the write operation, in response to determining that the block of data contains only the data bits having the zero values, results in bypassing performance of an operation to determine whether the inline data deduplication is to be performed to remove the second subset of data from the write operation.

12. The method of claim 1, further comprising:
in response to determining that the block of data contains only the data bits having the zero values, converting, by the system, a storage region in the file to the sparse region, wherein the storage region in the file is where the block of data initially was to be stored in the file as part of the write operation before the block of data was removed from the write operation; and
determining, by the system, that an inline data deduplication analysis is not to be performed on the block of data based at least in part on the block of data being removed from the write operation due to the block of data being determined to contain only the data bits having the zero values.

13. The method of claim 1, wherein the set of data is a first set of data, and wherein the method further comprises:
during a read operation to read a second set of data from the data store, segmenting, by the system, the second set of data into respective subsets of data;
generating, by the system, respective hash values associated with the respective subsets of data; and
storing, by the system, the respective hash values in the memory index.

14. The method of claim 13, wherein the hash value is a first hash value, wherein the stored hash value is a first stored hash value, wherein the stored subset of data is a first stored subset of data, and wherein the method further comprises:
determining, by the system, whether a second hash value of the respective hash values satisfies the first match criterion with respect to a second stored hash value stored in the memory index, wherein the second hash value is associated with a third subset of data of the second set of data, and wherein the second stored hash value is associated with a second stored subset of data; and
in response to determining that the second hash value satisfies the first match criterion with respect to the second stored hash value stored in the memory index, transferring, by the system, the second hash value, the third subset of data, the second stored hash value, and the second stored subset of data to an asynchronous data deduplication process to perform data deduplication in connection with the third subset of data and the second stored subset of data.

15. A system, comprising:
a memory that stores computer executable components; and
a processor that executes computer executable components stored in the memory, wherein the computer executable components comprise:
a write component that initiates execution of a write operation to write chunks of data to a first data store, wherein the chunks of data comprises a first chunk of data and a second chunk of data; and
a data management component that, during the write operation, and prior to determining whether an inline data deduplication is to be executed to remove the second chunk of data from the write operation determines whether the second chunk of data contains only data bits having zero values,
wherein, in response to determining that the second chunk of data contains only the data bits having the zero values, the data management component removes the second chunk of data from the write operation to prevent the second chunk of data from being written to the first data store, and replaces the second chunk of data with a sparse region in metadata associated with a file that is stored in the first data store, wherein the metadata indicates the sparse region is associated with the file and the data bits having the zero values of the second chunk of data, and
wherein, during the write operation, the data management component determines whether the inline data deduplication is to be executed to remove a first chunk of data from the write operation to prevent the first chunk of data from being written to the first data store based at least in part on a first result of a first determination regarding whether a hash associated with the first chunk of data satisfies a first match criterion in relation to a stored hash associated with a stored chunk of data and stored in a memory index, and based at least in part on a second result of a second determination regarding whether the first chunk of data satisfies a second match criterion with regard to a byte-for-byte comparison of the first chunk of data to the stored chunk of data that is stored in a second data store.

16. The system of claim 15, wherein, based at least in part on the first result indicating that the hash satisfies the first match criterion in relation to the stored hash, the data management component determines whether the first chunk of data is to be removed from the write operation and not written to the first data store based at least in part on the second result of the second determination regarding whether the first chunk of data satisfies the second match criterion with regard to the byte-for-byte comparison of the first chunk of data to the stored chunk of data stored in the second data store and associated with the file that is associated with the memory index.

17. The system of claim 16, wherein, based at least in part on the second result indicating that the first chunk of data satisfies the second match criterion with regard to the comparison of the first chunk of data to the stored chunk of data, the data management component determines that the inline data deduplication is to be executed to remove the first chunk of data from the write operation, executes the inline data deduplication to remove the first chunk of data from the write operation, and inserts a reference value in the file, wherein the reference value indicates a storage location, in the second data store, of the stored chunk of data that corresponds to the first chunk of data.

18. The system of claim 15, wherein, based at least in part on the first result indicating that the first chunk of data does not satisfy the first match criterion in relation to the stored chunk of data, the data management component determines that the inline data deduplication is not to be executed to remove the first chunk of data from the write operation, inserts the hash, a description of a file associated with the hash, and an offset value associated with the first chunk of data in the memory index, and writes the first chunk of data to the first data store.

19. A non-transitory machine-readable storage medium, comprising executable instructions that, when executed by a processor, facilitate performance of operations, comprising:

initiating execution of a write operation to initiate writing data to a first data store, wherein data comprises a first subset of the data and a second subset of the data;

during the write operation, and prior to determining whether an inline data deduplication is able to be performed to remove the second subset of the data from the write operation:

based at least in part on analysis of the second subset of the data, determining whether the second subset of data contains only data bits having zero values;

in response to determining that the second subset of the data contains only the data bits having the zero values:

removing the second subset of the data from the write operation to prevent the second subset of the data from being written to the first data store, and replacing the data bits having the zero values of the second subset of the data with a sparse region in metadata associated with a file stored in the first data store, wherein the metadata indicates the sparse region is associated with the file and the data bits having the zero values of the second subset of the data; and during the write operation, determining whether the inline data deduplication is to be performed to remove the first subset of the data from the write operation based at least in part on a first result of determining whether a hash value associated with the first subset of the data satisfies a first match criterion in relation to a stored hash value associated with a stored subset of data and stored in a memory index, and based at least in part on a second result of determining, during the write operation, whether the first subset of the data satisfies a second match criterion with respect to a comparison of bytes of data of the first subset of the data to stored bytes of data of the stored subset of data that is stored in a second data store.

20. The non-transitory machine-readable storage medium of claim 19, wherein the operations further comprise:

one of:

in response to determining that the hash value associated with the first subset of the data does not satisfy the first match criterion based at least in part on the first result, determining that the inline data deduplication is not to be performed to remove the first subset of the data from the write operation; or in response to determining that the hash value satisfies the first match criterion based at least in part on the first result, determining whether the first subset of the data is to be removed from the write operation and not written to the data store based at least in part on the second result of the determining of whether the first subset of the data satisfies the second match criterion with respect to the stored subset of data that is associated with the stored hash value and is in the file stored in the memory index, and in response to determining that the first subset of the data satisfies the second match criterion with respect to the stored subset of data based at least in part on the second result, determining that the inline data deduplication is to be performed to remove the first subset of the data from the write operation.

* * * * *